US010936655B2

(12) United States Patent
Siminoff et al.

(10) Patent No.: US 10,936,655 B2
(45) Date of Patent: Mar. 2, 2021

(54) SECURITY VIDEO SEARCHING SYSTEMS AND ASSOCIATED METHODS

(71) Applicant: AMAZON TECHNOLOGIES, INC., Seattle, WA (US)

(72) Inventors: James Siminoff, Pacific Palisades, CA (US); Michael Jason Mitura, Los Angeles, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 67 days.

(21) Appl. No.: 16/001,685

(22) Filed: Jun. 6, 2018

(65) Prior Publication Data

US 2018/0357247 A1   Dec. 13, 2018

Related U.S. Application Data

(60) Provisional application No. 62/516,493, filed on Jun. 7, 2017, provisional application No. 62/563,915, filed on Sep. 27, 2017.

(51) Int. Cl.
*G06F 16/783*   (2019.01)
*G08B 13/196*   (2006.01)
(Continued)

(52) U.S. Cl.
CPC ........... *G06F 16/7837* (2019.01); *G08B 3/10* (2013.01); *G08B 13/19606* (2013.01);
(Continued)

(58) Field of Classification Search
CPC . G06F 16/7837; G08B 13/19645; G08B 3/10; G08B 13/19608; G08B 13/19606;
(Continued)

(56) References Cited

U.S. PATENT DOCUMENTS 4,764,953 A   8/1988   Chern et al.
5,428,388 A   6/1995   Von Bauer et al.
(Continued)

FOREIGN PATENT DOCUMENTS

CN   2585521 Y   11/2003
CN   2792061 Y   6/2006
(Continued)

OTHER PUBLICATIONS

PCT/US2018/036337 International Search Report and Written Opinion dated Nov. 2, 2018, 22 pages.
(Continued)

*Primary Examiner* — Joseph Suh
(74) *Attorney, Agent, or Firm* — Lathrop GPM LLP

(57) ABSTRACT

Security video searching device, systems, and methods determine behavior associated with each of a plurality of video clips captured by security devices, find video clips that include behavior indicative of search characteristics, and send the found video clips to a user. A search engine analyzes each of the plurality of video clips to determine behavior associated with the video clip and finds ones of the plurality of video clips where the behavior matches the search characteristics defined by of the user. Previously determined behavioral patterns associated with motion signals generated by the security devices may also be used to determine behavior within the video clips.

22 Claims, 21 Drawing Sheets

US 10,936,655 B2

Page 2

(51) Int. Cl.
*G08B 3/10* (2006.01)
*G06N 20/00* (2019.01)

(52) U.S. Cl.
CPC . *G08B 13/19608* (2013.01); *G08B 13/19613* (2013.01); *G08B 13/19645* (2013.01); *G08B 13/19671* (2013.01); *G06N 20/00* (2019.01); *G08B 13/19619* (2013.01); *G08B 13/19656* (2013.01); *G08B 13/19669* (2013.01); *G08B 13/19697* (2013.01)

(58) Field of Classification Search
CPC ........ G08B 13/19613; G08B 13/19671; G08B 13/19619; G08B 13/19697; G08B 13/19656; G08B 13/19669; G06N 20/00
See application file for complete search history.

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,564,380 B1 * | 5/2003 | Murphy ................. H04N 5/232 348/207.11 |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 6/2006 | Lee |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,014 B1 | 1/2016 | Peintner et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,251,633 B2 | 2/2016 | Libal et al. |
| 9,253,455 B1 | 2/2016 | Harrison et al. |
| 9,342,936 B2 | 5/2016 | Scalisi |
| 9,412,278 B1 | 8/2016 | Gong et al. |
| 9,449,229 B1 | 9/2016 | Laska |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,182 B1 | 10/2017 | Modi |
| 9,799,183 B2 | 10/2017 | Harrison et al. |
| 9,804,596 B1 | 10/2017 | Slavin |
| 10,192,415 B2 | 1/2019 | Heitz, III |
| 2002/0032640 A1 | 3/2002 | LaFore et al. |
| 2002/0084902 A1 | 7/2002 | Zadrozny et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0044493 A1 | 3/2004 | Coulthard |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0093942 A1 | 4/2007 | Happel |
| 2008/0100704 A1 * | 5/2008 | Venetianer ......... G06K 9/00771 348/143 |
| 2008/0169929 A1 | 7/2008 | Albertson et al. |
| 2009/0002157 A1 * | 1/2009 | Donovan ................. H04N 7/18 340/540 |
| 2009/0059001 A1 | 3/2009 | Wang |
| 2009/0138906 A1 * | 5/2009 | Eide ................... G06Q 30/0264 725/32 |
| 2009/0279772 A1 * | 11/2009 | Sun ...................... G06K 9/6298 382/141 |
| 2010/0026802 A1 * | 2/2010 | Titus ................ G08B 13/19608 348/143 |
| 2011/0025847 A1 * | 2/2011 | Park ...................... G06Q 10/06 348/143 |
| 2011/0225136 A1 * | 9/2011 | Tu ........................... G06F 16/70 707/706 |
| 2012/0143649 A1 | 6/2012 | Aubertin |
| 2013/0057695 A1 | 3/2013 | Huisking |
| 2013/0128022 A1 | 5/2013 | Bose et al. |
| 2013/0144719 A1 * | 6/2013 | Yeo ...................... G06Q 30/02 705/14.54 |
| 2013/0338459 A1 | 12/2013 | Lynn et al. |
| 2013/0346980 A1 | 12/2013 | Branch et al. |
| 2014/0032761 A1 * | 1/2014 | Beveridge ............. G06F 9/5011 709/226 |
| 2014/0244037 A1 | 8/2014 | Scott et al. |
| 2014/0313032 A1 | 10/2014 | Sager et al. |
| 2015/0035987 A1 | 2/2015 | Fernandez |
| 2015/0119105 A1 | 4/2015 | Amgar et al. |
| 2015/0213702 A1 | 7/2015 | Kimmel |
| 2015/0276237 A1 | 10/2015 | Daniels et al. |
| 2015/0282766 A1 | 10/2015 | Cole et al. |
| 2015/0332097 A1 | 11/2015 | Bulan et al. |
| 2015/0339570 A1 | 11/2015 | Scheffler |
| 2015/0370272 A1 | 12/2015 | Reddy et al. |
| 2016/0004914 A1 * | 1/2016 | Park ...................... H04N 7/188 382/209 |
| 2016/0180667 A1 | 6/2016 | Bunker et al. |
| 2016/0189509 A1 | 6/2016 | Malhotra et al. |

(56) References Cited

U.S. PATENT DOCUMENTS

| | | |
|---|---|---|
| 2016/0261932 A1 | 9/2016 | Fadell et al. |
| 2016/0379458 A1 | 12/2016 | Eyring et al. |
| 2017/0048376 A1 | 2/2017 | Logan |
| 2017/0085843 A1 | 3/2017 | Scalisi et al. |
| 2017/0085844 A1 | 3/2017 | Scalisi et al. |
| 2017/0175419 A1 | 6/2017 | Chiu |
| 2017/0187995 A1 | 6/2017 | Scalisi et al. |
| 2017/0213436 A1 | 7/2017 | Stout et al. |
| 2017/0257475 A1 | 9/2017 | Zong et al. |
| 2017/0264827 A1 | 9/2017 | Dao |
| 2017/0352240 A1 | 12/2017 | Carlton-Foss |
| 2018/0012460 A1 | 1/2018 | Heitz, III et al. |
| 2018/0012463 A1 | 1/2018 | Chaudry et al. |
| 2018/0018508 A1 | 1/2018 | Tusch |
| 2018/0157980 A1* | 6/2018 | Kochura ............ G06N 5/048 |
| 2018/0173853 A1 | 6/2018 | Cruz Huertas et al. |

FOREIGN PATENT DOCUMENTS

| | | |
|---|---|---|
| EP | 0944883 B1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A2 | 4/2001 |
| JP | 2002-033839 A2 | 1/2002 |
| JP | 2002-125059 A2 | 4/2002 |
| JP | 2002-342863 A2 | 11/2002 |
| JP | 2002-344640 A2 | 11/2002 |
| JP | 2002-354137 A2 | 12/2002 |
| JP | 2002-368890 A2 | 12/2002 |
| JP | 2003-283696 A2 | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 09-008925 A | 1/2009 |
| KR | 10-2011-0130033 A | 12/2011 |
| KR | 10-1612483 B1 | 4/2016 |
| KR | 10-2016-0059671 A | 5/2016 |
| KR | 10-1731461 B1 | 5/2017 |
| WO | WO 199839894 A1 | 9/1998 |
| WO | WO 0113638 A1 | 2/2001 |
| WO | WO 200193220 A1 | 12/2001 |
| WO | WO 2002085019 A1 | 10/2002 |
| WO | WO 2003028375 A1 | 4/2003 |
| WO | WO 2003096696 A1 | 11/2003 |
| WO | WO 2006038760 A1 | 4/2006 |
| WO | WO 2006067782 A1 | 6/2006 |
| WO | WO 2007125143 A1 | 8/2007 |

OTHER PUBLICATIONS

U.S. Appl. No. 16/001,627, Office Action dated Mar. 9, 2020, 26 pages.
U.S. Appl. No. 16/001,627, Final Office Action dated Jun. 29, 2020, 26 pages.

* cited by examiner

SECURITY VIDEO SEARCHING SYSTEMS AND ASSOCIATED METHODS

RELATED APPLICATIONS

This application claims priority to U.S. Patent Application Ser. No. 62/516,493, filed Jun. 7, 2017, and to U.S. Patent Application Ser. No. 62/563,915, filed Sep. 27, 2017, both of which are incorporated herein by reference.

BACKGROUND

Sensor devices for detecting activity in an environment (e.g., sensors in a local alarm system) typically operate independently and provide a local alert when activity is detected. The alerts are generated when any one device detects an event (e.g., if an entry door opens when a burglar alarm is set, the alarm is activated). Some of these devices (e.g., a smart doorbell or a monitored alarm system) communicate with a remote server that may provide both local and non-local alerts when activity is detected. For example, when a smart doorbell detects motion, an alert is sent to the owner's smartphone. Some of these devices detect activity and control other devices (e.g., a floodlight controller) and act independently as an intruder deterrent. However, even where one owner has multiple devices, they each typically operate independently to generate alerts.

SUMMARY

One aspect of the present embodiments includes the realization that when event signals from two or more security devices are evaluated independently, information is lost, particularly when the two or more security devices have a spatial relationship to one another. The present embodiments solve this problem by collectively evaluating temporal sequences of events received within the event signals from two or more spatially related security devices. Advantageously, this process of evaluating temporal sequences of events from two or more security devices having a spatial relationship to one another enables the path of movement of a person about a site to be tracked, which further enables determinations to be made about whether that path of movement is normal or abnormal. When a person's movement about a site is determined to be abnormal, steps may then be taken to guard against a possible threat posed by that person.

Another aspect of the present embodiments includes the realization that conventional security/alarm systems are not behaviorally-aware. That is, conventional security/alarm systems are not capable of determining whether the behavior of a person at a site is normal or abnormal. The present embodiments solve this problem by collectively evaluating event signals from two or more spatially related security devices in order to determine a behavior-awareness state for the security/alarm system. In certain embodiments, the behavior-awareness state for the security/alarm system may be automatically adjusted based on the determination of whether the behavior of the person at the site is normal or abnormal. Thus, for example, when the person's behavior is determined to be abnormal, the behavior-awareness state for the security/alarm system may be increased, which may cause one or more responsive actions to be taken to guard against a possible threat posed by that person.

Another aspect of the present embodiments includes the realization that many security devices may be located within a neighborhood, but that behavioral information is lost when event signals from these security devices are processed independently. The present embodiments solve this problem by enrolling multiple security devices located within a neighborhood with a behavior-aware security system to allow collective analysis of event signals to determine an area behavior-awareness state.

Another aspect of the present embodiments includes the realization that a security device may capture many video clips over time and that a user may wish to find one or more of the video clips that have content of interest. More specifically, the user may desire to search for video clips that have associated behaviors that may be of interest to the user, such as video clips having associated behaviors indicative of suspicious activities (e.g., vandalism, burglary, trespassing, etc.). The present embodiments solve this problem by providing a security video searching device that includes an event analyzer that identifies events within the video clips and a search engine that searches the plurality of video clips to determine behavior associated with the video clips and finds ones of the plurality of video clips that include behavior indicative of the search characteristic or a behavioral pattern indicative of the search characteristic and sends the found video clips to the user. In addition, in some of the present embodiments, a security video searching system is provided that includes a search engine that analyzes each of the plurality of video clips to determine behavior associated with the video clip and finds ones of the plurality of video clips that match a search request of the user based upon the associated behavior. For example, the security video searching system may find video clips from the plurality of video clips that match a search request of the user based upon previously determined behavioral patterns associated with motion signals generated by the security devices that capture the video clips. By allowing the user the ability to search for video clips having associated behaviors, the user may be more likely to view suspicious activity in the area of his or her property, and as a result may gain a better understanding of prior locations of threats, as well as the appearance of threats (e.g., the behavior that is indicative of a threat). By being aware of prior locations and the appearance of threats, the user may be more prepared to identify threats and/or to avoid certain areas, thereby contributing to his or her safety, as well as the safety of the neighborhood and/or surrounding areas.

Another aspect of the present embodiments includes the realization that a security device may capture many video clips and provide many event signals (e.g., from motion sensors, contact sensors, and the like) over time and that a user of the security device may wish to find one or more of the video clips that have content of interest. More specifically, the user may desire to search for video clips that have associated behaviors that may be of interest to the user, such as video clips having associated behaviors indicative of suspicious activities (e.g., vandalism, burglary, trespassing, etc.). The present embodiments solve this problem by providing a security video searching method that analyzes each of the plurality of video clips to identify behavior therein and to find ones of the plurality of video clips that match search characteristics of the user based upon the identified behavior. In addition, the present embodiments solve this problem by providing a security video searching method that identifies video clips from the plurality of video clips that match a search request of the user based upon previously determined behavioral patterns determined from event signals of the security devices.

In a first aspect, a behavior-aware security system includes a plurality of motion sensors deployed at a site, each of the motion sensors configured to generate a motion signal indicative of detected motion within a respective site zone. The system also includes a server remotely located from the plurality of motion sensors at the site and having a processor, memory communicatively coupled with the processor and storing a plurality of temporal behavior patterns, and an event analyzer having machine-readable instructions stored within the memory that, when executed by the processor, configure the processor to: compare a temporal event sequence, defined by a plurality of the motion signals received from at least two of the plurality of motion sensors, to the plurality of temporal behavior patterns, and determine a behavior-awareness state defined by one of the temporal behavior patterns corresponding with the temporal event sequence.

In an embodiment of the first aspect, the server further includes a learning algorithm having machine-readable instructions stored within the memory that, when executed by the processor, configure the processor to: correlate the temporal event sequence, when unmatched to any of the plurality of temporal behavior patterns, to previously unmatched temporal event sequences; generate a new temporal behavior pattern from the temporal event sequence when the correlation indicates a repeating pattern of events at the site zones; and add the new temporal behavior pattern to the plurality of temporal behavior patterns within the memory.

In another embodiment of the first aspect, the server further includes a learning algorithm having machine-readable instructions stored within the memory that, when executed by the processor, configure the processor to: generate a new temporal behavior pattern based upon a temporal sequence of events with at least two event signals received from at least two different ones of the motion sensors configured in a learning mode; and add the new temporal behavior pattern to the plurality of temporal behavior patterns within the memory.

In another embodiment of the first aspect, the received event signals result from controlled activity at the site.

In another embodiment of the first aspect, at least one of the plurality of motion sensors includes a camera having a field-of-view of its respective site zone.

In another embodiment of the first aspect, the motion sensor with camera is configured to detect motion based upon differences between at least two subsequently captured images of the respective site zone.

In another embodiment of the first aspect, the behavior-awareness state has a high alert level when concern for abnormal behavior is high.

In another embodiment of the first aspect, wherein each of the plurality of motion sensors is in an armed state when the behavior-awareness state has a high alert level.

In another embodiment of the first aspect, the behavior-awareness state has a low alert level when concern for abnormal behavior is low.

In another embodiment of the first aspect, the plurality of motion sensors are self-arming based upon the behavior-awareness state.

In another embodiment of the first aspect, wherein when the motion sensors are self-armed, the event analyzer has machine-readable instructions stored within the memory that, when executed by the processor, configure the processor to generate one or more alert notifications when a further motion signal is receive from any one of the two motion sensors.

In a second aspect, a method determines a behavior-awareness state for a site with multiple security devices. a first event signal indicative of a first event within a first zone at the site is received from a first one of the security devices. A second event signal indicative of a second event within a second zone at the site is received from a second one of the security devices. A temporal event sequence is determined based upon the first and second event signals and compared to a plurality of temporal behavior patterns. The behavior-awareness state is set to correspond to the one temporal behavior pattern when the temporal event sequence corresponds with one of the temporal behavior patterns.

In an embodiment of the second aspect, the first and second events have a temporal relationship to each other.

Another embodiment of the second aspect further includes generating a new temporal behavior pattern corresponding to the temporal event sequence during a learning period of controlled activity for the security devices. A behavior-awareness state is assigned to the new temporal behavior pattern based upon a type of the controlled activity, and the new temporal behavior pattern is added to the plurality of temporal behavior patterns.

In another embodiment of the second aspect, a low concern level is assigned to the behavior-awareness state of the new temporal behavior pattern when the controlled activity represents normal activity at the site.

In another embodiment of the second aspect, a high concern level is assigned to the behavior-awareness state of the new temporal behavior pattern when the controlled activity represents abnormal activity at the site.

Another embodiment of the second aspect further includes setting the behavior-awareness state of the site to a higher level when the first and second events do not match any of the temporal behavior patterns.

In another embodiment of the second aspect, an alert notification is generated when an additional event signal is received from any one of the first and second ones of the security devices when the behavior-awareness state of the site is set to the higher level.

In another embodiment of the second aspect, a signal is sent to a monitoring station when an event is detected when the behavior-awareness state of the site is set to the highest level.

Another embodiment of the second aspect further includes, when the temporal event sequence does not match any of the temporal behavior patterns, correlating the temporal event sequence to previously unmatched temporal event sequences for the site, and when the step of correlating indicates repeat behavior, generating a new temporal behavior pattern corresponding to the temporal event sequence, assigning a low-level behavior-awareness state to the new temporal behavior pattern, and adding the new temporal behavior pattern to the plurality of temporal behavior patterns.

In another embodiment of the second aspect, the temporal event sequence is compared to ones of the plurality of temporal behavior patterns having a corresponding time of day.

In another embodiment of the second aspect, one or more primary devices is activated in response to a further event signal from any one of the first and second security devices when the behavior-awareness state is at a high alert level.

In another embodiment of the second aspect, the first and the second security devices are armed when the behavior-awareness state is at a high alert level.

In a third aspect, a behavior-aware security system includes a plurality of motion sensors deployed at a site, and each configured to generate a motion signal indicative of detected motion within a respective site zone. The behavior-aware security system also includes a hub located at the site and having a processor, memory communicatively coupled with the processor and storing a plurality of temporal behavior patterns, and an event analyzer having machine-readable instructions stored within the memory. When the machine-readable instructions are executed by the processor, they configure the processor to: compare a temporal event sequence, defined by a plurality of the motion signals received from at least two of the plurality of motion sensors, to the plurality of temporal behavior patterns, and determine a behavior-awareness state defined by one of the temporal behavior patterns corresponding with the temporal event sequence.

In an embodiment of the third aspect, the hub further includes a learning algorithm that has machine-readable instructions stored within the memory that, when executed by the processor, configure the processor to: correlate the temporal event sequence, when unmatched to any of the plurality of temporal behavior patterns, to previously unmatched temporal event sequences; generate a new temporal behavior pattern from the temporal event sequence when the correlation indicates a repeating pattern of events at the site zones; and add the new temporal behavior pattern to the plurality of temporal behavior patterns within the memory.

In another embodiment of the third aspect, the hub further includes a learning algorithm that has machine-readable instructions stored within the memory that, when executed by the processor, configure the processor to: generate a new temporal behavior pattern based upon a temporal sequence of events with at least two event signals received from at least two different ones of the motion sensors configured in a learning mode; and add the new temporal behavior pattern to the plurality of temporal behavior patterns within the memory.

In another embodiment of the third aspect, the received event signals result from controlled activity at the site.

In another embodiment of the third aspect, at least one of the plurality of motion sensors includes a camera having a field-of-view of its respective site zone.

In another embodiment of the third aspect, the motion sensor with camera is configured to detect motion based upon differences between at least two subsequently captured images of the respective site zone.

In another embodiment of the third aspect, the behavior-awareness state has a high alert level when concern for abnormal behavior is high.

In another embodiment of the third aspect, the hub arms each of the plurality of motion sensors when the behavior-awareness state has a high alert level.

In another embodiment of the third aspect, the behavior-awareness state has a low alert level when concern for abnormal behavior is low.

In a fourth aspect, a security video searching device includes a processor, memory communicatively coupled with the processor, a security video database having a plurality of video clips stored within the memory, and an event analyzer with machine-readable instructions stored within the memory that, when executed by the processor, configure the processor to analyze each of the plurality of video clips to determine events, generate a temporal event sequence based on the events of video clips from related security devices, compare the temporal event sequence to a plurality of behavioral patterns, and associate the one or more of the plurality of behavioral patterns with each of the plurality of video clips when the temporal event sequence matches the behavioral pattern. The security video searching device also includes a search engine with machine-readable instructions stored within the memory that, when executed by the processor, configure the processor to analyze each of the plurality of video clips to determine behavior associated with the video clip, receive, from a client device, a search request defining a search characteristic search the security video database in response to receiving the search request to identify matching video clips from the plurality of video clips that include behavior indicative of the search characteristic or a behavioral pattern indicative of the search characteristic, and transmit the matching video clip to the client device.

In a fifth aspect, a security video searching system includes a processor, memory communicatively coupled with the processor, a security video database having a plurality of video clips stored within the memory, and a search engine having machine-readable instructions stored within the memory that, when executed by the processor, configure the processor to analyze each of the plurality of video clips to determine behavior associated with the video clip, receive, from a client device, a search request defining a search characteristic, search the security video database in response to receiving the search request to identify matching video clips from the plurality of video clips that include behavior indicative of the search characteristic, and transmit the matching video clip to the client device.

In an embodiment of the fifth aspect, the search request defines a time range, the search engine further includes machine-readable instructions stored within the memory that, when executed by the processor, configure the processor to search only video clips of the security video database having a time tag indicative of a time within the time range.

In another embodiment of the fifth aspect, the search request defines a geographic area, and the search engine has machine-readable instructions stored within the memory that, when executed by the processor, configure the processor to search only video clips of the security video database having a location tag indicative of a location within the geographic area.

In another embodiment of the fifth aspect, the search request is received in response to an input to an interface of an application running on the client device by a user of the client device.

Another embodiment of the fifth aspect further includes an event analyzer having machine-readable instructions stored within the memory that, when executed by the processor, configure the processor to analyze each of the plurality of video clips to identify events within each of the plurality of video clip, generate a temporal event sequence based on the events identified within two or more of the plurality of video clips generated by one or more related security devices, compare the temporal event sequence to a plurality of behavioral patterns to determine whether the temporal event sequence matches any of the plurality of behavior patterns, and upon determining that the temporal event sequence matches at least one of the plurality of behavior patterns, associate the behavioral pattern with each of the two or more of the plurality of video clips generated by the one or more related security devices.

In another embodiment of the fifth aspect, the search characteristic includes an actor, and the one of the identified video clips includes the actor.

In another embodiment of the fifth aspect, the actor is at least one of a person, an object, and an animal.

In another embodiment of the fifth aspect, the search engine further includes an event analyzer having machine-readable instructions stored within the memory that, when executed by the processor, configure the processor to analyze each of the plurality of video clips to identify first events, analyze each of the plurality of event signals to determine second events, the plurality of event signals received from related security devices located within a second geographic area corresponding to a first geographic area associated with the plurality of video clips, generate a temporal event sequence based on the first events and the second events, compare the temporal event sequence to each of a plurality of behavioral patterns to determine whether the temporal event sequence matches any of the plurality of behavior patterns, and upon determining that the temporal event sequence matches at least one of the plurality of behavior patterns, associate the behavioral pattern with each of the two or more of the plurality of video clips generated by the one or more related security devices.

In another embodiment of the fifth aspect, the event analyzer further includes machine-readable instructions stored within the memory that, when executed by the processor, configure the processor to compare the temporal event sequence to a statistical model defining normal activity for the one or more related security devices, the temporal event sequence being indicative of abnormal behavior when not matched by the statistical model.

In another embodiment of the fifth aspect, the temporal event sequence is associated with a time of day and the statistical model defines normal behavior at that time of day.

In a sixth aspect, a security video searching system includes a processor, memory communicatively coupled with the processor, a security video database having a plurality of video clips stored within the memory, and a search engine with machine-readable instructions stored within the memory that, when executed by the processor, configure the processor to receive, from a client device, a search request defining a search characteristic, search the security video database in response to receiving the search request to identify matching video clips from the plurality of video clips that include behavior indicative of the search characteristic based upon a previously determined behavioral pattern associated with the video clip, and transmit the identified video clips to the client device.

In one embodiment of the sixth aspect, the previously determined behavioral pattern is determined by matching a temporal event sequence, identified within event signals received from related security devices co-located at a location, to one or more temporal behavior patterns indicative of abnormal behavior at the location.

In another embodiment of the sixth aspect, the previously determined behavioral pattern is determined when a temporal event sequence, identified within event signals received from related security devices co-located at a location, does not match temporal behavior patterns indicative of normal behavior at the location.

Another embodiment of the sixth aspect further includes an event analyzer with machine readable instructions that, when executed by the processor, configure the processor to analyze each of the plurality of video clips to identify events within each of the plurality of video clip events, generate a temporal event sequence based on the events identified within two or more of the plurality of video clips generated by one or more related security devices, compare the temporal event sequence to a plurality of behavioral patterns to determine whether the temporal event sequence matches any of the plurality of behavior patterns, and, upon determining that the temporal event sequence matches at least one of the plurality of behavior patterns, associate the behavioral pattern with each of the two or more of the plurality of video clips generated by the one or more related security devices.

Another embodiment of the sixth aspect further includes event analyzer machine readable instructions that, when executed by the processor, configure the processor to compare the temporal event sequence to a statistical model defining normal activity for the one or more related security devices, where the temporal event sequence is indicative of abnormal behavior when not matched by the statistical model.

In another embodiment of the sixth aspect, the temporal event sequence is associated with a time of day, and the statistical model defines normal behavior at that time of day.

In a seventh aspect, a method searches security video content. The method includes analyzing a plurality of video clips from a security video database to determine behavior associated with each of the video clips, receiving, from a client device, a search request defining a search characteristic, searching the security video database in response to receiving the search request to identify matching video clips from the plurality of video clips that include behavior corresponding to the search characteristic, and transmitting the matching video clips to the client device.

In an embodiment of the seventh aspect, the search request defines a time range, the searching searches only video clips of the security video database having a time tag indicative of a time within the time range.

In an embodiment of the seventh aspect, the search request defines a geographic area, and the searching searches only video clips of the security video database having a location tag indicative of a location within the geographic area.

In an embodiment of the seventh aspect, the search request is received in response to an input to an interface of an application running on the client device by a user of the client device.

An embodiment of the seventh aspect further includes storing, in response to determining the behavior associated with each of the plurality of video clips, the behavior in the security video database in association with the corresponding video clip.

In an embodiment of the seventh aspect, the search characteristic defines an actor, and the identified video clips includes the actor.

In an embodiment of the seventh aspect, the actor is at least one of a person, an object, and an animal.

In an embodiment of the seventh aspect, analyzing the plurality of video clips from the security video database to determine the behavior associated with each of the plurality of video clips includes analyzing each of the plurality of video clips to identify events within each of the plurality of video clips, generating a temporal event sequence based on the events identified within two or more of the plurality of video clips generated by one or more related security devices, comparing the temporal event sequence to each of a plurality of temporal behavior patterns to determine whether the temporal event sequence matches any of the plurality of temporal behavior patterns, and, upon determining that the temporal event sequence matches at least one of the plurality of temporal behavior patterns determining identified behavior based upon the matched temporal behavior pattern, and associating the identified behavior with each of the two or more of the plurality of video clips generated by the one or more related security devices.

An embodiment of the seventh aspect further includes comparing the temporal event sequence to a statistical model defining normal activity for the one or more related security devices, the temporal event sequence being indicative of abnormal behavior when not matched by the statistical model.

In an embodiment of the seventh aspect, the statistical model defines the normal behavior over time, and the temporal event sequence is associated with a time to enable matching to the statistical model.

In an embodiment of the seventh aspect, the events include detected motion.

In an embodiment of the seventh aspect, analyzing the plurality of video clips from the security video database to determine the behavior associated with each of the plurality of video clips includes analyzing each of the plurality of video clips to identify first events, analyzing each of a plurality of event signals to determine second events, the plurality of event signals received from one or more security devices located within a second geographic area corresponding to a first geographic area associated with the plurality of video clips, generating a temporal event sequence based on the first events and the second events, comparing the temporal event sequence to each of a plurality of temporal behavior patterns to determine whether the temporal event sequence matches any of the plurality of temporal behavior patterns, and upon determining that the temporal event sequence matches at least one of the plurality of temporal behavior patterns determining identified behavior based upon the matched temporal behavior pattern, and associating the identified behavior with each of the two or more of the plurality of video clips generated by the one or more related security devices.

In an embodiment of the seventh aspect, the temporal event sequence matches one or more temporal behavior patterns indicative of abnormal behavior at a site corresponding to the first and second events.

In an embodiment of the seventh aspect, the temporal event sequence not matching temporal behavior patterns is indicative of normal behavior at the site.

In an eighth aspect, a method searching security video content, includes receiving, from a client device, a search request defining a search characteristic, searching the security video database in response to the search request to identify a first of a plurality of video clips having a previously determined first behavioral pattern indicative of the search characteristic, and transmitting the first video clip to the client device.

In an embodiment of the eighth aspect, the first behavioral pattern is determined by matching a temporal event sequence with one or more temporal behavior patterns indicative of abnormal behavior at the site, the temporal event sequence is identified based on event signals received from two or more security devices co-located at a location where the first video clip was generated.

In an embodiment of the eighth aspect, the first behavioral pattern is determined when a temporal event sequence, identified within event signals received from two or more security devices co-located at a location where the first video clip was generated, does not match temporal behavior patterns indicative of normal behavior at the location.

DETAILED DESCRIPTION OF THE EMBODIMENTS

Figure 1:
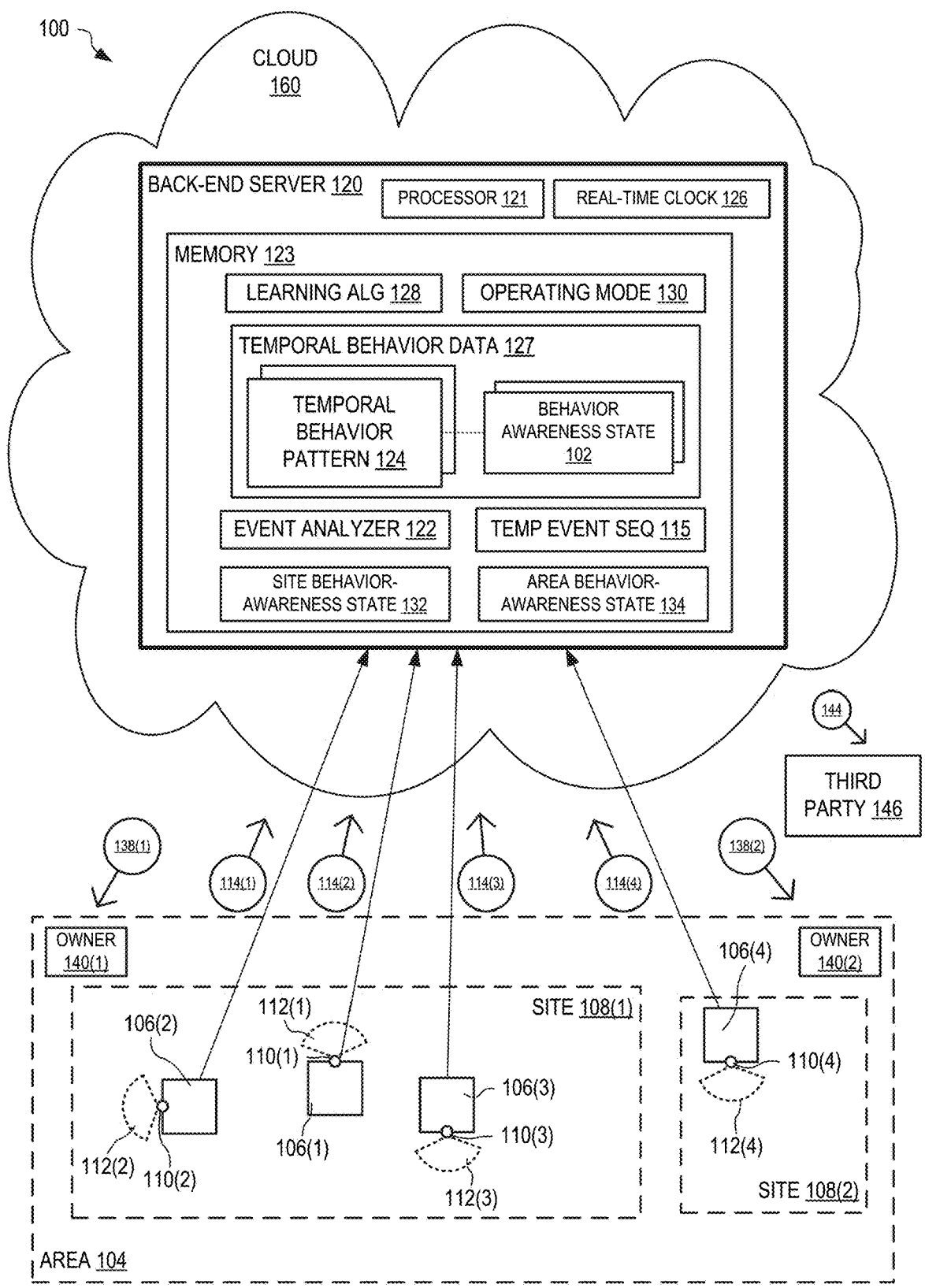
FIG. 1 is a functional block diagram illustrating one example of a behavior-aware security system, in an embodiment.

FIG. 1 shows one example of a behavior-aware security system 100 for determining a behavior-awareness state 102 (may also be referred to as "alert level 102") for an area 104 having a plurality of security devices 106. The alert level 102 may indicate a position within a range, such as one of low, medium, and high, to define a threat level of behavior within the area 104. For example, observed normal behavior within the area 104 may be associated with a low alert level 102, while observed malicious behavior within the area 104 may be associated with a high alert level 102.

Each security device 106 may represent one or more of a smart (video) doorbell, a smart security camera, a smart floodlight (security device), and/or other such devices. FIGS. 12 through 16 and the accompanying description provide additional detail of certain example embodiments of the security devices 106. The security devices 106 are located at one or more sites 108 within the area 104. The sites 108 may represent one or more of a residential property, a commercial property, a recreational area, a government property, and so on. Each site 108 may have at least one structure, not shown for clarity of illustration, such as a pole, a fence, a building, a dwelling, and so on, that supports the security device 106 or to which the security device 106 may be attached.

Each security device 106 has at least one sensor 110 that detects an event (e.g., an image, a series of images, motion, sound, etc.) within its corresponding zone 112. Each sensor 110 may represent one or more of a pyroelectric infrared (PIR), also referred to as passive infrared) sensor for detecting heat signature motion within the zone 112, a camera for capturing image(s) of, and detecting visible motion within, the zone 112, and a microphone for detecting sound within the zone 112. The security devices 106 may have other sensors without departing from the scope of the present embodiments. For example, as described below, the security device 106 may include an ambient light level sensor for detecting ambient light levels near the security device 106. In other embodiments, the security device 106 may determine ambient light levels based upon images captured by the camera.

Each security device 106 may have one or more primary functions. Different security devices 106 may have similar primary functions or may have different primary functions. For example, the security device 106 may be a smart (video) doorbell that may alert a homeowner or user of motion at their front door, sound a doorbell within the home or at the user's mobile device (or other client device) when a button on the security device 106 is depressed, and/or allow the user to view video and hear audio of a person at their door, and converse with that person via the mobile device (or other client device). In another example, the security device 106 may be a smart security camera that may alert a user to detected motion within the zone 112, capture audio and video of that zone, and allow a user, using a smartphone or other client device, to converse with a person within that zone via the smart security camera. In another example, the security device 106 may be a smart floodlight (security device) that includes a camera and/or PIR sensors for detecting motion within a corresponding zone 112, notifying a user of the detected motion, activating the floodlight in response to the detected motion, and, allowing a user, using a smartphone or other client device, to converse with a person in the zone via the smart floodlight. The security devices 106 may have other primary functions without departing from the scope of the present embodiments.

Further to the one or more primary functions, in response to detecting motion within a corresponding zone 112, each security device 106 may also send an event signal 114, indicative of the detected motion, to a back-end server 120. In certain embodiments, the back-end server 120 may also support the primary functionality of one or more of the security devices 106. The back-end server 120 may be a computer that includes at least one processor 121 and memory 123 storing machine-readable instructions that when executed by the processor provide the functionality of the back-end server 120 described herein. The back-end server 120 may be located within "the cloud" 160 and is, for example, accessible via, at least in part, the Internet.

The back-end server 120 includes an event analyzer 122, implemented as machine-readable instructions stored within the memory, that are executed by the processor to process the received event signals 114. Processing the received event signals 114 may comprise identifying a temporal event sequence 115 and comparing the temporal event sequence 115 to at least one temporal behavior pattern 124 to determine a behavior-awareness state 102 indicative of a likelihood that the temporal event sequence 115 is indicative of abnormal behavior at the site 108. The temporal behavior pattern(s) 124 and the corresponding behavior-awareness states 102 are collectively referred to herein as temporal behavior data 127. Each temporal behavior pattern 124 defines a temporal relationship of events for a group of the security devices 106, where the corresponding behavior-awareness state 102 may indicate a level of concern that a matched temporal event sequence 115 resulted from abnormal behavior near the security devices 106.

In one embodiment, the temporal behavior pattern 124 defines, for a particular group of the security devices 106 (e.g., the security devices 106(1)-(3) of the site 108(1)), an ordered sequence of events and their temporal characteristics (e.g., a range of time that may occur between events). The event analyzer 122 may then compare the temporal event sequence 115, based on the event signals 114 received from the group of security devices 106, to the temporal behavior pattern 124 to determine the site behavior-awareness state 132. In some embodiments, the temporal event sequence 115 may be considered to match the temporal behavior pattern 124 when the events, and relative timing thereof, contained within the temporal event sequence 115 most closely corresponds to the events, and relative timing thereof, as defined within the temporal behavior pattern 124. For example, to be considered matching, the events in the temporal event sequence 115 will have substantially the same order and/or will have similar temporal characteristics as the events defined within the temporal behavior pattern 124.

Certain of the temporal behavior patterns 124 may be predefined for known abnormal behavior. The following are examples for a smart video doorbell-type security device, but other similarly positioned devices may operate likewise. If a person approaches a front door (where the security device 106 is located) and then runs away, they may be stealing a previously delivered package, which may be considered abnormal behavior. This type of behavior may be identified within captured video data of the security device 106. Where someone approaches the door, but does not ring the doorbell and/or knock, this behavior may be detected in the video and audio data from the security device 106, and may be considered abnormal behavior. Further, where a person appears to be peering through windows of the house, this behavior may be detected within the video data and may be considered abnormal behavior. In another example, where a person approaches the door, recognizes the security device 106, and then immediately leaves, this behavior may be identified within the video data and may be considered abnormal behavior. In another example, where a person approaches the door and covers or attempts to tamper with the security device 106, this behavior may be detected within the video and audio data and may be considered abnormal behavior. In another example, where the security device 106 captures audio data of glass breaking or captures audio data of a door being forced open and/or broken down, the audio data may be analyzed to determine that the sounds are indicative of abnormal behavior. In another example, where a person is wearing sunglasses at night, this behavior may be considered abnormal. Where a person is wearing clothing (e.g., a hoodie, a scarf, and so on) such that their face is not revealed, this behavior may be considered abnormal, particularly when the ambient conditions are such that a person would be unlikely to cover their face (e.g., when the weather is warm). All of these types of abnormal behavior may be identified within video and/or audio data from the security device 106, and may be matched to one or more of the temporal behavior patterns 124 with a corresponding behavior awareness state of high corresponding to the abnormal behavior. Such temporal behavior patterns 124 may, in some embodiments, be predefined for the security device 106, and different temporal behavior patterns 124 may predefined for different types of security devices 106.

The back-end server 120 also may include a real-time clock 126 that may be read by the event analyzer 122 to determine a current time. The temporal behavior patterns 124 may also define at least one operational time range during which the event analyzer 122 may match the temporal event sequence 115 to the temporal behavior pattern 124. For example, the temporal behavior pattern 124 may define an operation range of 8:00 AM through 10:00 AM, Monday through Friday, for a sequence of events that are considered normal as a family leaves a property to go to work and to school. For example, at mid-day, it may be more likely to have more vehicles passing the site 108 than at three in the morning. Similarly, it is more likely that pedestrians would pass the site 108 during daylight hours than at night, particularly between 2:00 AM and 5:00 AM.

In one embodiment, the event analyzer 122 uses the current time, read from the real-time clock 126, to determine a significance of the temporal event sequence 115. In another embodiment, the event analyzer 122 may determine a likelihood that the temporal event sequence 115 is significant or not based upon indicated ambient light levels received within the corresponding event signals 114 from at least one security device 106.

Where the event analyzer 122 receives, from a particular group of the security devices 106, event signals 114 defining a temporal event sequence 115 that does not match any temporal behavior pattern 124, the event analyzer 122 may, based upon the real-time clock 126, consider those events as abnormal behavior. In response, the event analyzer 122 may increase a site behavior-awareness state 132 corresponding to that group of devices, and/or increase an area behavior-awareness state 134 corresponding to the area 104 containing those devices. As described below, for a repeating pattern of the temporal event sequences 115, the system 100 may learn that the temporal event sequence 115 is normal behavior. See Learning Temporal Behavior Patterns below.

In one embodiment, the event analyzer 122 may also correlate a temporal event sequence 115 determined from the event signals 114 received from the security devices 106 within the area 104 based upon proximity and/or geographic location of the security devices 106. For example, the event analyzer 122 may consider a temporal event sequence 115 received from the security devices 106 that are located close together as being of more concern than when the temporal event sequence 115 is received from devices that are farther apart. (See Neighborhood Operation below.)

The temporal behavior patterns 124 may be predefined, may be determined from training of the system 100, and/or may be learned over time by the system 100. When in normal operating mode, the event analyzer 122 matches the received temporal event sequence 115 to the temporal behavior patterns 124 to determine a corresponding behavior-awareness state 102. Where the temporal event sequence 115 is received from the security devices 106 located at a single site 108, the event analyzer 122 may set the site behavior-awareness state 132 for that site to the determined behavior-awareness state 102. In one embodiment, the system 100 determines an area behavior-awareness state 134 for the area 104 when the temporal event sequence 115 is matched to the temporal behavior pattern 124 corresponding to the area 104.

The event analyzer 122 may send a message/notification 138(1) to at least one party 140(1) (e.g., owner, renter, worker) associated with the first site 108(1) when the site behavior-awareness state 132 of the first site 108(1) changes. In another embodiment, the system 100 sends the message/notification 138(1) to at least one party 138 associated with the first site 108(1) and sends the message/notification 138(2) to at least one party 140(2) associated with the second site 108(2) when the area behavior-awareness state 134 for the area 104 (e.g., a neighborhood or community) changes. That is, the system 100 may send the notification 138 to multiple parties associated with a neighborhood (the area 104) when abnormal behavior is detected and the area behavior-awareness state 134 changes. In one embodiment, for the area 104, the parties 140 may include owners of the security devices 106 that are configured to operate with the back-end server 120. In another embodiment, for the area 104, the parties 140 may include all registered members of a neighborhood (e.g., through a homeowners association or the like), even when they do not have any of the security devices 106 configured to operate with the back-end server 120. In another embodiment, the event analyzer 122 may send the message/notification 138(1) to at least one party 140(1) when the temporal event sequence 115 matches one of the temporal behavior patterns 124.

In one example embodiment, at least one of the temporal behavior patterns 124 evaluates event signals 114 for certain of the security devices 106 located at different sites 108. The temporal behavior pattern 124 may further define that corresponding captured images (e.g., included within each of the event signals 114) include the same object (e.g., a person, a vehicle, and so on) based upon image recognition (e.g., facial recognition, vehicle recognition, license plate recognition, and so on). For example, where a person is detected passing through or near two different sites 108(1) and 108(2) within a certain period (e.g., five minutes) and the event analyzer 122 recognizes the same face within images captured by the different security devices 106, the system 100 may increase the level of concern by increasing the area behavior-awareness state 134 from low to medium, or from medium to high, or from low to high. Further, where two or more of the security devices 106 at the sites 108 detect the person and the event analyzer 122 recognizes that it is the same person, and where a location of at least one of the security devices 106 indicates that the person must have crossed a boundary line (e.g., a property line) of the site 108 (e.g., the person is detected by the security device 106 located at the rear of the property), then the system 100 may further increase the level of concern.

In certain embodiments, the temporal behavior pattern 124 may be configured to recognize objects that are authorized to move within the area 104, and are not considered to be of concern. For example, the temporal behavior pattern 124 corresponding to certain of the security devices 106 within the area 104 may be configured to recognize persons known to be authorized within the area 104, such as the party 140 (e.g. site owner), other occupants/tenants of the area 104, a mail delivery person, a utility company employee, etc. When the authorized person is recognized, the system 100 may not increase the alert level (e.g., one or both of the site behavior-awareness state 132 and the area behavior-awareness state 134 may remain unchanged).

Learning Temporal Behavior Patterns

The back-end server 120 may also include a learning algorithm 128 that identifies behavioral patterns of the temporal event sequences 115 of events received within the event signals 114 over time (e.g., days, weeks, months, years) and creates at least one new temporal behavior pattern 124. For example, based upon a current time determined from the real-time clock 126, events detected within the area 104 for a certain group (e.g., based upon location, site, area, etc.) of the security devices 106 and received as event signals 114, and a known geographic relationship and/or grouping of the security devices 106, the learning algorithm 128 may generate at least one new temporal behavior pattern 124 with a corresponding behavior-awareness state 102. In some embodiments, the learning algorithm 128 may comprise training, in which the system 100 is set to a learning mode or training mode, and then a person or persons perform(s) one or more staged events within the site(s) 108 and/or area(s) 104. For example, where an operator sets an operating mode 130 of the system 100 to a "normal behavior learning mode," the learning algorithm 128 sets the behavior-awareness state 102 to "low" for any temporal behavior pattern 124 learned from events within the received event signals 114. In another example, where the operator sets the operating mode 130 to an "abnormal behavior learning mode," the learning algorithm 128 sets the behavior-awareness state 102 to "high" for any temporal behavior pattern 124 learned from events within the received event signals 114.

Figure 2:
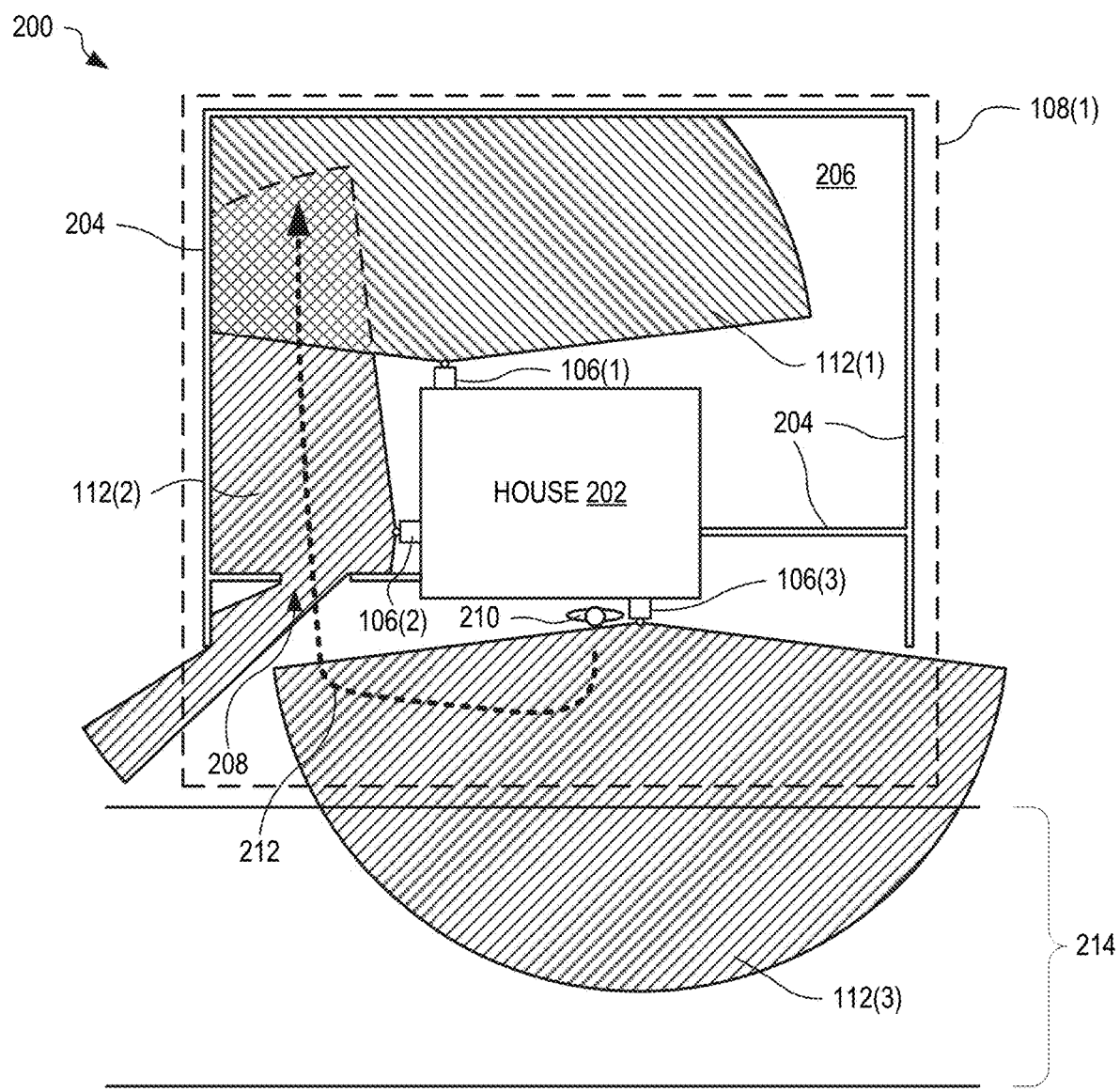
FIG. 2 is a schematic diagram illustrating one example of a normal behavior scenario for one of the sites of FIG. 1, in an embodiment.

FIG. 2 shows one example of a normal behavior scenario 200 for the site 108(1) of FIG. 1. In the example of FIG. 2, the security device 106(1) is a smart camera positioned on a back wall of a house 202 on the site 108(1), the security device 106(2) is a smart floodlight positioned on a sidewall of the house 202, and the security device 106(3) is a smart doorbell positioned at a front door of the house 202. The site 108(1) has a fence 204 surrounding a back yard 206, with a single gateway 208 providing access to the back yard 206 from the front of the house 202. The site 108 also faces a street 214 where at least part of the zone 112(3) covers at least part of the street 214, such that the security device 106(3) may detect motion on the street 214.

Prior to performing the scenario 200, a user and/or operator of the system 100 switches an operating mode 130 of the system 100 into a normal behavior learning mode for the security devices 106(1)-(3) that are an identified group corresponding to the site 108(1). For example, the user and/or operator of the system 100 may change the operating mode 130 of the system 100 using an application executing on a client device, such as a smartphone. In one embodiment, the user and/or operator initiates the normal behavior learning mode for the site 108(1), wherein the system 100 determines that the security devices 106(1)-(3) are located at the site 108(1), groups them accordingly, and sets the operating mode 130 to the normal behavior learning mode. For example, the user and/or operator, using the application executing on the client device, may input a command (e.g., by selecting a menu option or selecting a button) to train all of his or her security devices 106. The system 100 may then identify the security devices 106(1)-(3) as corresponding to the user and being located at the same site 108(1), group them accordingly, and set the operating mode 130 for each of the security devices 106(1)-(3) to the normal behavior learning mode.

In the scenario 200, after the operating mode 130 is set to the normal behavior learning mode, a person 210 exits the house 202 via the front door and proceeds, as indicated by the arrow 212, around a front corner of the house 202, through the gateway 208, along a side of the house 202, and into the back yard 206. First, the security device 106(3) detects motion as the person 210 enters the zone 112(3) and sends the event signal 114(3) (FIG. 1) to the back-end server 120 indicating the detected motion. Next, the security device 106(2) detects motion as the person 210 moves toward and through the gateway 208, and sends the event signal 114(2) to the back-end server 120 indicating the detected motion. Then, the security device 106(1) detects motion as the person 210 enters the zone 112(1) and sends the event signal 114(1) to the back-end server 120 indicating the detected motion. Each security device 106 may send additional information within the corresponding event signal 114, such as an identifier that uniquely identifies the security device 106 to the back-end server 120, a geographic location of the security device 106, ambient conditions near the security device 106 (e.g., lighting conditions), a time of the event, image(s) of the event, and so on.

The learning algorithm 128 processes the event signals 114(1)-(3) and a time of receipt for each based upon the real-time clock 126 (or using a time encoded within each event signal 114) to form the temporal event sequence 115, and then uses the temporal event sequence 115 to generate a new temporal behavior pattern 124 for the security devices 106(1)-(3) with a corresponding behavior-awareness state 102 of "low," since the operating mode 130 is set to the normal behavior learning mode. Particularly, the temporal nature of the events within the received event signals 114 may indicate a direction of movement as the person 210 passes from the zone 112(3), to the zone 112(2), and then to the zone 112(1). Thus, through the generated temporal behavior pattern 124, the system 100 learns that movement in this direction is considered normal behavior at the site 108(1). In certain embodiments, the system 100 may also learn that the movements are considered normal behavior for a particular time of day. For example, the user may qualify when the demonstrated behavior may be considered normal. The system 100 may then set the operating mode 130 back to the normal operational mode and resume normal operation for the site 108(1).

In certain embodiments, security devices 106 located at different sites 108 may be collectively used for learning a new temporal behavior pattern 124. For example, where the two sites 108(1) and 108(2) within the area 104 are near one another (e.g., within the same neighborhood), the security devices 106(1)-(4) may be collectively used to learn a new temporal behavior pattern 124 for modelled movement between the two sites 108. In another example, where the security devices 106 of different sites 108 include different areas of the same neighborhood street within their corresponding zones 112, these security devices 106 may be collectively used to determine a new temporal behavior pattern 124 based upon modelled movement along the street.

Figure 3:
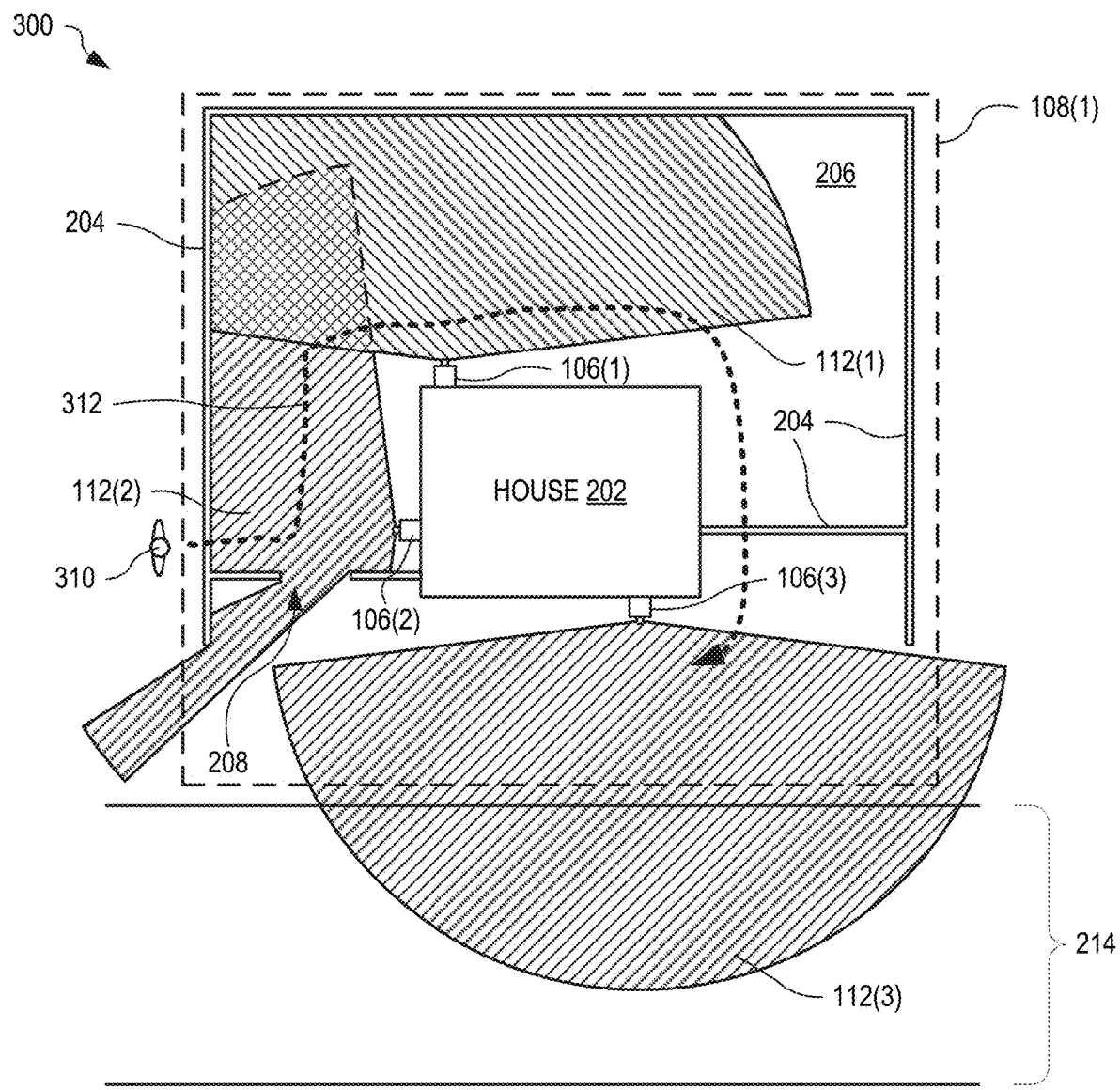
FIG. 3 is a schematic diagram illustrating one example of an abnormal behavior scenario for the site of FIG. 2, in an embodiment.

FIG. 3 shows one example abnormal behavior scenario 300 for the site 108(1) of FIG. 1. For the scenario 300, the security devices 106 and the site 108 are the same as those shown in the scenario 200 of FIG. 2. Prior to performing the scenario 300, a user and/or operator of the system 100 sets the operating mode 130 into an abnormal behavior learning mode for the security devices 106(1)-(3) that are an identified group corresponding to the site 108(1).

In the scenario 300, while the operating mode 130 is set to the abnormal behavior learning mode, a person 310 climbs over the fence 204 at the side of the site 108(1) and proceeds, as indicated by the arrow 312, alongside the house 202, into the back yard 206, and then around to the front of the house 202. The movement indicated by the arrow 312 is considered abnormal behavior for the site 108(1), and may represent movement of a person intending to burgle, or otherwise cause problems at, the site 108(1). As the person 310 crosses the fence 204, the security device 106(2) detects motion and generates the event signal 114(2) (FIG. 1) and sends it to the back-end server 120. Then, as the person 310 progresses along the path indicated by the arrow 312, the security device 106(1) detects motion and generates the event signal 114(1) and sends it to the back-end server 120. As the person 310 continues around the house 202, as indicated by the arrow 312, and crosses the front of the house 202, the security device 106(3) detects motion and generates the event signal 114(3).

The learning algorithm 128 processes the event signals 114(1)-(3) and a time of receipt of each signal 114 based upon the real-time clock 126 (or using a time encoded within each event signal 114) and generates a new temporal behavior pattern 124 for the security devices 106(1)-(3) with a corresponding behavior-awareness state 102 of "high," since the system 100 is in the abnormal behavior learning mode. Particularly, the temporal nature of the received event signals 114 may indicate a direction of movement as the person 310 passes from zone 112(2) to zone 112(1). However, an order of the events detected by the security devices 106(1)-(3) indicates that the behavior of the person 310 is considered abnormal. Thus, through the generated temporal behavior pattern 124 for the scenario 300, the system 100 learns that motion detected in the order defined by the arrow 312 is considered abnormal behavior at the site 108(1). The system 100 may then transition out of the abnormal behavior learning mode, wherein the operating mode 130 is set to normal operational mode.

An owner of the security devices 106(1)-(3), and/or an operator of the system 100, may thus teach the system 100 one or more differences between normal behavior and abnormal behavior at the site 108(1). For example, the owner or the operator may provide the system 100 with multiple examples of normal behavior and multiple examples of abnormal behavior at the site 108(1). Accordingly, when the operating mode 130 is set to the normal operational mode, the system 100 may discern between normal behavior and abnormal behavior at the site 108(1).

Learning During Normal Operation

The system 100 may also learn temporal behavior patterns 124 corresponding to normal behavior at the site 108(1) when the operating mode 130 is set to normal (e.g., during normal operation of the system 100). For example, over time (e.g., several days or weeks), the learning algorithm 128 may determine one or more of the temporal behavior patterns 124 from the event signals 114(1)-(3) received for the site 108(1). For example, certain of the temporal behavior patterns 124 may occur during certain periods of a day, or may only occur on certain days of the week, as people living and/or working at the site 108(1) leave, return, and perform normal activities. The learning algorithm 128 may therefore generate the temporal behavior patterns 124 that may be matched to the event signals 114 received at certain times of the day and/or on certain days of the week. The learning algorithm 128 may also generate the temporal behavior patterns 124 that may be matched to the event signals 114 at any time of the day or week.

In certain embodiments, the back-end server 120 may recognize a potential temporal behavior pattern based on, for example, a sequence of events 114 observed by multiple security devices 106, particularly when the sequence of events is repeated. The back-end server 120 may then send a request to the user (e.g., via a client device) with the parameters (e.g., the sequence of events in the potential temporal behavior pattern). The request may ask the user if s/he wants to set the potential temporal behavior pattern as an actual temporal behavior pattern 124. If the user replies in the affirmative (e.g., with a reply signal sent via the client device), the back-end server 120 may store the potential temporal behavior pattern as a new temporal behavior pattern 124.

In certain embodiments, the back-end server 120 may also be preconfigured with one or more temporal behavior patterns 124 that correspond to perceived abnormal behavior at each site 108 and/or for each security device 106. For example, where the site 108(1) is residential, the temporal behavior patterns 124 may be defined with a high behavior-awareness state 102 for any detected motion during certain hours, such as, for example, between 1:00 AM and 6:00 AM. The learning algorithm 128 may also adjust these temporal behavior patterns 124 based upon determined activity at the site 108(1) over time. For example, where the learning algorithm 128 determines that there is substantially no activity between the hours of 10:00 PM and 5:00 AM at the site 108(1), the learning algorithm 128 may adjust one or more of the temporal behavior patterns 124 to cover the identified period. Thus, over time (e.g., days, weeks, months, and/or years), the learning algorithm 128 may adjust, cancel, or generate the temporal behavior patterns 124 based upon the received event signals 114 (and the temporal event sequence(s) 115 thereof) for the site 108. Thus, as behavior at the site 108(1) gradually changes over time, the system 100 may automatically learn the changed behavior and adjust the temporal behavior patterns 124 accordingly. In certain embodiments, the back-end server 120 may interact with the corresponding party 140 (e.g., owner) where a temporal event sequence 115 is identified as repeating behavior to ask whether the party wants to make it a pattern, and may allow the party to define it as either normal or abnormal behavior.

In one example of operation, the back-end server 120 receives a plurality of the event signals 114 from the security devices 106(1)-(3) while the operating mode 130 is set to normal operational mode. Within the back-end server 120, the event analyzer 122 attempts to match the received event signals 114 to one or more of the temporal behavior patterns 124. Where the event analyzer 122 successfully matches the received event signals 114 to at least one of the temporal behavior patterns 124, the event analyzer 122 may set the site behavior-awareness state 132 to the behavior-awareness state 102 corresponding to the matched temporal behavior pattern 124. For example, where the event analyzer 122 matches the received event signals 114 to one temporal behavior pattern 124 corresponding to scenario 300, the event analyzer 122 sets the site behavior-awareness state 132 to high for the site 108(1).

Figure 4:
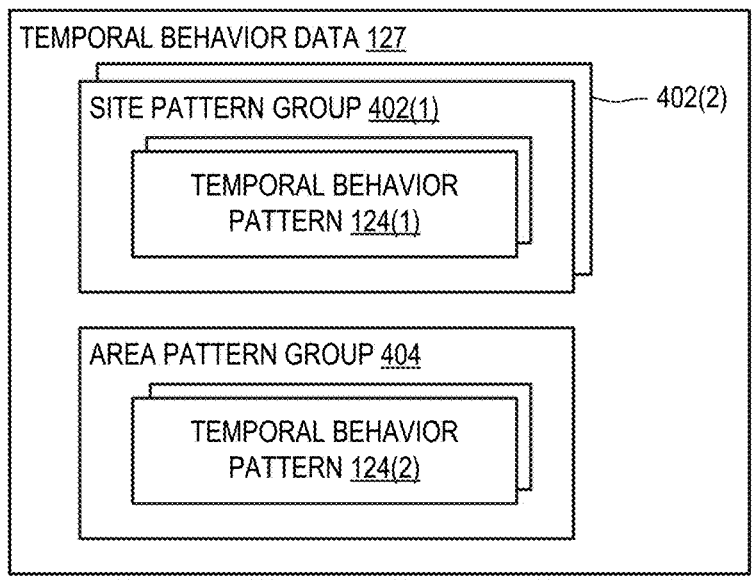
FIG. 4 is a functional block diagram illustrating the temporal behavior data of FIG. 1 in further example detail illustrating grouping of temporal behavior patterns into (a) one or more site pattern groups and (b) an area pattern group, in an embodiment.

FIG. 4 shows the temporal behavior data 127 in further example detail illustrating grouping of the temporal behavior patterns 124 into one or more site pattern groups 402 and an area pattern group 404. Using the example of FIG. 1, the site pattern group 402(1) corresponds to the site 108(1) of FIG. 1, and includes the temporal behavior patterns 124 related to the security devices 106(1)-(3) of the site 108(1). Similarly, the site pattern group 402(2) corresponds to the site 108(2) and includes the temporal behavior patterns 124 related to the security device 106(4) of the site 108(2).

Figure 5:
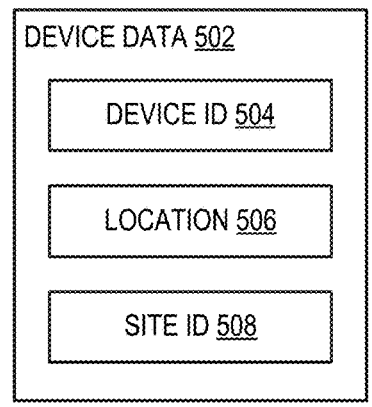
FIG. 5 is a functional block diagram illustrating example device data stored within the server of FIG. 1 for each device, in an embodiment.

FIG. 5 shows example device data 502 stored within the back-end server 120 for each security device 106. For example, to interact with the back-end server 120, each security device 106 may be registered such that the back-end server 120 may identify the event signals 114 as coming from a particular security device 106. The device data 502 may include a device ID 504 that uniquely identifies one of the security devices 106, a location 506 that defines a geographic or relational location of the security device 106 identified by the device ID 504, and a site ID 508 that uniquely identifies one of the sites 108.

Figure 6:
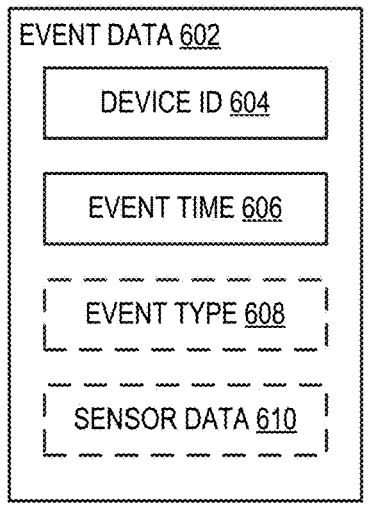
FIG. 6 is a functional block diagram illustrating example event data stored within the server of FIG. 1 and processed by the event analyzer for the event signal, in an embodiment.

FIG. 6 shows example event data 602 stored within the back-end server 120 and processed by the event analyzer 122 for the event signal 114. The event data 602 includes a device ID 604 that corresponds to the device ID 504 of the device data 502 of FIG. 5, and an event time 606 that represents a time of the detected event. In certain embodiments, where event time 606 is not received within the event signal 114, the event analyzer 122 may set the event time 606 to a current value of the real-time clock 126 when the event signal 114 is received at the back-end server 120. The event data 602 may also include an event type 608 that defines a type of event detected by the corresponding security device 106. For example, where the security device 106 has multiple sensors 110, the event type 608 may indicate which one or more of the multiple sensors 110 detected the event indicated in the event signal 114. The event data 602 may also include sensor data 610, received within the event signal 114, and captured by a corresponding sensor 110 of the security device 116. For example, the sensor data 610 may be image data captured by an image sensor of the security device 106 at the time when the motion was detected. In another example, the sensor data 610 may contain a digitized audio sample captured at the time of the event by the sensor 110 of the security device 106.

The event analyzer 122 may use at least part of the temporal behavior data 127, the device data 502, and/or the event data 602 to determine the site behavior-awareness state 132 and/or the area behavior-awareness state 134 (FIG. 1).

Neighborhood Operation

Figure 7:
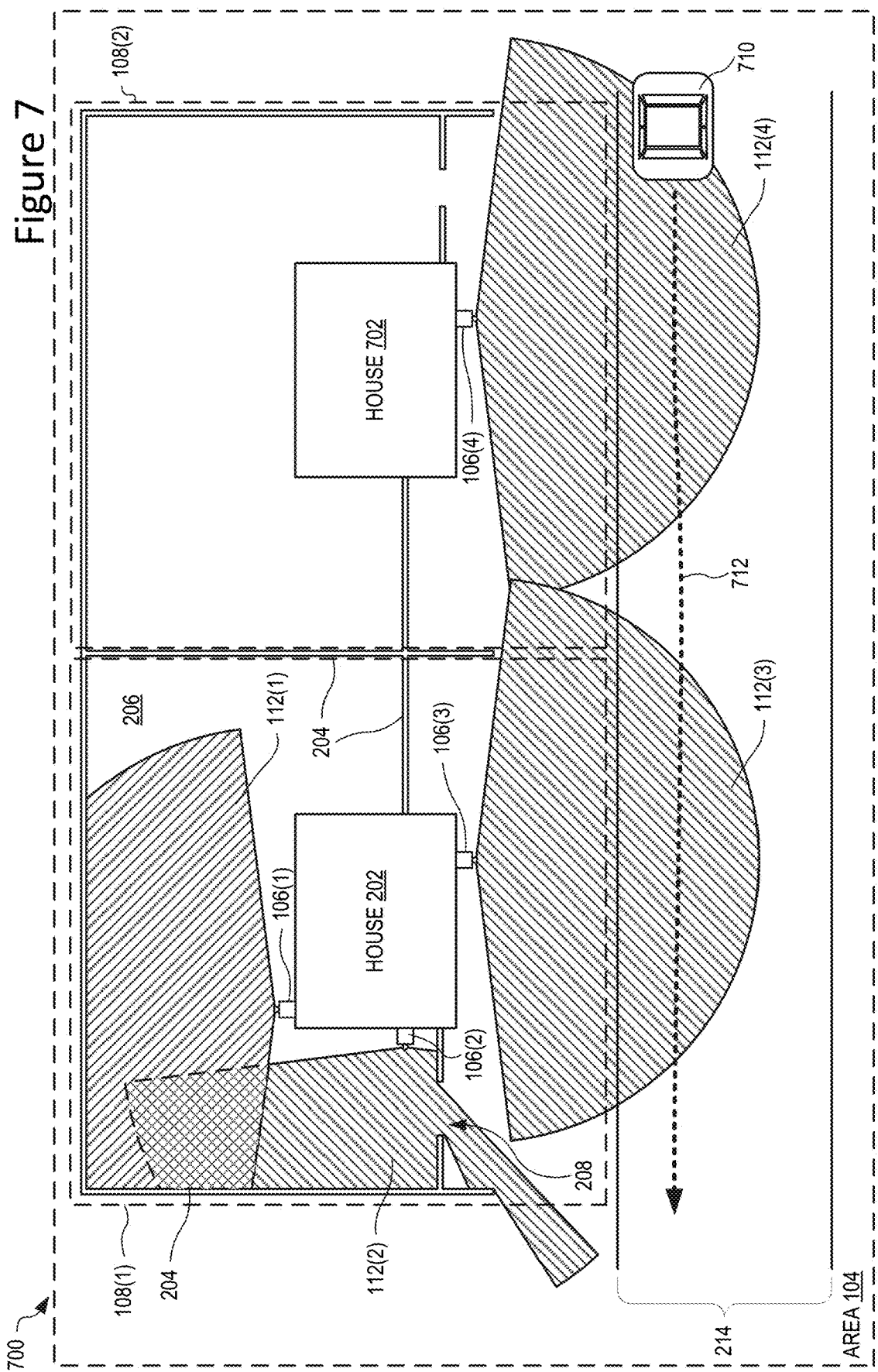
FIG. 7 is a schematic diagram illustrating one example scenario where the system of FIG. 1 determines the area behavior-awareness state for the area using a plurality of devices located at different sites, in an embodiment.

FIG. 7 shows one example scenario 700 where the system 100 determines the area behavior-awareness state 134 for the area 104 having a plurality of the security devices 106. Continuing with the example of FIG. 1, the area 104 includes the site 108(1) and the site 108(2). For the site 108(1), the security devices 106(1)-(3) and the house 202 are the same as shown in the scenario 200 of FIG. 2. Particularly, as noted above, the site 108 faces the street 214 and the security device 106(3) is positioned such that it detects motion on the street 214. The scenario 700 shows the site 108(2) of FIG. 1 in further example detail including a house 702 with the security device 106(4) positioned at the front to face the street 214. Although in the example of the scenario 700 the sites 108(1) and 108(2) are adjacent one another, sites need not be adjoining. In certain embodiments, the system 100 determines locations of each of the sites 108 (e.g., from information provided by users during the process of setting up or registering each security device 106, or from a remote server such as a web-map server), such that the system 100 may be aware of geographical relationships between properties, and thereby between the security devices 106.

The security device 106(4) is, for example, a smart doorbell. Particularly, the security device 106(4) is positioned to detect motion on the street 214. Although a vehicle 710 is shown in the example of FIG. 7, the scenario 700 may also apply to people or other objects that move along the street 214 without departing from the scope of the present embodiments.

As shown in the scenario 700, as the vehicle 710 drives down the street 214, it is first detected by the security device 106(4) as it passes through the zone 112(4). Accordingly, the security device 106(4) sends the event signal 114(4) to the back-end server 120 indicating the detected motion. As the vehicle 710 continues down the street 214, as indicated by the arrow 712, the security device 106(3) detects motion as the vehicle 710 moves into the zone 112(3). Accordingly, the security device 106(3) sends the event signal 114(3) to the back-end server 120 indicating the detected motion.

Within the back-end server 120, the event analyzer 122 processes the event signals 114(4) and 114(3) against the temporal behavior patterns 124 for the area 104 to determine the area behavior-awareness state 134 of the area 104. Each of the temporal behavior patterns 124 of the area pattern group 404 define a relationship of events detected by the security devices 106 that are proximate to one another, or that have a relationship between motion detected by both devices. In the example of FIG. 7, at least one temporal behavior pattern 124 of the area pattern group 404 corresponds to both the security device 106(3) and the security device 106(4) and may be used to determine a corresponding area alert 134 for the event signals 114(3) and 114(4) received from both the security device 106(3) and the security device 106(4), respectively. Particularly, since the security devices 106(3) and 106(4) are owned and/or operated by different entities (e.g., an owner of site 108(1) runs the security device 106(3) and an owner of site 108(2) runs the security device 106(4)), the functionality for providing the area alert 134 may only be realized by the back-end server 120.

In one embodiment, the security device 106(4) may determine that the detected motion resulted from the vehicle 710. For example, the security device 106(4) may use image processing (or other processing/algorithms) to distinguish between animals, people, and vehicles when detecting motion, and may provide information for the event type 608 (FIG. 6) indicating that the detected motion corresponds to the vehicle 710. In certain embodiments, the security device 106(4) may provide information for the sensor data 610 that may be used to identify the vehicle 710 within the back-end server 120. For example, the security device 106 may include at least one image, captured at the time of the event, within the event signal 114 to allow the event analyzer 122 to identify the moving object. In one embodiment, when the security device 106 sends multiple images within the event signal 114, the event analyzer 122 may compare these images to one another to isolate and identify the moving object. Images may be compared at a low detail level when identifying a vehicle. For example, when an overall shape and color of vehicles within separate images from separate security devices 106 match one another, they may be considered identical. That is, the event analyzer 122 may not use fine details when matching images, since, based upon the location of each of the security devices 106, captured images may have different perspectives, ranges, and have varying detail.

Continuing with the scenario 700, where the event analyzer 122 periodically (e.g., every few minutes) receives the event signals 114(3) and 114(4) from the security devices 106(3) and 106(4), respectively, indicating vehicle motion detected, the event analyzer 122 may determine, by processing the corresponding sensor data 610 of each received event signal 114 from security device 106(4) and/or security device 106(3) for example, that the same vehicle is repeatedly driving along the street 214. Repeated behavior of one vehicle is of greater concern, as compared to different vehicles driving down the street 214, because such behavior may indicate that the occupant(s) of the vehicle is/are observing one or more properties along the street looking for a suitable property to burglarize ("casing" the neighborhood). For example, one or more of the temporal behavior patterns 124 may be configured to match repeated behavior for any one or more of the security devices 106. That is, the temporal behavior pattern 124 may match the temporal event sequences 115 derived from the repeating pattern of the event signals 114 when they contain the same identified object for the same group of the security devices 106, irrespective of how many and which ones of the security devices 106 form the group. The event analyzer 122 may accordingly increase the area behavior-awareness state 134 in response to observing such repeated behavior, setting it to medium or high for example, and notifying persons (e.g., owners, residents, and users) within the area 104 of the increased behavior-awareness state (e.g., with push notifications sent to one or more client devices). Optionally, the notification may include one or more images of the identified vehicle captured by the security device 106(4) and optionally processed by the event analyzer 122.

Where the area 104 covers many different streets, and/or includes many different security devices 106, based upon an increase in the area behavior-awareness state 134, the event analyzer 122 may track movement of the identified vehicle through multiple streets. Accordingly, the event analyzer 122 may develop a more complete picture of movement of the identified vehicle over time.

The learning algorithm 128 may also learn of repeated vehicle movements within the area 104. For example, where a postal delivery van passes through the area 104 at certain times of the day, the learning algorithm 128 may generate at least one temporal behavior pattern 124 matching detected events corresponding to movement of the vehicle, and assign the temporal behavior pattern 124 a behavior-awareness state 102 of "low" concern, since the postal delivery is considered a normal activity. The system 100 may thereby learn of normal behavior within the area 104 such that when detected, this normal behavior does not raise the area behavior-awareness state 134. However, when the event analyzer 122 detects a pattern of events that does not match any of the temporal behavior patterns 124, then the event analyzer 122 is immediately aware of activity that may be abnormal, may raise the area behavior-awareness state 134 to indicate greater concern (e.g., medium or high), and may generate one or more notifications 138 to persons (e.g., users) within the area 104 and/or may generate a notification 144 to a third party 146 (e.g., a private security agency and/or law enforcement) indicating the abnormal behavior within the area 104.

Multi-Modal Devices

As described above, the security device 106 may represent one of a smart doorbell, a smart camera, and a smart floodlight (or any other kind/type of security device). Each security device 106 may therefore include multiple sensors, such as a video camera, a microphone, and passive infrared (PIR) sensors. Each security device 106 may detect movement based upon images from the video camera and/or outputs from the PIR sensors. Similarly, the security device 106 may detect sounds from the zone 112 that may be used to quantify and/or qualify any detected movement or event within the corresponding zone 112. For example, where a camera of the security device 106 detects movement of a vehicle, sound captured by the microphone of the security device 106 may be used to confirm that the moving object is a vehicle by detecting engine noise within sound captured at the time of the movement detection. Similarly, a microphone of the security device 106 may detect a loud noise, but images from a camera of the security device 106 may indicate that the noise is not from the corresponding zone 112.

Advantageously, the multimodal nature of the security device 106 provides a significant advantage over conventional security systems that capture only video images. First, the security device 106 may be configured to autonomously detect motion, using either the video camera or the PIR sensors. Further, the security device 106 may capture and send additional information to the back-end server 120, thereby allowing the event analyzer 122 to better identify events of interest and ignore events that are not of interest. In one embodiment, the temporal behavior pattern 124 may also include sound data, whereby the system 100 may recognize certain sounds as being indicative of normal behavior, such that any unmatched sound may be considered as resulting from abnormal behavior.

Where the security device 106 is smart (e.g., one of a smart doorbell, a smart camera, and a smart floodlight), the security device 106 may automatically adjust to capture information according to ambient conditions. For example, the security device 106 may include at least one infrared emitter (e.g., a light emitting diode) that is activated during low light conditions to enhance images captured by the camera. In another example, the camera of the security device 106 may be switchable into a low light mode of operation to capture better quality images during low light conditions.

In embodiments where the security device 106 is battery powered, motion may be primarily detected using PIR sensors, since these sensors require less power to operate that a camera. Upon detecting motion using the PIR sensors, the security device 106 may then activate the camera to capture images of, and/or activate the microphone to capture sound in, the corresponding zone 112. Advantageously, the PIR sensors detect heat signatures even during low light conditions. Thus, the security device 106 more reliably detects motion at night as compared to conventional security devices that use only cameras. In another embodiment, the security device 106 may also be activated by sound. For example, the security device 106 may detect a loud noise within the corresponding zone 112, and then activate a camera to capture images of the zone. More particularly, by acting autonomously to detect events (heat signature, motion, noise, etc.), the security device 106 reliably notifies the server 120 of events within the zone 112, and thus the server 120 is not required to continuously process data to identify events of interest within raw sensor feeds. The back-end server 120 may thus only be notified when an event of interest has occurred. The event analyzer 122 may then determine whether the event is from normal behavior or whether the event is from abnormal behavior based upon events detected by other security devices 106 in the same area. Further, the additional information captured by the multi-modal sensors of the security devices 106 facilitate learning of normal behavior, since the additional sensor information may allow the learning algorithm 128 to qualify events to determine normal and/or abnormal behavior.

The back-end server 120 may receive events from the security devices 106 based upon one or more of sounds, heat signature, daylight images, and infrared (low light) images. Such input provides significantly more information than that available from conventional camera security systems that typically have continuously activated cameras and thus provide continuous data streams that require continuous processing.

Connecting to Other Devices

In one embodiment, the system 100 receives the event signals 114 from multiple security devices 106 that have similar capability and/or functionality. In one example, the system 100 may be configured to operate only with smart doorbell-type security devices 106, such as the example doorbell 1530 shown in FIG. 15. In another example, the system 100 may be configured to operate only with devices (see FIGS. 12-16 and accompanying description) of similar capability, such as one or more of a smart doorbell, a smart floodlight controller, and a smart security camera, that each have similar motion detect, image capture, and audio capture capability. Where the system 100 includes only the security devices 106 with the same or similar capability (e.g., camera image capture), the system 100 may provide a more defined and consistent analysis and behavior-awareness state determination. For example, such devices may enable advanced analysis by the event analyzer 122 through use of image recognition and identification of unusual repeated activity by the same entity (vehicle or person) within the area 104.

In other embodiments, the system 100 may also connect with more conventional types of security devices, such as security cameras and alarm systems. The event analyzer 122 and the learning algorithm 128 may also use input from these other, more conventional types of devices to learn and identify the temporal behavior patterns 124. Any device that is able to send, directly or indirectly, the event signals 114 to the back-end server 120 may be configured for operation therewith. For example, where a device may capture information useful to the system 100, an owner of that device may enroll (e.g., register) that device with the back-end server 120. For example, irrespective of the brand of smart doorbell used at a site, the operator of the device (e.g., homeowner, renter, or business manager) may register that device with the back-end server 120 and configure the device to send the event signals 114 to the back-end server 120.

When registering the device with the back-end server 120, the homeowner may provide a unique identification number (e.g., one or more of a serial number, type, and brand) that the device includes within the event signals 114 to identify itself to the back-end server 120. The homeowner may also provide location information (e.g., an address of the site, a geographic latitude and longitude of the property, a map reference of the property, an identification of the property on an interactive map, and so on), capability of the device (e.g., the types of sensor(s) used and sensor data that may be provided), and one or more contacts (e.g., email addresses, mobile phone numbers, and so on) for notification of changes to the behavior-awareness states from the back-end server 120.

In one example, when the homeowner purchases the security device 106 (e.g., a new smart floodlight controller), the homeowner may opt in to either or both of (a) behavior-awareness state determination and notification (e.g., using multiple security devices 106 at the site 108), and (b) neighborhood behavior-awareness state determination and notification (e.g., providing input to, and receiving, the area behavior-awareness state 134 from the back-end server 120). An owner of the site 108 that has one or more of the security devices 106 need not participate in analysis and notification of the area behavior-awareness state 134. That is, the owner may opt out of participation in collective analysis for the area 104, while still receiving collective analysis for the site 108.

In certain embodiments, a homeowner or inhabitant within the area 104 may also register with the server 120 to receive the area behavior-awareness state 134 notifications, even when not contributing information to determination of the area behavior-awareness state 134. For example, where a site within the area 104 (e.g., a neighborhood) does not have a security device 106, they may still register to receive the notifications from the back-end server 120 when the area behavior-awareness state 134 changes.

Figure 8:
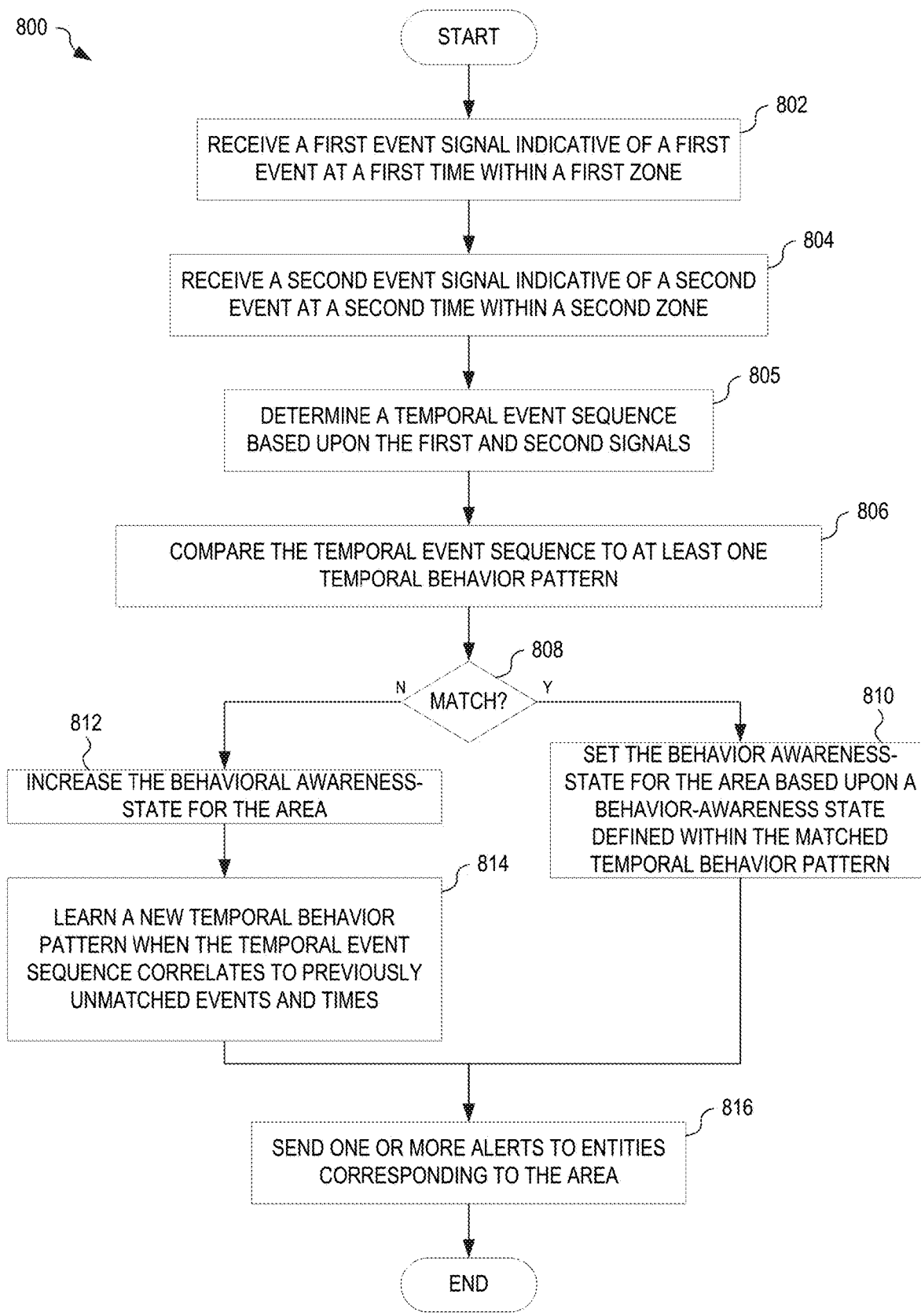
FIG. 8 is a flowchart illustrating one example method for determining a behavior-awareness state for an area having a plurality of devices, in an embodiment.

FIG. 8 is a flowchart illustrating one example method 800 for determining a behavior-awareness state for an area having a plurality of devices. The method 800 may be, for example, implemented within the back-end server 120 of FIG. 1, and particularly within the event analyzer 122 and the learning algorithm 128.

In block 802, the method 800 receives a first event signal indicating a first event at a first time within a first zone. In one example of block 802, the event analyzer 122 receives the event signal 114(2) (FIG. 1) from the security device 106(2) indicating a time of an event within the zone 112(2). In block 804, the method 800 receives a second event signal indicating a second event at a second time within a second zone. In one example of block 804, the event analyzer 122 receives the event signal 114(1) from the security device 106(1) indicating a time of an event within the zone 112(1). In block 805, the method 800 determines a temporal event sequence based upon the first and second signals. In one example of block 805, the event analyzer 122 generates a new temporal event sequence 115 based upon the event signal 114(2) and the event signal 114(1).

In block 806, the method 800 compares the temporal event sequence to at least one temporal behavior pattern. In one example of block 806, the event analyzer 122 compares the temporal event sequence 115 to at least one temporal behavior pattern 124.

Block 808 is a decision. If, in block 808, the method 800 determines that there is a match between the temporal event sequence and at least one temporal behavior pattern 124, the method continues with block 810; otherwise, the method 800 continues with block 812.

In block 810, the method 800 sets the behavior-awareness state for the area based upon a behavior-awareness state defined within the matched temporal behavior pattern. In one example of block 810, the event analyzer 122 sets the site behavior-awareness state 132 to the behavior-awareness state 102 of the matched temporal behavior pattern 124. The method 800 then continues with block 816.

In block 812, the method 800 increases the behavior-awareness state for the area. In one example of block 812, the event analyzer 122 increases the site behavior-awareness state 132 to medium, from low, when the temporal event sequence 115 does not match any of the temporal behavior patterns 124 and thereby indicates possible abnormal behavior at the site 108(1).

In block 814, the method 800 learns a new temporal behavior pattern when the first event, the first time, the second event, and the second time correlate to previously unmatched events and times. In one example of block 814, the learning algorithm 128 correlates the temporal event sequence 115 to previously unmatched temporal event sequences and generates a new temporal behavior pattern 124, based upon the temporal event sequence, with a new behavior-awareness state 102 of "low," indicating normal behavior for the site 108(1).

In block 816, the method 800 sends one or more alerts (e.g., notifications) to entities corresponding to the area. In one example of block 816, the event analyzer 122 sends the message/notification 138(1) to the party 140(1) (e.g., owner) indicating the site behavior-awareness state 132. The method 800 then terminates until invoked to process additional event signals.

Figure 9:
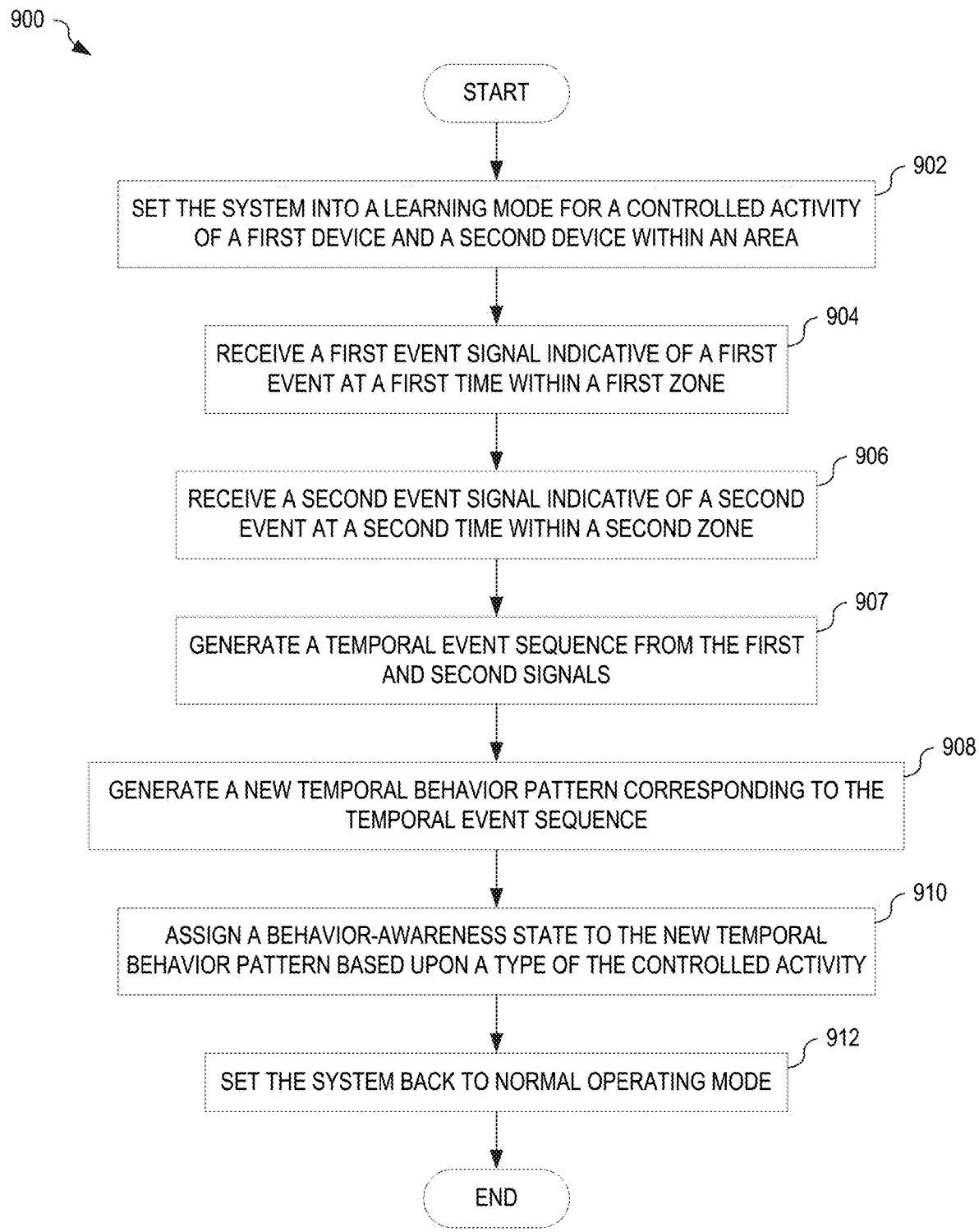
FIG. 9 is a flowchart illustrating one example method for learning new temporal behavior patterns, in an embodiment.

FIG. 9 is a flowchart illustrating one example method 900 for learning new temporal behavior patterns. The method 900 may be, for example, implemented within the learning algorithm 128 of the back-end server 120 of FIG. 1.

In block 902, the method 900 sets the system into a learning mode for a controlled activity of a first device and a second device within an area. In one example of block 902, the party 140(1) (e.g., owner) interacts with the learning algorithm 128 of the back-end server 120 to initiate a normal activity learning mode for the site 108(1).

In block 904, the method 900 receives a first event signal indicative of a first event at a first time within a first zone. In one example of block 904, the learning algorithm 128 receives the event signal 114(3) (FIG. 1) from the security device 106(3) indicating an event in the zone 112(3) at a first time. In block 906, the method 900 receives a second event signal indicative of a second event at a second time within a second zone. In one example of block 906, the learning algorithm 128 receives the event signal 114(2) from the security device 106(2) indicating an event in the zone 112(2) at a second time. In block 907, the method 900 generates a temporal event sequence from the first and second signals. In one example of block 907, the learning algorithm 128 generates the temporal event sequence 115 based upon the event signal 114(3) and the event signal 114(2).

In block 908, the method 900 generates a temporal behavior pattern corresponding to the temporal event sequence. In one example of block 908, the learning algorithm 128 generates a new temporal behavior pattern 124 corresponding to the temporal event sequence 115.

In block 910, the method 900 assigns a behavior-awareness state to the new temporal behavior pattern based upon a type of the controlled activity. In one example of block 910, where the normal activity learning mode was initiated within the server 120 for the site 108(1), the learning algorithm 128 assigns a "low" concern level to the behavior-awareness state 102 of the new temporal behavior pattern 124.

In block 912, the method 900 sets the system back to a normal operating mode. In one example of block 912, the learning algorithm 128 sets the operating mode 130 back to normal and the back-end server 120 resumes normal operation of matching received events from the security devices 106(1)-(3) located on the site 108(1).

Distributed Processing

Figure 10:
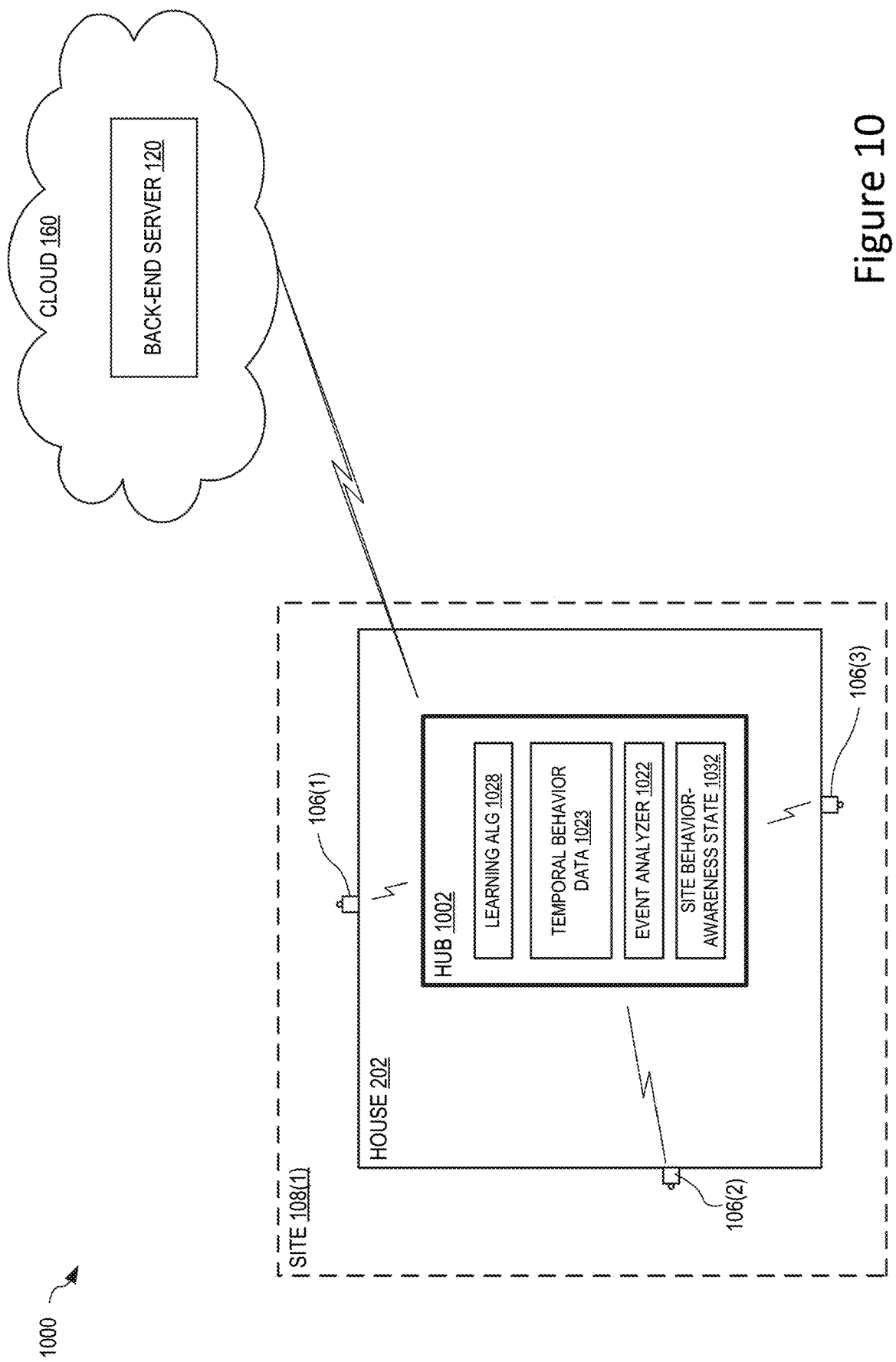
FIG. 10 is a functional block diagram illustrating one example system for determining a behavior-awareness state for an area having a plurality of devices and processing within a hub, in an embodiment.

In the above example, the back-end server 120 performed much of the described functionality. However, this described functionality may be distributed to other computing devices to provide greater flexibility and robustness. FIG. 10 shows one example system 1000 with distributed processing for determining a behavior-awareness state for an area having a plurality of security devices 106. The system 1000 has the same functionality as the system 100 of FIG. 1, but the functionality is performed within another computing device located at the site, and with less or no functionality being performed within the back-end server 120.

Continuing with the examples of FIGS. 1 and 2, FIG. 10 shows the house 202 with the security devices 106(1)-(3) on the site 108(1). However, unlike the above examples, where each of the security devices 106 sends the event signals 114 to the back-end server 120 for processing, the house 202 includes a hub 1002 that communicates with the security devices 106(1)-(3) to receive the event signals 114 for processing. The event signals 114 may still be sent to the back-end server 120 where they may be used for other purposes. The hub 1002 may be, for example, one or more of a Wi-Fi hub, a smart home hub, a hub of a home security/alarm system, and so on. The hub 1002 includes communication capability (e.g., a wired and/or wireless communication module) for communicating with the security devices 106, and includes a processor and a memory for storing machine-readable instructions that when executed by the processor provide the functionality of the hub 1002 as described herein. In certain embodiments, the hub 1002 may communicate with one or more of a PSTN, the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. In certain embodiments, the hub 1002 communication capability may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The hub 1002 may use one or more communication protocols, including either or both of wired and wireless protocols, including but not limited to X10, Ethernet, RS-485, 6LoWPAN, Bluetooth LE (BLE), ZigBee, and Z-Wave.

The hub 1002 is illustratively shown storing an event analyzer 1022 (similar to the event analyzer 122 of FIG. 1), temporal behavior data 1023 (a subset of the temporal behavior data 127), a learning algorithm 1028 (similar to the learning algorithm 128), and a site behavior-awareness state 1032 (similar to the site behavior-awareness state 132) that indicates a current behavior-awareness state for the site 108(1) as determined by the event analyzer 1022. In one embodiment, the hub 1002 processes only the event signals 114 from the security devices 106(1)-(3), and the temporal behavior data 1023 includes only temporal behavior patterns (e.g., temporal behavior patterns 124) corresponding to the security devices 106(1)-(3) and the site 108(1). The hub 1002 may thereby determine the site behavior-awareness state 1032 independently of the back-end server 120, by performing similar matching of the temporal behavior patterns 124 associated with the site 108(1). The party 140(1) may also configure the hub 1002 into a learning mode whereby the learning algorithm 1028 may learn new temporal behavior patterns 124 from the event signals received from the security devices 106(1)-(3) while configured into a learning mode.

Figure 11:
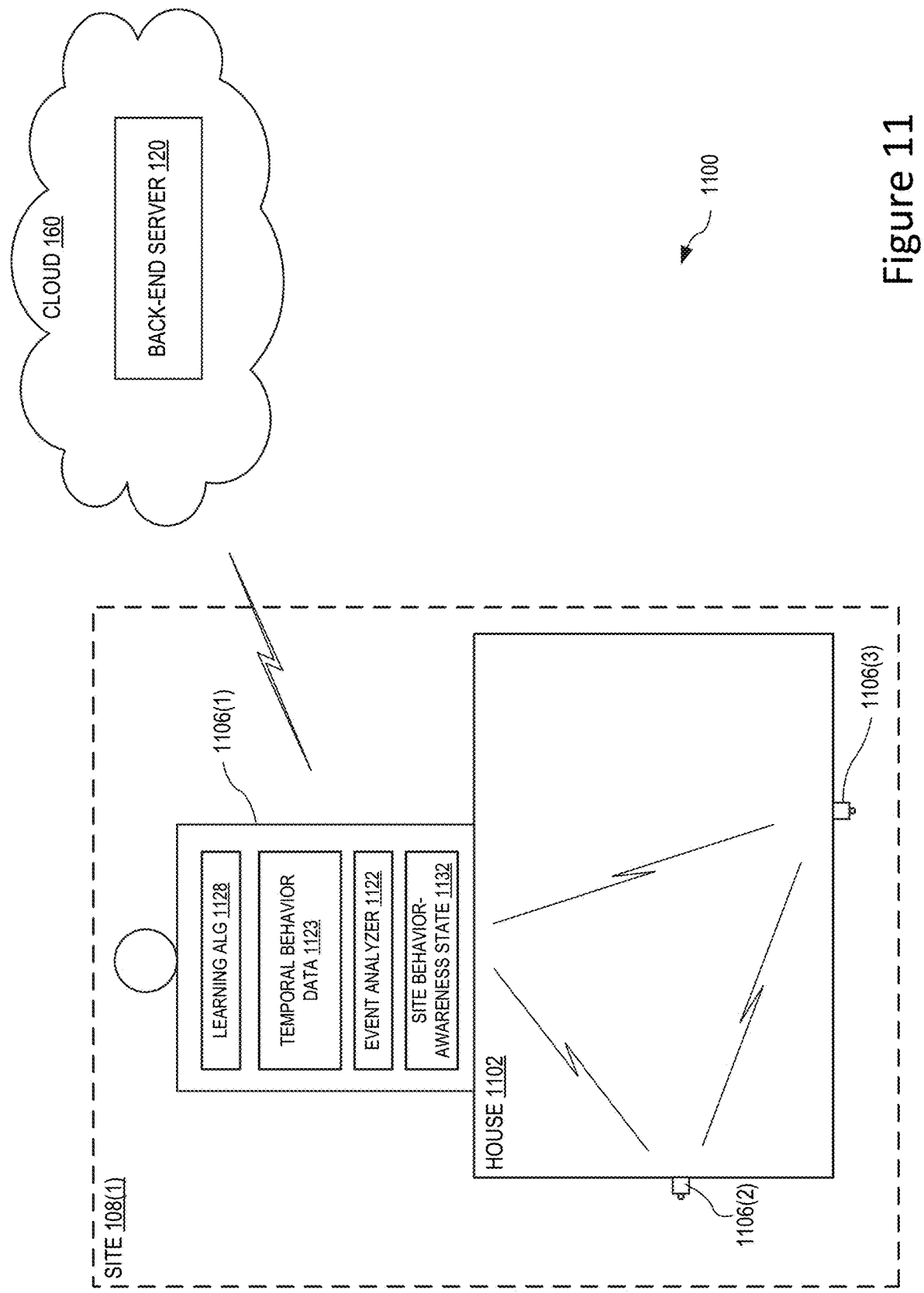
FIG. 11 is a functional block diagram illustrating one example system with distributed processing for determining a behavior-awareness state for an area having a plurality of devices, in an embodiment.

FIG. 11 shows one example system 1100 with distributed processing for determining a behavior-awareness state for an area having a plurality of devices 1106. In the embodiment of FIG. 11, a house 1102 is configured with a plurality of security devices 1106, similar to the security devices 106 of FIG. 1, which are capable of detecting events (e.g. motion) within a corresponding zone (not shown for clarity of illustration). In the system 1100, the security devices 1106 may communicate (e.g., wirelessly) with each other, and each of the security devices 1106 may include an event analyzer 1122, temporal behavior data 1123, a learning algorithm 1128, and a site behavior-awareness state 1132. Collectively, the security devices 1106 may provide functionality similar to the hub 1002 of FIG. 10 and the back-end server 120 of FIG. 1, by distributing processing tasks amongst themselves to share the work load. At least one of the security devices 1106 may be configured to communicate with the back-end server 120, as described above, such that the back-end server 120 may still determine the area behavior-awareness state 134 and send the signals/notifications 138 to the owners and other entities associated with the site 108(1) and the area 104.

Behavior-Awareness

In certain embodiments, the back-end server 120 may send changes in the site behavior-awareness state 132 and/or the area behavior-awareness state 134 to one or more of the security devices 106. For example, when the event analyzer 122 matches the temporal event sequence 115, generated from the event signals 114(1) and 114(2) from the security devices 106(1) and 106(2), respectively, of the site 108(1), to one temporal behavior pattern 124 that causes the site behavior-awareness state 132 to change (e.g., from low to medium), the event analyzer 122 may send the updated site behavior-awareness state 132 to one or more of the security devices 106(1)-(3) for the site 108(1). In another example, when the event analyzer 122 matches the temporal event sequence 115, generated from the event signals 114(3) and 114(4) received from the security devices 106(3) and 106(4) of the sites 108(1) and 108(2), respectively, to one temporal behavior pattern 124 that causes the area behavior-awareness state 134 to change (e.g., from low to high), the event analyzer 122 may send the updated area behavior-awareness state 134 to one or more of the security devices 106(1)-(4) corresponding to the area 104.

One or more of the security devices 106 may have functionality corresponding to one or both of the site behavior-awareness state 132 and the area behavior-awareness state 134. In certain embodiments, this behavior may be configurable by the party 140 of the security device 106. For example, the party 140(1) may configure the security device 106(1) to not send notifications of detected motion to the party 140(1) during normal operation, when the security device 106 is at a low alert level (e.g., when the site behavior-awareness state 132 and the area behavior-awareness state 134 both indicate a low level of concern). However, when the site behavior-awareness state 132 and/or the area behavior-awareness state 134 changes to a level higher than "low," the security device 106(1) may enter a heightened alert level that may override the normal settings. For example, when the site behavior-awareness state 132 and/or the area behavior-awareness state 134 transitions from low to a higher behavior-awareness state, the security device 106(1) may transition into a heightened security ("armed") mode and may notify the party 140(1) upon detecting a motion event. That is, in the heightened security mode, the security device 106(1) may override certain default and/or owner configurable functionality.

In another example, when either of the site behavior-awareness state 132 or the area behavior-awareness state 134 transitions to a high alert level, in contrast to operation at the low alert level where the camera and/or microphone only record data when the security device 106 detects motion, the security device 106 may continuously capture video and/or audio data, irrespective of whether motion is detected, until the site behavior-awareness state 132 and the area behavior-awareness state 134 are reduced to a lower alert level.

In another example, when either of the site behavior-awareness state 132 or the area behavior-awareness state 134 transitions to a high alert level, the security devices 106 may transition into the heightened security mode and may also activate a siren and/or broadcast a prerecorded warning message (e.g., "You are being recorded. The police have been summoned. You should flee immediately.") when the security device 106 detects motion. In another example, where the security device 106 is a floodlight controller, the security device 106 may also flash the floodlights (internal and/or external) when motion is detected and the security device 106 is armed and in the heightened alert mode. Further, when the security devices 106 at the site 108 are in the heighted alert mode and one of the security devices 106 detects motion, another of the security devices 106 at the site 108 may activate a siren and/or broadcast the prerecorded warning message, and/or activate or flash the controlled floodlights.

In certain embodiments, the event analyzer 122 may include computer vision, artificial intelligence, or the like that analyzes the video data and/or audio data from the security device 106 to determine an appropriate response to any actions or sounds detected. For example, where the event analyzer 122 detects (from the captured video and/or audio data) that the person has responded to the prerecorded warning message, the event analyzer 122 may analyze the response and determine a further action. For example, where in response to being asked to leave, the person runs away, the event analyzer 122 may instruct the security device 106 to respond with another prerecorded message such as "And stay away!", thereby giving the impression that a live person is providing these messages. The security device 106 may be configured with one or more prerecorded messages based upon its installed location. For example, a doorbell-type security device 106 located near a front door positioned on a porch of a house may be configured with a prerecorded message saying "Hey buddy, get off my porch," thereby giving the impression that a live person is addressing the intruder.

In certain embodiments, one or more of the security devices 106 may be configured to operate inside a property or structure (e.g., within the house 202). For example, the security device 106 may be configured to detect motion of a window or of a door of the house 202. In another example, the security device 106 may be configured to detect motion of a person within the house 202. In certain embodiments, within the home, these security devices 106 may form part of, and/or may cooperate with, a home security device (e.g., a home burglar alarm system) that may be armed to detect intruders in the house 202, and communicate such information to a remote monitoring station. In one embodiment, the system 100 may implement an escalation procedure that may result in a signal or a call being sent to the monitoring station when detected motion indicates abnormal behavior. In one example of alert level escalation, where a first one of the security devices 106(1), external to the house 202, is triggered, the system 100 may transition to a heightened alert mode (e.g., the site behavior-awareness state 132 may be set to medium). When, while in this heightened alert mode, additional events are detected by others of the security devices 106 at the site 108, the system 100 may further escalate the alert level (e.g., the site behavior-awareness state 132 may be set to high) and a notification may be sent to the monitoring station such that law enforcement or private security personnel may be dispatched to the site 108.

In some embodiments, the system 100 may store all temporal event sequences 115 and associated data (e.g., sensor data 610, event time 606, device ID 604, and so on) such that information may be retrieved and provided for law enforcement purposes.

The present disclosure describes the site behavior-awareness state 132 and the area behavior-awareness state 134 with reference to three states: low, medium, and high. It is to be understood, however, that these three states are merely examples. The present embodiments are not limited to any number or type of site behavior-awareness states 132 or area behavior-awareness states 134, and alternative embodiments may have fewer or more than three such states.

Device Example Embodiments

FIGS. 12 through 15 show example detail and embodiments that may represent the security devices 106 of FIG. 1 and other aspects of the system 100. However, the security device 106 may have other embodiments without departing from the scope of the present embodiments.

Figure 12:
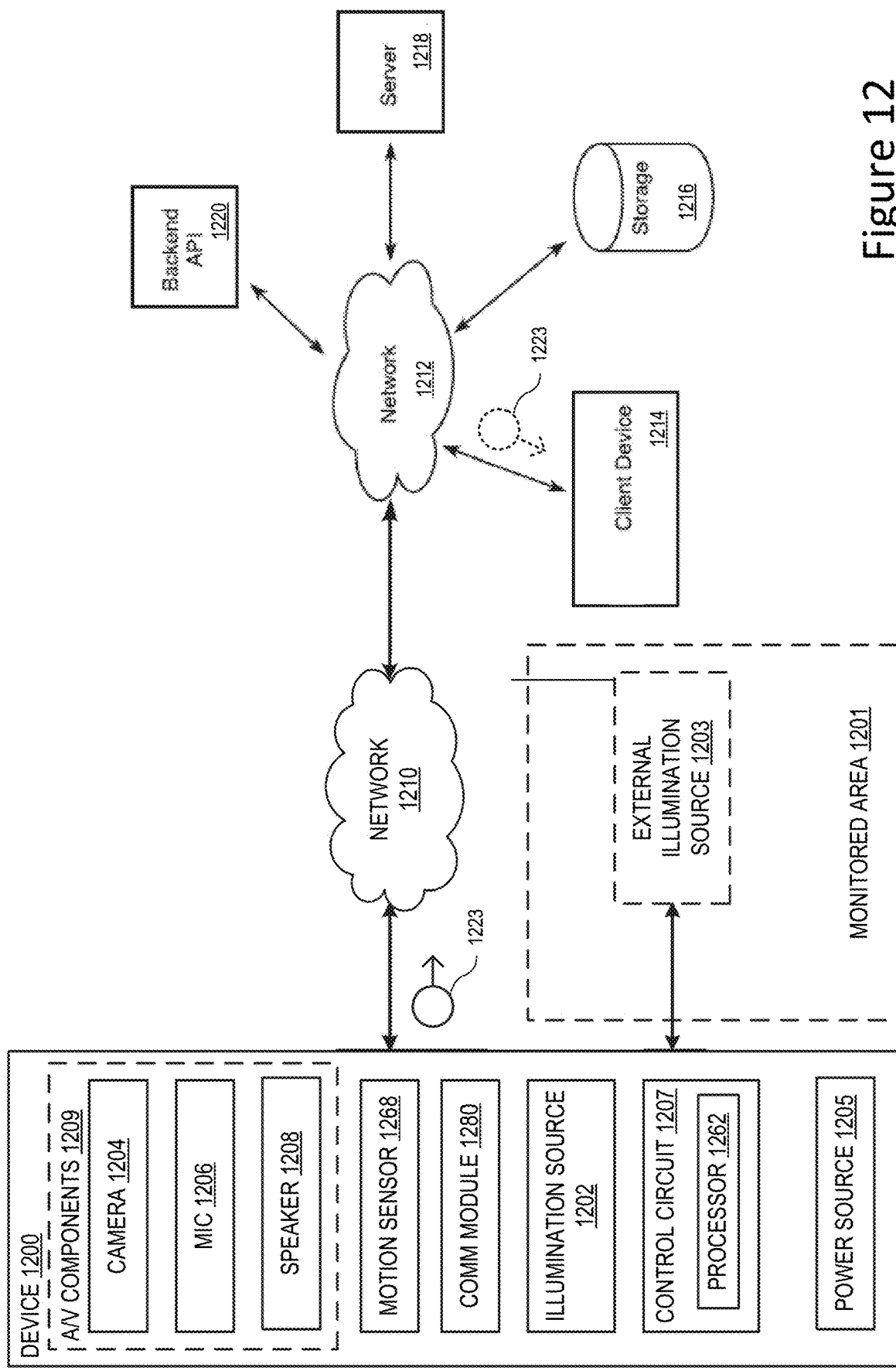
FIG. 12 is a functional block diagram illustrating a system for streaming and storing audio/video content captured by a device, according to an embodiment.

FIG. 12 is a functional block diagram illustrating a system for streaming and storing audio/video content captured by a device 1200. Device 1200 is for example one embodiment of the security device 106 of FIG. 1 and/or the security device 1106 of FIG. 11.

With reference to FIG. 12, the security device 1200 is communicatively coupled to a user network 1210, which may be a wired and/or wireless network, and may include a wireless component, such as a medium-range wireless communication protocol (e.g., a Wi-Fi network compatible with the IEEE 802.11 standard) and/or other wireless communication standards. The user network 1210 connects to a network 1212 that in turn connects to a client device 1214, a storage device 1216 (interchangeably denoted herein as "cloud storage device"), a server 1218, and/or a backend application program interface (API) 1220. The backend API 1220 and/or the server 1218 may represent the back-end server 120. The security device 1200 may therefore communicate with any or all the devices 1214, 1216, the server 1218, and the backend API 1220 via the user network 1210 and the network 1212. Although the storage device 1216, the server 1218, and the backend API 1220 are shown in FIG. 12 as separate from the network 1212, it should be understood that the storage device 1216, the server 1218, and/or the backend API 1220 may be considered as components of the network 1212.

The network 1212 may be a wireless or wired network, or a combination thereof, to provide communications by and between the elements of FIG. 12. The network 1212 is for example: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, an FDDI (Fiber Distributed Data Interface), and/or a CDDI (Copper Distributed Data Interface) connection. Communications of the network 1212 may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network 1212 may further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The client device 1214 may be, for example, a mobile telephone (e.g., cellular telephone), a smartphone, a personal digital assistant (PDA), a computer (e.g. tablet, laptop, desktop), or other communication device. The client device 1214 may include a display (not shown in FIG. 12) and related components capable of displaying streaming and/or recorded video images. The client device 1214 may also include a speaker and related components capable of broadcasting streaming and/or recorded audio, and may also include a microphone to collect user voice communications.

In an embodiment, the security device 1200 detects a presence of a person (sometimes denoted interchangeably as "visitor") within the monitored area 1201 (e.g., zone 112, FIG. 1). The security device 1200 detects the visitor's presence using the camera 1204 and/or the motion sensor 1268, as described below. The camera 1204 captures video images of the visitor within its field of view. This capture and/or recording of video images may begin when the visitor is detected by the security device 1200, or may begin earlier, as described below. The security device 1200 may also capture and record audio using the microphone 1206.

In an embodiment, the camera 1204 has zooming and/or panning functionality, such as digital zoom or panning, so that the camera 1204 focuses or magnifies its field of view onto an area of interest. In some embodiments, a user may control this zooming and/or panning through the client device 1214 using an application executing on the client device 1214. In another embodiment, the camera 1204 has "smart" zoom and/or panning functionality, to automatically focus and/or magnify the field of view onto one or more persons in the monitored area 1201, and/or to follow movement of the persons moving about within the field of view. The camera 1204 may be further capable of detecting a human face and automatically focusing and/or magnifying the field of view onto the detected human face (or, if multiple persons, multiple faces), and/or following the movement of the detected face(s). The camera 1204 may be further capable of (a) distinguishing a human in its field of view from a non-human object in its field of view and/or (b) tracking movement of detected humans while ignoring detections of non-human objects in the field of view.

In an embodiment, in response to visitor detection, the security device 1200 activates (e.g., turns on) at least one of the illumination source 1202 and the external illumination source 1203 to illuminate the monitored area 1201. The security device 1200 may also send an alert 1223 to the client device 1214 via the user network 1210 and the network 1212. The security device 1200 may also send streaming video (and optionally streaming audio) to the client device 1214 via the user network 1210 and the network 1212. If the user of the client device 1214 answers the alert 1223, the user may view the streamed video and hear the streamed audio. The user of the client device 1214 may also establish two-way audio communications between the visitor and the user through the security device 106, the client device 1214, and the networks 1210 and 1212. The user may view images of the visitor throughout the duration of the communication, but the visitor cannot see the user.

In other embodiments, video images captured by the camera 1204 (and the audio captured by the microphone 1206) are uploaded to the cloud and recorded on the storage device 1216. Video and/or audio may be recorded on the storage device 1216 whether the user responds to, or ignores, the alert 1223 sent to the client device 1214. As described above, the camera 1204 may include facial detection functionality with automatic focusing and/or magnifying the field of view onto the detected human face so that images of an intruder's face are usable in later identification and even eventual capture and criminal prosecution.

As shown in FIG. 12, the security device 1200 may communicate with the backend API 1220, which may include one or more components. The backend API 1220 may include, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, have many such applications, each of which communicates with one another using their public APIs. The API backend may hold the bulk of the user data and offer the user management capabilities, leaving the client device to have very limited state. In certain embodiments described herein, functionality may be distributed across multiple devices of the system without departing from the scope hereof. For example, in certain embodiments, processing may be performed mainly at the backend API 1220; but in other embodiments processing may be mostly performed by the end user devices (e.g., the client device 1214).

The backend API 1220 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and provide facilities to develop applications for the relevant system using a given programming language. In addition to accessing databases or computer hardware like hard disk drives or video cards, an API can ease the work of programming graphical user interface (GUI) components. For example, an API can facilitate integration of new features into existing applications (a so-called "plug-in API"). An API can also assist otherwise distinct applications with sharing data, which can help to integrate and enhance the functionalities of the applications.

The backend API 1220 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 13:
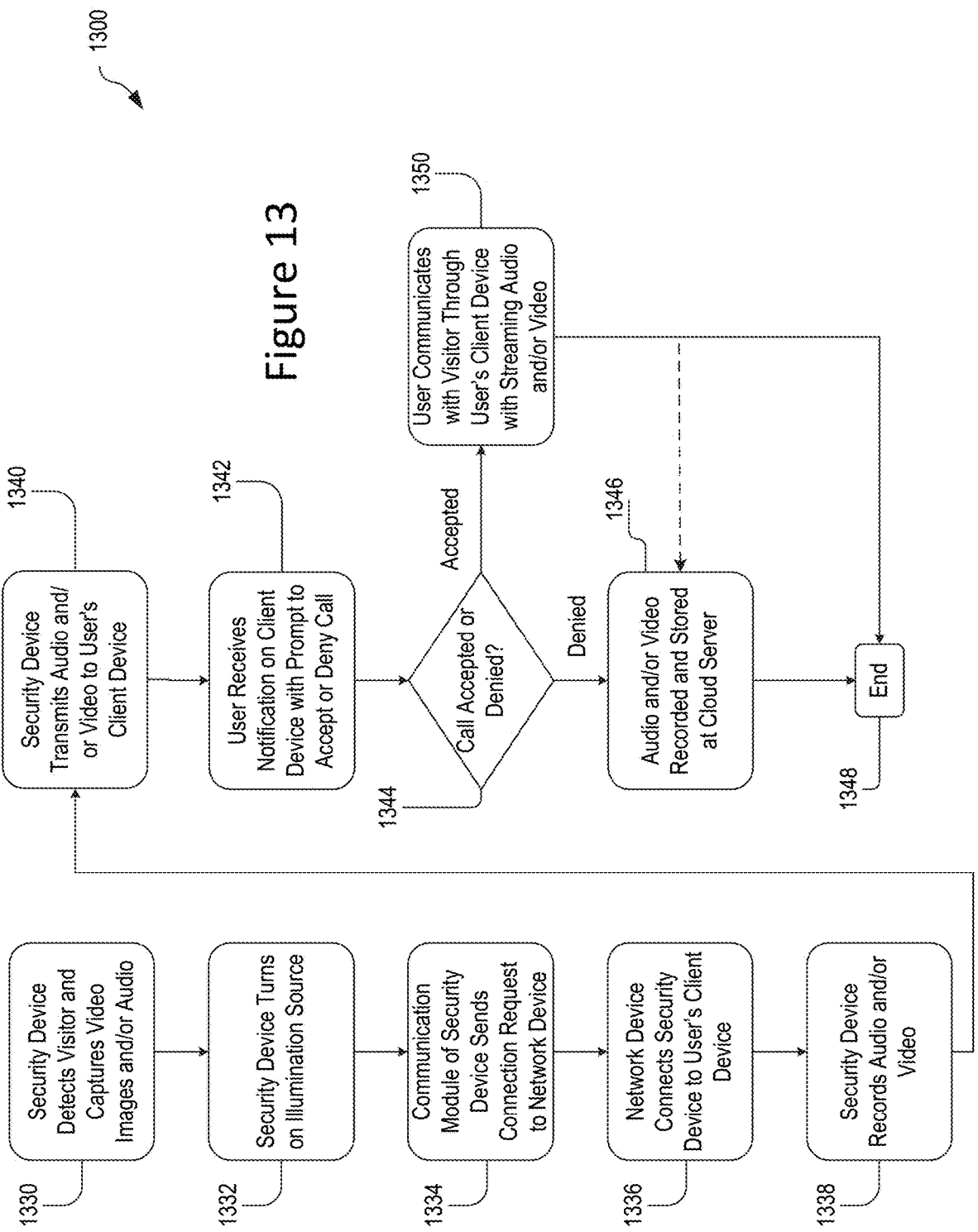
FIG. 13 is a flowchart illustrating a process for streaming and storing audio/video content from the device of FIG. 12, according to an embodiment.

FIG. 13 is a flowchart illustrating an example process 1300 for streaming and storing audio/video content from the security device 1200, according to various aspects of the present disclosure. At block 1330, the security device 1200 detects motion (e.g. from a visitor or an intruder) and captures video images of a field of view of the camera 1204. The security device 1200 may detect the motion using the camera 1204 and/or the motion sensor 1268. For example, the processor 1262 may receive an input signal from at least one of the camera 1204 and the motion sensor 1268, where the input signal indicates detected motion. The processor 1262 may then send an output signal to the camera 1204 to capture video images of the field of view of the camera 1204. The security device 1200 may also capture audio through the microphone 1206. At block 1332, the security device 1200 may turn on the illumination source 1202 to illuminate the monitored area 1201. As described below, in various embodiments the illumination source 1202 may comprise one or more light producing components that produce light in the visible spectrum and/or one or more light producing components that produce light in the infrared band of the electromagnetic spectrum. In some embodiments, the illumination source illuminated at block 1332 may include the external illumination source 1203. The security device 1200 may initiate the video recording/capture when motion is detected, or the video recording/capture may begin earlier, as described below.

At block 1334, the communication module 1280 of the security device 1200 sends a request, via the user network 1210 and the network 1212, to a network device connected to the network 1212. For example, the security device 1200 may send the request to a server, such as the server 1218, and/or to an API, such as the backend API 1220. The server 1218 may comprise, for example, a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the device to which the request is sent may be an API such as the backend API 1220, which is described above.

In response to the request, at block 1336 the network device may connect the security device 1200 to the client device 1214 through the user network 1210 and the network 1212. At block 1338, the security device 1200 may record available audio and/or video data using the camera 1204, the microphone 1206, and/or any other device/sensor available. At block 1340, the audio and/or video data is transmitted (streamed) from the security device 1200 to the client device 1214 via the user network 1210 and the network 1212. For example, the processor 1262 may control the communication module 1280 to transmit (stream) the audio and/or video data from the security device 1200 to the client device 1214 via the user network 1210 and the network 1212. At block 1342, the user may receive a notification (may also be referred to as "alert") on the client device 1214 with a prompt to either accept or deny the communication.

The notification at the client device 1214 may include the live streaming audio and/or video, thus enabling the user to determine whether or not to participate in the communication. If, for example, the streaming video shows that a person is in the field of view of the camera 1204, the user may wish to respond to the notification in order to speak with that person. In one example, the person in the field of view of the camera 1204 may be a visitor whose identity is known to the user. In such a case, the user may desire to converse with the visitor. In another example, the person in the field of view of the camera 1204 may be an intruder whose identity is not known to the user. In such a case, the user may desire to startle the intruder and encourage him or her to flee, for example, by speaking (or shouting) a warning that the intruder is being recorded and/or that law enforcement has been notified and is en route to the site where the security device 106 is located.

At block 1344, the process 1300 determines whether the user has accepted or denied the notification. If the user denies or ignores the notification, then the process 1300 continues with block 1346, where the audio and/or video data from the security device 1200 is recorded and stored in the cloud (e.g., using the storage device 1216 and/or the server 1218). The process 1300 then ends at block 1348 and the connection between the security device 1200 and the client device 1214 is terminated. If, however, the user accepts the notification, then at block 1350, the user communicates with the visitor/intruder through the client device 1214 while audio and/or video data captured by the camera 1204, the microphone 1206, and/or other devices/sensors is streamed to the client device 1214. The user may terminate (e.g., when communication is complete) the connection between the client device 1214 and the security device 1200 and the process 1300 then ends at block 1348. In some embodiments, the audio and/or video data may be recorded and stored in the cloud (block 1346) even if the user accepts the notification and communicates with the visitor/intruder through the client device 1214.

Figure 14:
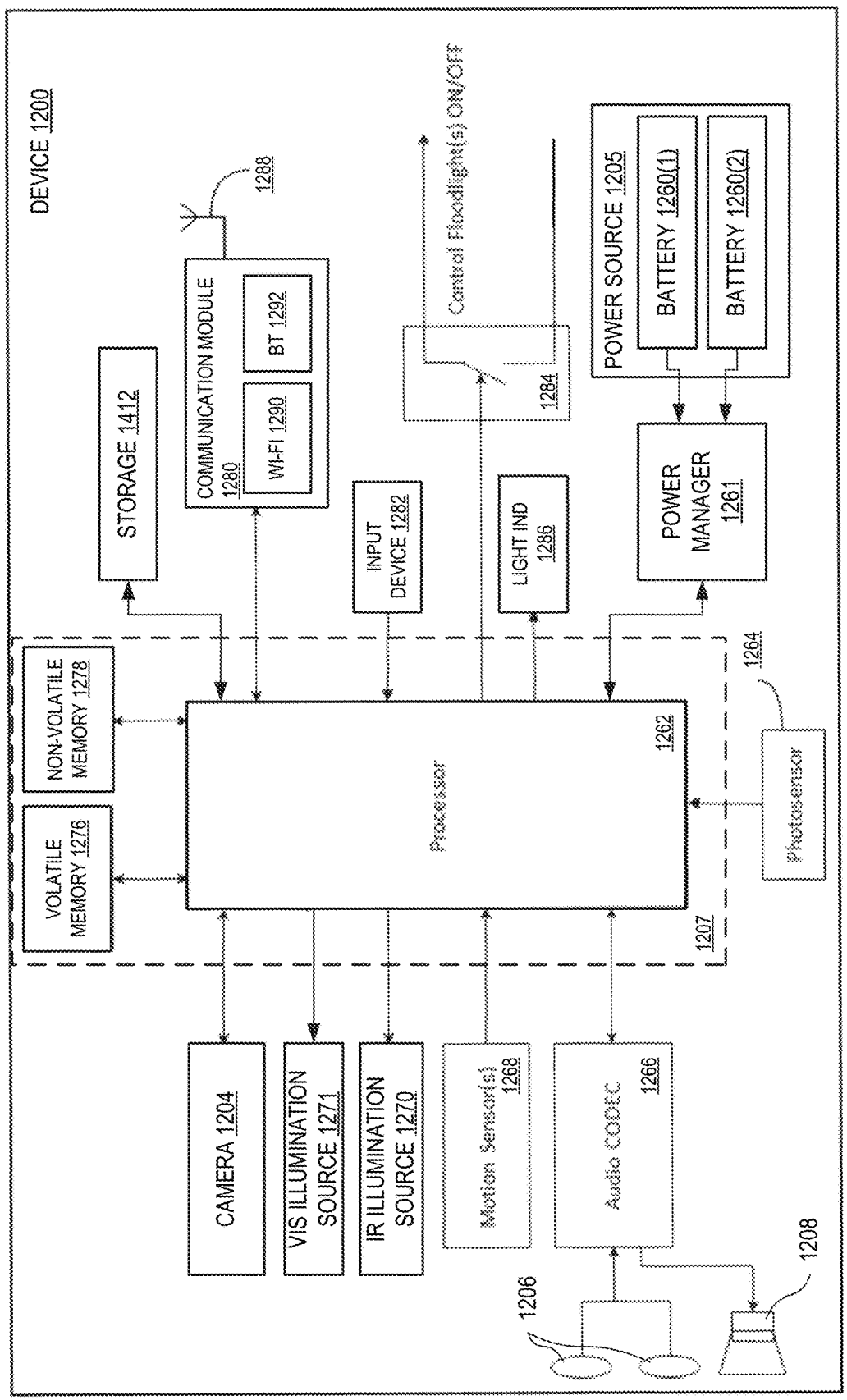
FIG. 14 is a functional block diagram of the device of FIG. 12, illustrating component connectivity in further detail, in an embodiment.

FIG. 14 is a functional block diagram illustrating components of the security device 1200 of FIG. 12 and their relationships to one another. The processor 1262 (may also be referred to as a controller or a microcontroller) is communicatively coupled with a photosensor 1264 (e.g., a light level sensor), an audio CODEC (coder-decoder) 1266 that drives at least one speaker 1208 and receives input from at least one microphone 1206, at least one motion sensor 1268, an infrared illumination source 1270 and a visible illumination source 1271, which may collectively comprise the illumination source 1202, the camera 1204, a volatile memory 1276, a non-volatile memory 1278, the communication module 1280, an input device 1282 (e.g., a button, an electrical switch, a manually operated electromechanical device), a plurality of light indicators 1286, and a power manager 1261 that connects to at least two batteries 1260(1) and 1260(2) that comprise the internal power source 1205. The power manager 1261 manages the power source 1205 to provide electrical power to operate the security device 1200, as described below. The power manager 1261 may comprise an electronic circuit that operates to condition power from the batteries 1260 and to select which of the batteries 1260(1) and 1260(2) power is drawn from. For example, the power manager 1261 may draw power from a first one of the batteries 1260, switching to draw power from the other one of the batteries 1260 when the first battery 1260 is drained. By drawing power from only one of the batteries 1260 at a time, the security device 1200 may continue operation when the depleted one of the batteries 1260 is removed for recharging. In some embodiments, the security device 1200 may further include a switch 1284 controlled by the processor 1262 to activate the external illumination source 1203 (in embodiments in which the security device 1200 is connected to the external illumination source 1203).

The processor 1262 may perform data processing and various other functions of the security device 1200, as described below. In some embodiments, the processor 1262, the volatile memory 1276, the non-volatile memory 1278, and/or programmable input/output peripherals (not shown) may be configured as an integrated circuit. The volatile memory 1276 may be implemented as DDR3 SDRAM (double data rate type three synchronous dynamic random-access memory). The non-volatile memory 1278 may be implemented as NAND flash memory. Although the volatile memory 1276 and the non-volatile memory 1278 are shown outside the box representing the processor 1262 in the example of FIG. 14, in some embodiments the volatile memory 1276 and/or the non-volatile memory 1278 may be physically incorporated with the processor 1262, such as on the same integrated circuit (chip). The volatile memory 1276 and/or the non-volatile memory 1278, regardless of their physical location, may be shared by one or more other components (in addition to the processor 1262) of the security device 1200. In certain embodiments, the security device 1200 includes additional storage 1412 that may be implemented as any type of non-volatile data storage, such as, for example, and without limitation, hard disks/drives, flash memory, or any other suitable memory/storage element. In some embodiments, the non-volatile memory 1278 and the additional storage 1412 may be combined as a single non-volatile memory. The additional storage 1412, when included, may be operatively connected to the processor 1262 and may be used to store audio and/or video information captured by the security device 1200, as described in further detail below.

As described in further detail below, the camera 1204 and the infrared illumination source 1270 may cooperate to facilitate night vision functionality of the security device 1200. For example, the photosensor 1264 is configured to detect a level of ambient light about the security device 1200. The processor 1262 may use the input from the photosensor 1264 to control operation of the infrared illumination source 1270 and the camera 1204 to activate and deactivate night vision, as described in further detail below. In some embodiments, the camera 1204 may include a video recording sensor or a camera chip. In some embodiments, the infrared illumination source 1270 may include one or more IR light-emitting diodes (LEDs).

The transfer of digital audio between the user (using the client device 1214) and a visitor (or intruder) may be compressed and decompressed using the audio CODEC 1266, as described below. The motion sensor 1268 may include one or more passive infrared (PIR) sensors, or any other type of sensor(s) capable of detecting and communicating to the processor 1262 the presence and/or motion of an object within its field of view. In some embodiments, one or more of the passive infrared sensors (PIRs) may comprise a pyroelectric infrared sensor. When triggered by the motion sensor 1268, the processor 1262 may perform one or more functions, as described below.

The communication module 1280 includes at least one antenna 1288 and is configured to handle communication between the security device 1200 and other, external devices or receivers, and to route incoming/outgoing data appropriately. For example, inbound data from the antenna 1288 may be routed through the communication module 1280 before being directed to the processor 1262, and outbound data from the processor 1262 may be routed through the communication module 1280 before being directed to the antenna 1288. The communication module 1280 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 1280 includes a Wi-Fi chip 1290 and a Bluetooth chip 1292 that implement medium-range wireless communication protocols and short-range wireless communication protocols, respectively, but these components are merely examples and are not limiting. Further, while the Wi-Fi chip 1290 and the Bluetooth chip 1292 are illustrated within the box representing the communication module 1280, the embodiment illustrated in FIG. 14 is merely an example, and in some embodiments the Wi-Fi chip 1290 and/or the Bluetooth chip 1292 may not necessarily be physically incorporated with the communication module 1280.

In some embodiments, the communication module 1280 may further comprise a wireless repeater (not shown, may also be referred to as a wireless range extender). The wireless repeater may be configured to receive a wireless signal from a wireless router (or another network device) in the user network 1210 and rebroadcast the signal. Wireless devices that are not within the broadcast range of the wireless router, or that only weakly receive the wireless signal from the wireless router, may receive the rebroadcast signal from the wireless repeater of the communication module 1280, and may thus connect to the user network 1210 through the security device 1200. In some embodiments, the wireless repeater may include one or more transceiver modules (not shown) capable of transmitting and receiving data, and using, for example, one or more medium-range wireless communication protocols and/or technologies, such as Wi-Fi (IEEE 802.11), long-range wireless communication protocols, such as WiMAX (IEEE 802.16), or any other protocol and/or technology.

When a visitor (or intruder) in the monitored area 1201 speaks, audio from the visitor (or intruder) is captured by the microphone 1206 and may be compressed by the audio CODEC 1266. Digital audio data is then sent through the communication module 1280 to the network 1212 (FIG. 1) via the user network 1210, routed by the server 1218 and/or the backend API 1220, and delivered to the client device 1214. When the user speaks, the client device 1214 captures digital audio data, which is transferred through the network 1212, the user network 1210, the communication module 180, and the processor 1262 to the audio CODEC 1266 where it is decoded and emitted to the visitor through the speaker 1208, which may be driven by an audio driver.

The input device 1282 may have one or more functions, such as changing an operating mode of the security device 1200 and/or triggering a reset of the security device 1200. For example, when the input device 1282 is activated (e.g., pressed and released), it may cause the communication module 1280 of the security device 1200 to enter access point (AP) mode, which may facilitate connecting the security device 1200 to the user network 1210. Alternatively, or in addition, when the input device 1282 is activated (e.g., pressed and held) for at least a threshold amount of time, it may trigger the erasing of any data stored by the volatile memory 1276 and/or by the non-volatile memory 1278, and/or may trigger a reboot of the processor 1262.

In certain embodiments, the security device 1200 may be configured to recognize a "wake-up" word or phrase (e.g., using the microphone 1206 and the processor 1262) that triggers a command input mode. When the command input mode is triggered, the security device 1200 detects, using the microphone 1206, a verbal command that may be recognized to cause the security device 1200 to perform an action. For example, in an embodiment, when the user, within the monitored area 1201, says the wake-up word or phrase followed by "turn on the lights," the security device 1200 activates the illumination source 1202. Similarly, in another embodiment, when the user, within the monitored area 1201, says the wake-up word or phrase followed by "turn off the lights," the security device 1200 deactivates the illumination source 1202. In certain embodiments, recognition of the wake-up word or phrase may only occur when the motion sensor 1268 and/or the camera 1204 detects motion within the monitored area 1201. In some embodiments, the available commands may be preconfigured within the security device 1200. In other embodiments, the recognizable commands may be learned by the security device 1200 from the user. In some embodiments, the security device 1200 may be trained to recognize the voice of the user, and thereafter respond only to commands when that voice is recognized.

In certain embodiments, the security device 1200 may use the camera 1204 to recognize a face (e.g., the face of an authorized user). For example, in an embodiment, the security device 1200 may include a learn mode through which the face(s) of one or more authorized user(s) is/are learned and stored within the non-volatile memory 1278. Upon detecting and recognizing an authorized user's face, the security device 1200 may enter a commend input mode, in another embodiment, whereby verbal commands from the authorized user are interpreted and executed by the security device 1200. In one example, where the authorized user stands facing the security device 1200 and says "turn the lights on," the security device of certain embodiments activates the illumination source 1202 after recognizing the authorized user's face. Similarly, when the authorized user faces the security device 1200 and says "turn off the lights," the security device 1200 may deactivate the illumination source 1202 after recognizing the authorized user's face. In some embodiments, the security device 1200 may use a lip reading algorithm to interpret the authorized user's verbal command. In some embodiments, the security device 1200 may detect one or more gestures by the authorized user, interpret the gesture as a command, and then execute that command. For example, where the authorized user faces the security device 1200 and makes an arm waving gesture, once the security device 1200 recognizes the face of the authorized user, the security device 1200 of this example detects the arm waving movements and activates the illumination source 1202.

In certain embodiments, the security device 1200 may be configured with one or more threshold values for detecting motion, wherein, for example, a first threshold value defines when the illumination source 1202 is activated and a second threshold value defines when audio/video is captured and recorded. For example, where the motion sensor 1268 and/or the camera 1204 detects movement (e.g., with respect to the camera, by detecting a number of changed pixels in different video frames) at a level that is greater than the first threshold value, but less than the second threshold value, the security device 1200 may activate the illumination source 1202 and yet not capture and record audio/video data. However, where the motion sensor 1268 and/or the camera 1204 detects movement (e.g., with respect to the camera, by detecting a number of changed pixels) at a level that is greater than the first threshold value, and also greater than the second threshold value, the security device 1200 may activate the illumination source 1202 and also capture and record audio/video data. Thus, the security device 1200 of certain embodiments may activate the illumination source 1202 and capture audio/video data of a person moving within the monitored area 1201, but may only activate the illumination source 1202 (and not capture audio/video data) when an object smaller than a person moves through the monitored area 1201.

In another embodiment, a first, or lowest, threshold value may define a level of detected motion that activates the illumination source 1202, a second, or higher, threshold value may define a level of motion that activates recording of audio/video data, and a third, or highest, threshold value may define a level of motion that causes an alert to be sent to the user. These three threshold values may be configured and/or combined to define functionality of the security device 1200. For example, for motion that is above the first threshold value but below the second threshold value, the illumination source 1202 is activated, but no audio/video data is recorded, and no alert is sent to the user, whereas for motion that is above the second threshold value but below the third threshold value, the illumination source 1202 is activated, and audio/video data is recorded, but no alert is sent to the user, and for motion that is above the third threshold value, the illumination source 1202 is activated, audio/video data is recorded, and an alert is sent to the user.

In another example, the first and second threshold values may be equal and set to a relatively low value and the third threshold value may be set to a higher value. In such an embodiment, the illumination source 1202 and the audio/video recording are activated together when the detected motion is above the lower threshold value, but no alert is sent to the user unless the detected motion is also above the higher threshold value. Thus, the user may configure the response of the security device 1200 for various levels of detected motion.

In certain embodiments, the security device 1200 may be configured to distinguish different types of objects within the monitored area 1201, wherein functionality of the security device 1200 is may vary depending upon the type of object detected within the monitored area 1201. For example, in an embodiment, the illumination source 1202 may be activated when a vehicle and/or a person is detected, whereas audio/video data may start recording only when a person is detected (e.g., no recording when only a vehicle is detected and not a person). Any number of different algorithms and techniques may be used in the present embodiments for distinguishing different types of objects within the monitored area 1201. For example, techniques for distinguishing humans from other types of objects include computer vision, thermal imaging, motion and scale-invariant feature transform (SIFT) methods, feature extraction based on the histogram of the oriented gradient (HOG) and geometric characteristics with a classifier based on support vector machine (SVM), adaptive boosting (Adaboost), soft-label boosting algorithms, Gaussian background-subtraction, texture change, expectation minimization (EM), image averaging, contour saliency map (CSM), CSM template matching, shape and appearance-based detection, spatiotemporal texture vectors, shape descriptors (e.g., compactness and/or leanness), principal component analysis (PCA), etc.

Doorbell and Camera Embodiment

Figure 15:
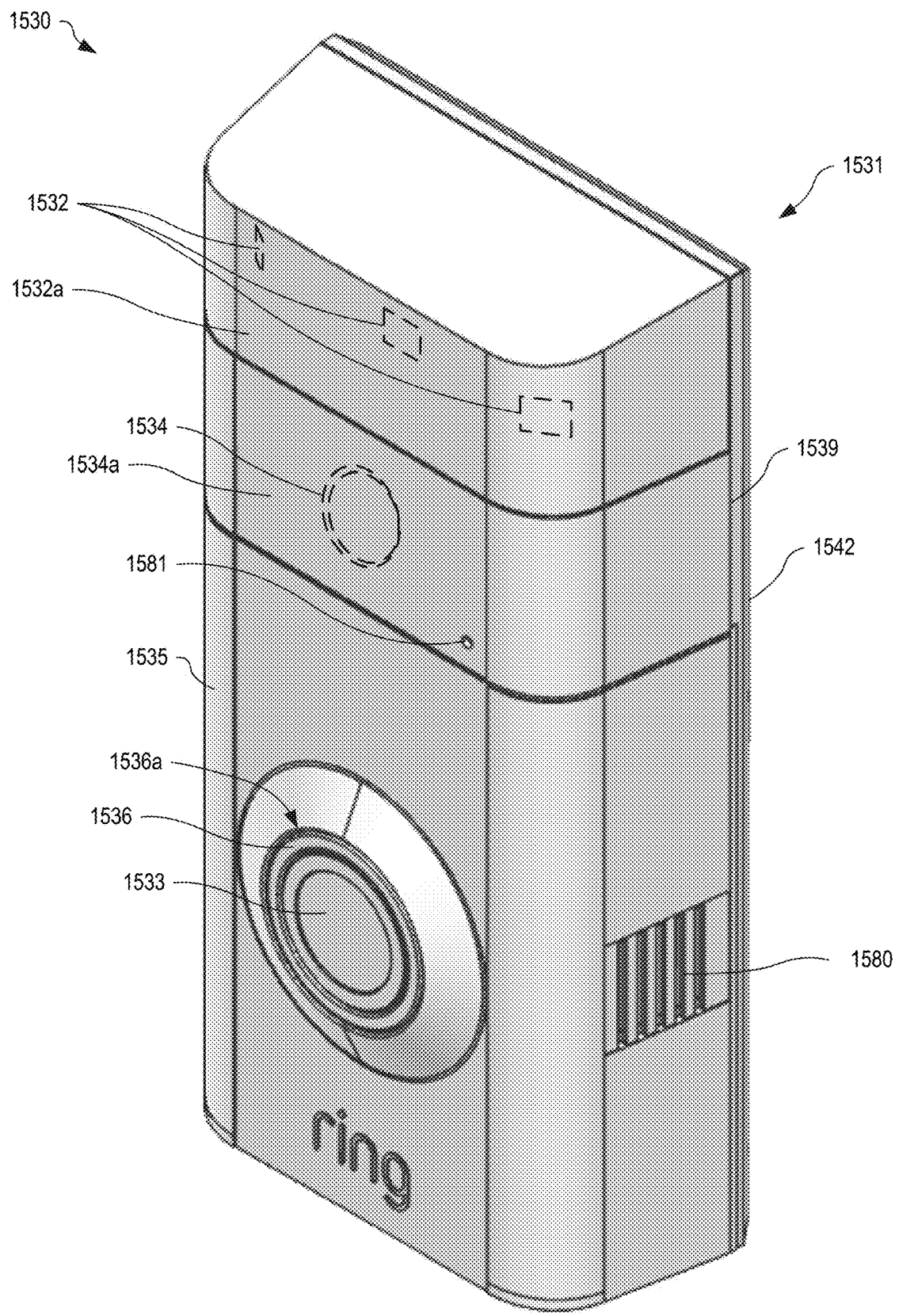
FIG. 15 is a front perspective view of the device of FIG. 12 implemented as a doorbell, in an embodiment.

FIG. 15 is a front perspective view of a doorbell 1530 that represents one example implementation of the security device 106 of FIG. 1 and/or the security device 1106 of FIG. 11. The device 1530 may include some or all of the functionality of the audio/video recording and communication device 1200 of FIG. 12 and the process 1300 of FIG. 13. The device 1530 has a housing 1531 that includes a backplate 1539, a faceplate 1535 with a button 1533, an optically-transparent lens 1534*a* positioned in front of a camera 1534, and an infrared-transparent lens 1532*a* positioned in front of at least one motion sensor 1532. The housing 1531 may be further configured with an aperture 1581 to allow sound to enter the housing 1531 for detection by a microphone. The device 1530 may also include a mounting bracket 1542 that couples with the backplate 1539 to facilitate mounting of the device 1530 on a flat surface, such as the exterior of a building, such as a home or office. For example, the mounting bracket 1542 may be selected for mounting to surfaces of various composition, including, without limitation, wood, concrete, stucco, brick, vinyl siding, aluminum siding, etc., with any suitable fasteners, such as screws, or interference connections, adhesives, etc. The device 1530 may couple to the mounting bracket 1542 using any suitable fasteners, such as screws, or interference connections, mating hooks and apertures, adhesives, etc. The backplate 1539 may include screw terminals configured to receive electrical wires adjacent a mounting surface of the device 1530. The device 1530 may receive electrical power through the screw terminals and/or the device 1530 may control electrical connectivity of the screw terminals to cause a conventional doorbell to sound if so connected to the wires.

The faceplate 1535 may extend from the bottom of the device 1530 up to just below the camera 1534. The faceplate 1535 may be formed of any suitable material, including, without limitation, metals, such as brushed aluminum or stainless steel, metal alloys, and plastics, and any combination thereof. The faceplate 1535 protects the internal contents of the device 1530 and serves as an exterior front surface of the device 1530. The faceplate 1535 may include an aperture 1536*a* with a flexible translucent membrane 1536 for movably holding the button 1533. The faceplate 1535 is also formed with at least one speaker grille 1580 to allow sound generated within the housing 1531 to exit. The button 1533 and the flexible translucent membrane 1536 may have various profiles that may or may not match the profile of the faceplate 1535. The flexible translucent membrane 1536 may comprise any suitable material, including, without limitation, a transparent silicone, plastic, or rubber, that is configured for allowing light produced within the device 1530 to pass through and is sufficiently flexible to allow the button 1533 to be pressed. The light may be produced by one or more light-emitting components, such as light-emitting diodes (LEDs), contained within the device 1530, as further described below. The button 1533 and/or the flexible translucent membrane 1536 contacts a switch cover located within the device 1530 when the button 1533 is pressed by a visitor. When pressed, the button 1533 may trigger one or more functions of the device 1530, as further described below.

The motion sensor 1532 may be, for example, one or more passive infrared (PIR) sensors that detect motion using the infrared wavelength, but may be any type of sensor configured for detecting and communicating the presence of motion and/or a heat source within their field of view. The motion sensor 1532 may be configured to detect motion using any methodology, including but not limited to methodologies that do not rely on detecting the presence of a heat source within a field of view, without departing from the scope hereof. In certain embodiments, the infrared-transparent lens 1532*a* may be a Fresnel lens patterned to focus incoming light onto the at least one motion sensor 1532 located within the device 1530. The infrared transparent lens 1532*a* may be substantially coplanar with a front surface of the housing 1531. In alternative embodiments, the infrared-transparent lens 1532*a* may be recessed within the housing 1531 or may protrude outward from the housing 1531. The infrared-transparent lens 1532*a* may extend and curl partially around the side of the device 1530 without departing from the scope hereof. The at least one motion sensor 1532 is configured to sense a presence and/or motion of an object in front of the device 1530. In certain embodiments, the optically-transparent lens 1534*a* may be configured for focusing light into the camera 1534 so that clear images may be taken. The camera 1534 is configured for capturing video data when activated.

Floodlight Embodiment

Figure 16:
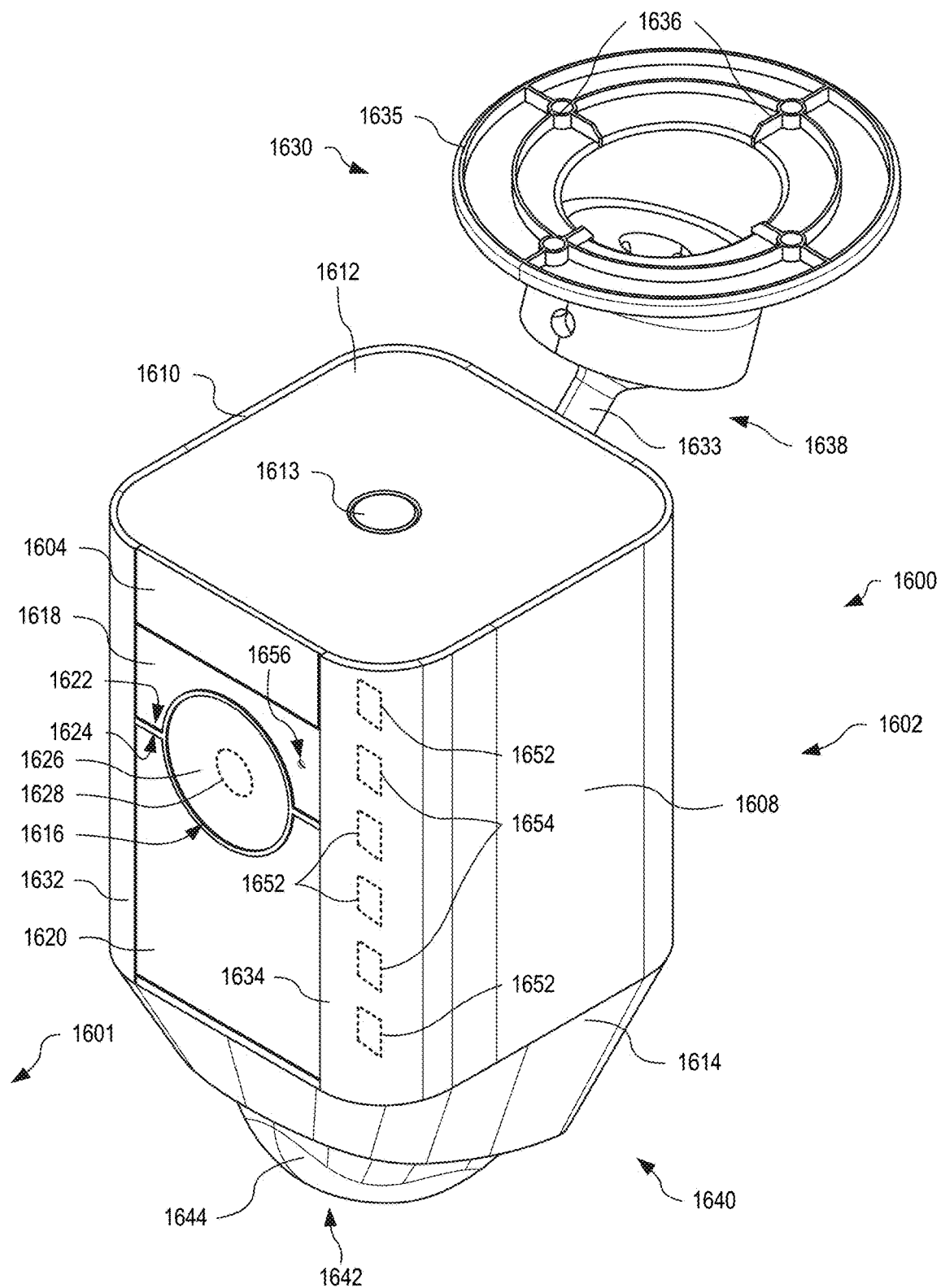
FIG. 16 is a front perspective view of the device of FIG. 12 implemented as a security/floodlight controlling device, in an embodiment, in combination with mounting hardware.

FIG. 16 is a front perspective view of a security device 1600, that represents one example implementation of the security device 106 of FIG. 1 and/or the security device 1106 of FIG. 11. The security device 1600 may include some or all of the functionality of the audio/video recording and communication device 1200 of FIG. 12 and the process 1300 of FIG. 13.

The security device 1600 is configured with a housing 1602 for containing and protecting the interior components of the security device 1600. The housing 1602 includes a front wall 1604, a rear wall 1606, opposing sidewalls 1608 (right), 1610 (left), an upper wall 1612, and a tapered lower portion 1614. The front wall 1604 forms a central opening 1616 that receives an upper shield 1618 and a lower grille 1620. In the illustrated embodiment, front surfaces of the upper shield 1618 and the lower grille 1620 are substantially flush with a front surface of the front wall 1604, but in alternative embodiments, these surfaces may not be flush with one another. The upper shield 1618 is substantially rectangular with a semicircular indentation along its lower edge 1622. The lower grille 1620 is substantially rectangular, and includes a semicircular indentation along its upper edge 1624. Together, the semicircular indentations in the upper shield 1618 and the lower grille 1620 form a circular opening that accommodates a cover 1626. The upper shield 1618, the lower grille 1620, and the cover 1626 are described in further detail below.

A camera 1628 is positioned behind the cover 1626 with a field of view of a monitored area 1601 to the front of the security device 1600 through the circular opening formed by the upper shield 1618 and the lower grille 1620. The camera 1628 may be similar to the camera 1204 of the security device 1200, FIG. 12. The cover 1626 is preferably transparent or translucent so that it does not interfere with the field of view of the camera 1628. For example, in certain embodiments the cover 1626 may comprise colorless glass or plastic.

The security device 1600 has a plurality of visible light emitting elements 1652 and infrared light emitting elements 1654 that are positioned behind right and left front corner shields 1632, 1634. For clarity of illustration, the visible light emitting elements 1652 and the infrared light emitting elements 1654 are shown only behind right corner shield 1634; the visible light emitting elements 1652 and the infrared light emitting elements 1654 are similarly positioned behind the left corner shield 1632. The corner shields 1632, 1634 may be formed of a material that is transparent to light within both the visible spectrum and the infrared spectrum. In certain embodiments, the corner shields 1632, 1634 are formed of a clear plastic (e.g., polycarbonate) or glass. The corner shields 1632, 1634, therefore, do not significantly interfere with transmission of light from the visible light emitting elements 1652 and the infrared light emitting elements 1654 into the monitored area 1601. The infrared light emitting elements 1654, in conjunction with operation of the camera 1628, facilitates night vision functionality of the security device 1600.

An input device 1613 is positioned on the upper wall 1612 of the housing 1602 such that it is accessible by the user. The input device 1613 is for example a button connected to an electrical switch that provides an input to a processor of security device 1600. The input device 1613 may be similar to the input device 1282 of the security device 1200.

The security device 1600 includes at least two microphones, which may be similar to the microphones 1206 of the security device 1200 of FIG. 12. The first microphone is positioned at the front of the security device 1600 and is aligned with a first microphone aperture 1656 within the upper shield 1618. The second microphone is positioned at the left side of the security device 1600 and is aligned with a second microphone aperture in the left sidewall 1610 of the housing 1602.

The tapered lower portion 1614 includes an opening to receive the motion sensor cover 1644, which is convexly shaped to cover and close the lower end opening of the tapered lower portion 1614. The motion sensor cover 1644 may include a Fresnel lens 1642 that is configured to focus and concentrate incoming infrared light onto a motion sensor (e.g., PIR sensors, now shown) located within the tapered lower portion 1614, thereby enhancing the effectiveness and/or sensitivity of the motion sensor. In alternative embodiments, the motion sensor cover 1644 may not include a Fresnel lens.

The motion sensor cover 1644 and the tapered lower portion 1614 couple with a plate to form a battery access door 1640 within the housing 1602 that provides access to removable battery casings configured within housing 1602. This configuration is well suited to a typical use case for the security device 1600, since floodlights are typically located above the head level of a person of average height. A person (or other object) moving at ground level within the monitored area 1601 is thus likely to be well within the field of view of the motion sensor.

The security device 1600 configured with coupling hardware 1630 that may be used to attach the security device 1600 to a supporting structure (not shown). For example, the coupling hardware 1630 may be used to secure the security device 1600 to a wall, a ceiling, a frame, a post, a gate, and so on. In the illustrated embodiment, the coupling hardware 1630 has a first connecting member 1633 secured to the rear wall 1606 of the housing 1602 and a second connecting member 1635 configured for securing to the supporting structure. For example, the second connecting member 1635 may include one or more apertures 1636 that allow the second connecting member 1635 to be screwed or nailed to the supporting structure. The first and second connecting members 1633, 1635 meet at a ball-and-socket joint 1638 that allows the first and second connecting members 1633, 1635 to articulate with respect to one another such that the security device 1600 may be oriented as desired. The ball-and-socket joint 1638 is, however, just one non-limiting example. In alternative embodiments, other types of joints may be provided between the first and second connecting members 1633, 1635, including non-articulating joints. In further alternative embodiments, the coupling hardware 1630 may comprise a single unitary member, rather than the first and second connecting members 1633, 1635.

In certain embodiments, the security device 1600 is configured to control an external illumination source (e.g., external illumination source 1203, FIG. 12) that is capable of being reoriented, the external floodlights may work in conjunction with the integral illumination source (e.g., the visible light emitting elements 1652 and the infrared light emitting elements 1654) to illuminate a broader area around the security device 1600, thereby providing greater security and a larger area for video surveillance and recording. For example, the user may orient the security device 1600 such that the integral illumination source points straight ahead and reorient the external illumination source 1203 to point to the sides of the area illuminated by the integral illumination source, thereby illuminating a broader area.

Figure 17:
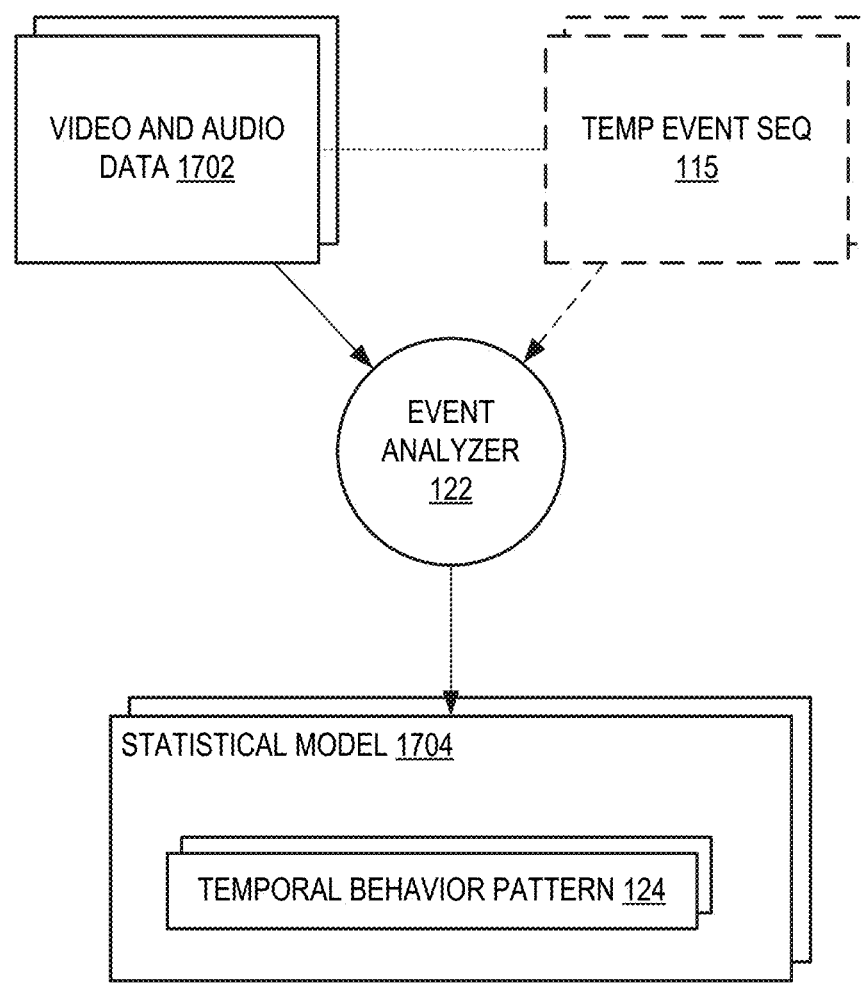
FIG. 17 is a functional block diagram illustrating example processing of video feeds to determine one or more statistical models for identifying behavior.

FIG. 17 is a functional block diagram illustrating example processing of video feeds to determine one or more statistical models for identifying behavior. Where one or more of the security devices 106 (e.g., smart doorbells, security cameras, smart floodlight controllers, and so on) have been previously installed and operational at the site 108, these devices may have captured video data and/or audio data from around the site 108. Advantageously, the video and audio data may only be captured when the security device 106 determines that an event of interest has occurred, and thus there is no need to process continual video and audio data looking for events, since they have already been identified. For example, as shown in FIG. 12, the device 1200, upon detecting an event of interest (e.g., motion), may capture and send video and audio data to one or both of the server 1218 and the backend API 1220.

Where one or more security devices 1200 have been operating for a period of time (e.g., a few months or ideally a year or more), the event analyzer 122 may retrieve the video and audio data (shown as video and audio data 1702 in FIG. 17) from one or both of the server 1218 and a backend API 1220 and then process the video and/or audio data 1702 to identify one or more temporal behavior patterns 124 that correspond to normal behavior for the site 108. That is, by processing the historical video and audio data 1702 for the site 108, the event analyzer 122 may automatically identify movement and other behavior in the video and or audio that is considered normal behavior, and may determine corresponding temporal behavior patterns 124 with an associated behavior-awareness state 102 of normal. For example, where the video and audio data 1702 from a doorbell-type device shows a person leaving the house 202 (FIG. 2) between 8:00 AM and 8:30 AM each weekday, the event analyzer 122 may generate one or more temporal behavior patterns 124 for the expected behavior between those times. Thus, detected activity outside those times may be considered abnormal behavior.

The event analyzer 122 may further analyze the temporal behavior patterns 124 to determine a statistical model 1704 corresponding to the site 108. The event analyzer 122 may then generate the statistical model 1704 with statistically adjusted temporal behavior patterns based upon statistical analysis of repeated behavior within the temporal behavior patterns 124.

Similarly, where the back-end server 120 (FIG. 1) has stored previously determined temporal event sequences 115 for the site 108, the event analyzer 122 may further process these temporal event sequences, in conjunction with the video and audio data 1702 for example, to further identify behavior considered normal at the site 108.

The event analyzer 122, based upon processing of the video and audio data 1702 and/or the temporal event sequences 115, may generate a statistical model 1704 for the site 108. In some embodiments, the event analyzer 122 may process video data and temporal event sequences for multiple sites 108 to generate multiple statistical models 1704. In certain embodiments, each site 108 may have a corresponding statistical model 1704. Where sites 108 are proximate one another, the event analyzer 122 may generate one or more statistical models 1704 that correspond to multiple sites. The event analyzer 122 may also generate a statistical model 1704 for an area 104, where certain of the security devices 106 are selected to provide video, audio, and temporal event sequences for analysis. Each statistical model 1704 may be considered a collection of the temporal behavior patterns 124 corresponding to one or more of the sites 108 and/or the areas 104. In certain embodiments, the event analyzer 122 may process the event data 602 (FIG. 6) to determine and evaluate one or more statistical models.

Searching for Unusual or Suspicious Videos

As described above, another aspect of the present embodiments includes the realization that a security device may capture many video clips over time and that a user may wish to find one or more of the video clips that have content of interest. More specifically, the user may desire to search for video clips that have associated behaviors that may be of interest to the user, such as video clips having associated behaviors indicative of suspicious activities (e.g., vandalism, burglary, trespassing, etc.). The present embodiments solve this problem by providing a security video searching device that includes an event analyzer that identifies events within the video clips and a search engine that searches the plurality of video clips to determine behavior associated with the video clips and finds ones of the plurality of video clips that include behavior indicative of the search characteristic or a behavioral pattern indicative of the search characteristic and sends the found video clips to the user. In addition, in some of the present embodiments, a security video searching system is provided that includes a search engine that analyzes each of the plurality of video clips to determine behavior associated with the video clip and finds ones of the plurality of video clips that match a search request of the user based upon the associated behavior. For example, the security video searching system may find video clips from the plurality of video clips that match a search request of the user based upon previously determined behavioral patterns associated with motion signals generated by the security devices that capture the video clips. By allowing the user the ability to search for video clips having associated behaviors, the user may be more likely to view suspicious activity in the area of his or her property, and as a result may gain a better understanding of prior locations of threats, as well as the appearance of threats (e.g., the behavior that is indicative of a threat). By being aware of prior locations and the appearance of threats, the user may be more prepared to identify threats and/or to avoid certain areas, thereby contributing to his or her safety, as well as the safety of the neighborhood and/or surrounding areas.

Another aspect of the present embodiments includes the realization that a security device may capture many video clips and provide many event signals (e.g., from motion sensors, contact sensors, and the like) over time and that a user of the security device may wish to find one or more of the video clips that have content of interest. More specifically, the user may desire to search for video clips that have associated behaviors that may be of interest to the user, such as video clips having associated behaviors indicative of suspicious activities (e.g., vandalism, burglary, trespassing, etc.). The present embodiments solve this problem by providing a security video searching method that analyzes each of the plurality of video clips to identify behavior therein and to find ones of the plurality of video clips that match search characteristics of the user based upon the identified behavior. In addition, the present embodiments solve this problem by providing a security video searching method that identifies video clips from the plurality of video clips that match a search request of the user based upon previously determined behavioral patterns determined from event signals of the security devices.

Figure 18:
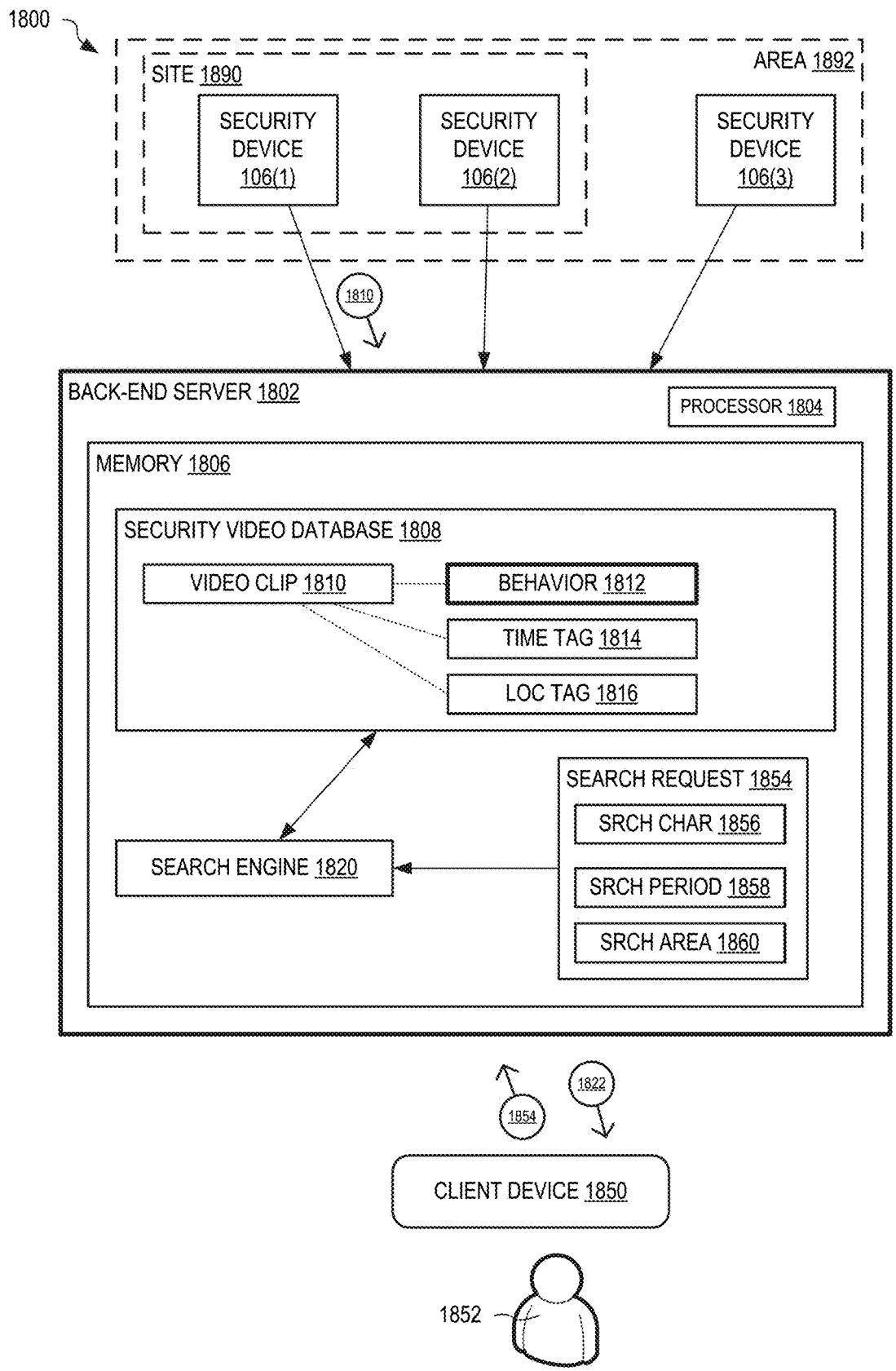
FIG. 18 is a schematic illustrating one example system for searching security video content, in an embodiment.

FIG. 18 is a schematic illustrating one example system 1800 for searching security video content. The system 1800 includes a server 1802 with a processor 1804 and a memory 1806, communicatively coupled with the processor 1804, that stores a security video database 1808 and a search engine 1820. The system 1800 also may include a plurality of security devices 106 that each send video clips 1810 to the server 1802 for storage in the security video database 1808.

In certain embodiments, the server 1802 may represent at least part of the server 1218 of FIG. 12 and the security video database 1808 may be stored in the storage device 1216. In other embodiments, the server 1802 may be at least part of the back-end server 120 of FIG. 1.

The search engine 1820 includes machine-readable instructions stored within the memory 1806 that, when executed by the processor 1804, control the processor 1804 to analyze each of the plurality of the video clips 1810 within the security video database 1808 to determine a behavior 1812 associated with the particular video clip 1810. In certain embodiments, the search engine 1820 processes the video clip 1810 as it is received from the security device 106, to determine the behavior 1812. In other embodiments, the search engine 1820 may process the video clip(s) 1810 in response to search requests and/or at designated intervals. Each of the video clips 1810 received by the server 1802 may be automatically analyzed to determine the associated behavior 1812. The behavior 1812 is for example a set of characteristics that define content of the video clip 1810. The search engine 1820 may include one or more algorithms that process frames of the video clips to identify objects, such as a person, an animal, and a vehicle, therein. Correspondingly, the behavior 1812 may indicate that the video clip 1810 contains one or more of a person, an animal, and a vehicle.

The search engine 1820 may also be implemented with, or configured to use, one or more classifiers trained to identify behavior within the video clip 1810, such as one or more of an actor such as a person or a vehicle, an abnormal behavior such as one or more of a person approaching a building but not ringing a doorbell (e.g., where the security device 106 is a doorbell type device), a person walking up to a building and then running away, a person approaching a building, picking something up, and then walking away, a person approaching a building and peering in through a window before walking away, a person getting out of a vehicle that has driven up to a building, taking and package, and driving away, and so on. The behavior 1812 corresponding to the video clip 1810 may indicate more than one characteristic and/or behavior within the video clip 1810. The search engine 1820 may match the behavior 1812 for each of the video clips 1810 to the search characteristics 1856 to identify the video clips 1810 matching the search request 1854.

Two or more of the security devices 106 may be related to each other, such as where they are co-located at a site, property and/or residence, and each of the security devices 106 may be related to one or more users 1852. For example, where the user 1852 has installed the security devices 106(1) and 106(2) at their residence, the user 1852 is considered to be related to the security devices 106(1) and 106(2), and the security devices 106(1) and 106(2) are considered to be related to one another. Where a plurality of the security devices 106 are located at different properties within a neighborhood, the plurality of security devices may be considered related within the neighborhood and the video clips 1810 from each of these security devices 106 may be collectively processed. In some of the present embodiments, the security devices 106 may all be a part of a network of security devices, and each of the security devices 106 within a designated area and/or region (e.g., a neighborhood, a town, a city, a defined boundary, etc.) may be considered related. In some embodiments, each of the security devices 106 (or each of the security devices 106 located at a single property) may have a unique designated area and/or region. For example, the security devices 106 located a first property may have a first designated area/or region from which related security devices 106 are located, and the security devices 106 located at a second property may have a second designated area and/or region from which related security devices 106 are located.

In one example of operation, the user 1852 may publish the video clips 1810 captured by their security device 106 to a group of users (e.g., members of a neighborhood, HOA, the network of security devices, and so on), and the search engine 1820, when invoked by the user 1852 or another of the users 1852 within the same group of users, may search all of the video clips 1810 that are published to that group. For example, upon hearing of report of criminal activity in their neighborhood, the user 1852 may wish to search for abnormal behavior within the published video clips 1810 captured by the security devices 106 in the user's neighborhood.

In another example of operation, the user 1852 may wish to search for abnormal behavior within the video clips 1810 captured only by their security devices 106 when having concerns of unusual activity at their site 1890. In the example of FIG. 18, for the site 1890, the search engine 1820 would search the security video database 1808 for the video clips 1810 received from any of the security devices 106(1) and 106(2).

The user 1852 may interact with a client device 1850 communicatively coupled (e.g., wirelessly and/or wired through a network such as the Internet and/or the user's network, such as a home Wi-Fi network) with the server 1802 that allows the user 1852 to send a search request 1854 to the search engine 1820. The search request 1854 may define the search characteristics 1856 that instruct the search engine 1820 to search for matching video clips of the video clips 1810 within the security video database 1808. The search characteristics 1856 may define particular content (e.g., a person, an animal, and a vehicle) and/or define a particular behavior (e.g., one or more of abnormal behavior such as package stealing, vandalism, trespassing, loitering, breaking and entering, and so on).

Upon receiving the search request 1854 from the client device 1850, the search engine 1820 searches the security video database 1808 to identify ones of the video clips 1810 that have the associated behavior 1812 that matches the search characteristics 1856. For example, the user 1852 may configure the search characteristics 1856 to instruct the search engine 1820 to find video clips captured by their security devices 106 that include a person. Continuing with the example of FIG. 18, the search engine 1820 searches the security video database 1808 to identify ones of the video clips 1810, captured by either of the security devices 106(1) and 106(2) related to the user 1852, that have the associated behavior 1812 indicating that the video clip contains a person. Where one or more of the video clips 1810 are found to match the search characteristics 1856, the search engine 1820 sends (e.g., transmits) the matched video clips 1810 to the client device 1850 (e.g., as a message 1822) for viewing by the user 1852. The message 1822 may be configured to automatically playback one or more of the matched video clips 1810 and/or present one or more of the matched video clips 1810 to the user on the client device 1850 for selection by the user. In some embodiments, such as where the user enters the search request 1854 into the client device 1850 and then exits an application where the search request 1854 was entered (e.g., by turning off the display of the client device 1850, by opening another application, etc.), the message 1822 may be configured to appear as a notification on the display of the client device 1850, such as in the form of a push-notification.

Within the security video database 1808, each of the video clips 1810 may also have a time tag 1814 and/or a location tag 1816. The time tag 1814 indicates at least a start time and date indicative of when the video clip 1810 was captured, and in certain embodiments many include a duration of the video clip 1810 and/or an end time of the video clip 1810. For example, the time tag 1814 may indicate that the video clip 1810 was created on Jun. 17, 2017 at ten thirty-seven PM and is thirty-two seconds in length. The location tag 1816 may indicate a location of the security device 106 that captured the video clip 1810. For example, the location tag 1816 may indicate one or more of a coordinate (e.g., a latitude and a longitude and/or a map reference) of the security device 106 that captured the video clip 1810, an address (e.g., a postal address) of the site 1890 where the security device 106 that captures the video clip 1810 is located, and so on.

The search request 1854 may also include a search period 1858 and/or a search area 1860. For example, where the user 1852 is interested in finding video clips with specific behavior that occurred between eight PM on the evening of Jun. 17, 2017 and four AM on the morning of Jun. 18, 2017, the user 1852 may set the search period 1858 to eight PM Jun. 17, 2017 with a duration of eight hours (or alternative indicate the exact start and stop time of the search period 1858). Accordingly, the search engine 1820 searches only ones of the video clips 1810 having the time tag 1814 indicative of a time that falls within the search period 1858. In another example, where the user 1852 is interested in finding video clips with specific behavior that occurred within their residential neighborhood (or another area, such as their town, city, etc.), the user 1852 may set the search area 1860 to indicate their neighborhood (or other search area). In some embodiments, the user may be able to define a custom search area 1860, such as by enlarging a circle or square (or other shape) on the display 1902 of the client device 1850 over a map (e.g., a map of the neighborhood, a map of the city or town, etc.) and/or by drawing by hand on the display 1902 of the client device 1850 a custom search area 1860 on a map. Accordingly, the search engine 1820 searches only ones of the video clips 1810 having the location tag 1816 indicative of a location within the search area 1860. In addition, in some of the present embodiments, the search area 1860 may be defined as one or more of a geographic location and a radius, a flag indicating use of a previously defined geographic area corresponding to the user 1852, a plurality of geographic locations that define a periphery of the search area, such as traced by the user 1852 on a map displayed upon the client device 1850, and so on.

In certain embodiments, the search area 1860 defaults to a previously determined location or area associated with one or more of the security devices 106 related to the user 1852. Continuing with the example of FIG. 18, where the user 1852 is associated with the security devices 106(1) and 106(2), the server 1802 stores one or more geographic locations of the security devices 106(1) and 106(2), and the search request 1854 does not specify the search area 1860, the search engine 1820 sets the search area 1860 to the stored location.

Figure 19:
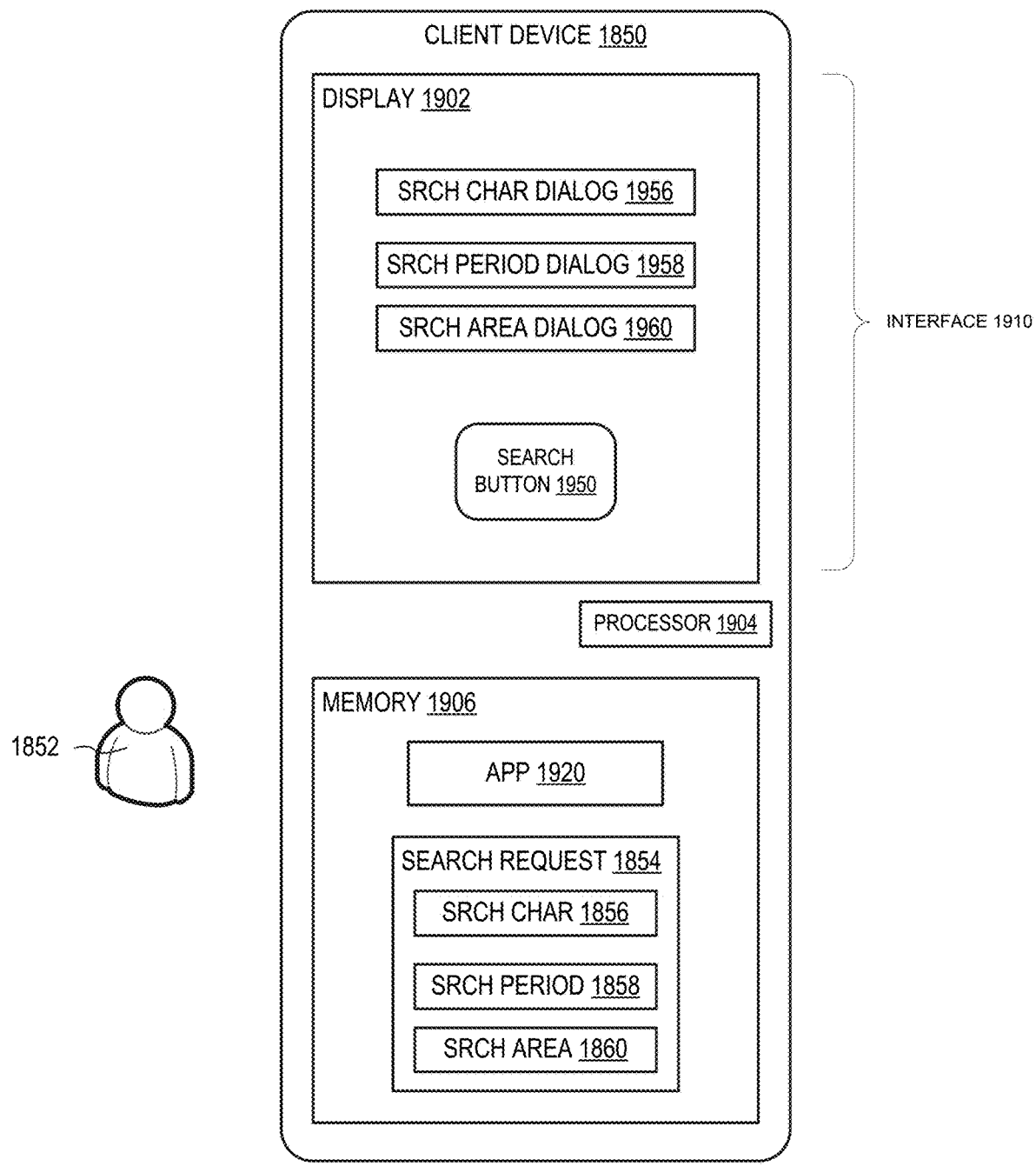
FIG. 19 is a functional block diagram of a client device, in an embodiment.

FIG. 19 shows the client device 1850 in further example detail. The client device 1850 is for example a smartphone or other such device that includes a display 1902, a processor 1904, a memory 1906, and communication capability. In the embodiment of FIG. 19, the display 1902 may be touch sensitive to provide user input capability and thereby form a user interface 1910 for interacting with the user 1852. The memory 1906 may store an app 1920 that includes machine readable instructions that are executed by the processor 1904 to control the user interface 1910 to interact with the user 1852 to capture the search request 1854. For example, the user interface 1910 may include one or more of a search characteristic dialog 1956 that allows the user 1852 to define one or more of the search characteristics 1856, a search period dialog 1958 that allows the user to define the search period 1858, a search area dialog 1960 that allows the user to define the search area 1860, and a search button 1950 that allows the user 1852 to send the search request 1854 to the server 1802.

In one embodiment, the search characteristic dialog 1956 may be implemented as a pull-down menu that allows the user 1852 to select one or more predefined search characteristics selected from the group including an animal, a person, a vehicle, abnormal activity, normal activities (e.g., kids playing tag), and so on, as described above. Accordingly, the search characteristic dialog 1956 may correspond to behavior recognition capability of the search engine 1820.

In one embodiment, the search area dialog 1960 may be a pulldown menu allowing selection and/or deselection of a neighborhood flag, wherein, when the neighborhood flag is set, the search area 1860 may be defined as the neighborhood corresponding to the user 1852, otherwise the search area 1860 may default to the site 1890 corresponding to the user 1852. In certain embodiments, the app 1920 may control the user interface 1910 to display a map corresponding to a neighborhood of the user 1852 and allow the user 1852 to trace an outline on the map to capture a series of coordinates defined by the outline with respect to the map and thereby define the search area 1860 (e.g., a custom search area 1860, as described above).

Once the user 1852 has defined (or accepted the default values for) one or more of the search characteristic dialog 1956, the search period dialog 1958, and the search area dialog 1960, the user 1852 may select the search button 1950 to send the search request 1854 to the server 1802.

Figure 20:
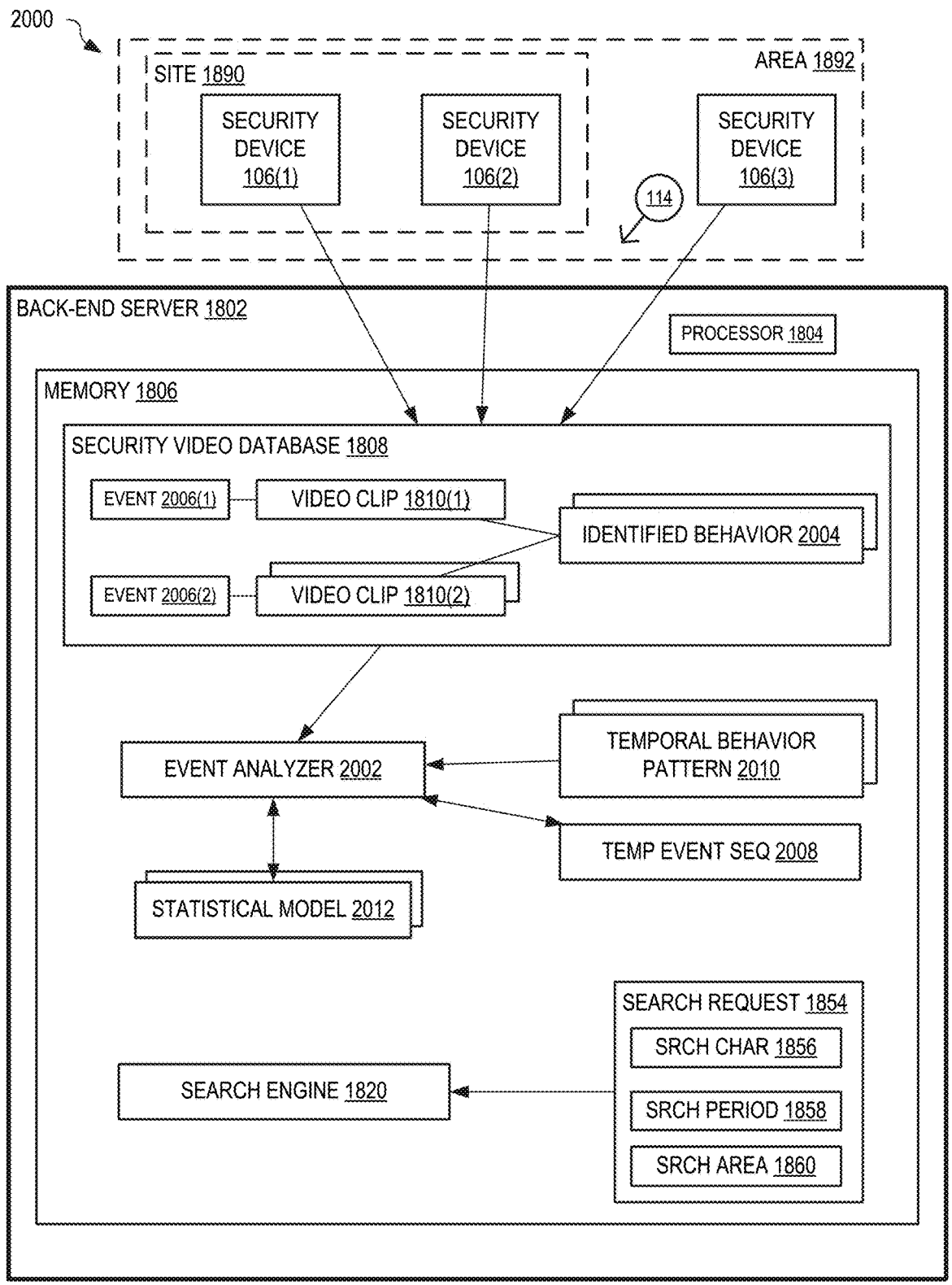
FIG. 20 is a functional block diagram of a back-end server, in an embodiment.

FIG. 20 shows the server 1802 of FIG. 18 further configured with an event analyzer 2002 that processes the video clips 1810 stored within the security video database 1808 to determine whether the video clips 1810 contain event(s) that may be used to collectively generate identified behavior 2004. The event analyzer 2002 processes each of the video clips 1810 and, where the video clip 1810 contains an event of interest (e.g., movement of interest, a person, animal, or object of interest, etc.), generates a corresponding event 2006. Each event 2006 may include a time and a location that are based upon the time tag 1814 (see FIG. 18) and the location tag 1816 of the corresponding video clip 1810. In the example of FIG. 20, the video clip 1810(1) has the associated event 2006(1) and the video clip 1810(2) has the associated event 2006(2).

In one example of operation, the event analyzer 2002 identifies motion events within the content of the video clips 1810 and generates a corresponding event 2006 within the security video database 1808. In some embodiments, the event analyzer 2002 uses the behavior 1812 corresponding to the video clip 1810 to determine whether to generate the corresponding event 2006. For example, where the behavior 1812 indicates abnormal behavior, the event analyzer 2002 generates the event 2006 without further processing of content of the video clip 1810. In certain embodiments, the events 2006 may be similar to events contained within the event signals 114 received from the security devices 106. For example, where the video clip 1810(1) contains movement of a person, the event analyzer 2002 generates and stores the event 2006(1) in association with the video clip 1810(1) within the security video database 1808.

The event analyzer 2002 collectively processes the plurality of events 2006, using the time and location information of the video clip 1810 and/or the events 2006, to generate one or more temporal event sequences 2008. The temporal event sequences 2008 are similar to the temporal event sequences 115 of FIG. 1. The event analyzer 2002 may operate similarly to the event analyzer 122 of FIG. 1 to compare the temporal event sequences 2008 to at least one temporal behavior pattern 2010 that is similar to the temporal behavior pattern 124, determine an identified behavior 2004 that is similar to the behavior awareness state 102 based upon the matched temporal behavior patterns 2010, and associate the identified behavior 2004 with the corresponding video clip(s) 1810. Particularly, the events 2006 corresponding to related ones of the security devices 106 are collectively analyzed to form the temporal event sequences 2008. For example, the event analyzer 2002 processes the events 2006 identified within the video clips 1810 received from the security devices 106 co-located at the site 1890 to generate the temporal event sequence 2008 corresponding to the site 1890. Similarly, the event analyzer 2002 processes the events 2006 identified within the video clips 1810 received from the security devices 106 located within area 1892 to generate the temporal event sequence 2008 corresponding to area 1892. That is, the event analyzer 2002 may selectively process the video clips 1810 to generate temporal event sequences 2008 based upon the location and/or the area of the capturing security device 106.

The event analyzer 2002 may further analyze the temporal behavior patterns 2010 to generate and maintain one or more statistical models 2012 corresponding to one or both of a location (e.g., the site 1890) and an area (e.g., the area 1892). The statistical models 2012 are similar to the statistical models 1704 of FIG. 17. The event analyzer 2002 may generate the statistical models 2012 with statistically adjusted temporal behavior patterns based upon statistical analysis of repeated behavior within the temporal behavior patterns 2010. In certain embodiments, the event analyzer 2002 may process the temporal event sequences 2008 for the site 1890, in conjunction with the video clips 1810 received from the security devices 106 location at the site, to further identify behavior considered normal at the site 1890. In another embodiment, the event analyzer 2002 may process the temporal event sequences 2008 for the area 1892 in conjunction with the video clips 1810 received from the security device 106 located within the area 1892, to further identify behavior considered normal within the area 1892. Thus, the statistical models 2012 may define normal behavior at one or both of the site 1890 and the area 1892.

Event analyzer 2002 may use one or more of the statistical models 2012 to determine whether the identified behavior 2004 is normal or abnormal for that particular location and/or area. Accordingly, the search engine 1820 may use the identified behavior 2004 to determine whether one or more of the corresponding video clips 1810 match the search characteristics 1856 of the search request 1854. For example, where the user 1852 defines the search characteristics 1856 to identify abnormal behavior and defines the search area 1860 as the site 1890, the search engine 1820 searches the identified behavior 2004 corresponding to the site 1890 to identify ones of the video clips 1810 with abnormal behavior.

The event analyzer 2002 may also operate similarly to the event analyzer 122 to identify events within the event signals 114. The event analyzer 2002 may then generate the temporal event sequences 2008 based upon both the events 2006 and the event signals 114. Further, the event analyzer 2002 may also collectively process, using the time and the location information, both (a) the temporal event sequences 115, corresponding to the events of the event signals 114, and (b) the temporal event sequences 2008, to determine the identified behavior 2004 corresponding to one or more of the video clips 1810. Particularly, through use of the statistical models 2012, the event analyzer 2002 may identify activity at a particular site or area that is not considered normal.

In some of the present embodiments, through use of the statistical models 2012, the event analyzer 2002 may identify activity at a particular site or area that is considered normal (e.g., such that a user can search for video clips 1810 including normal behavior).

Figure 21:
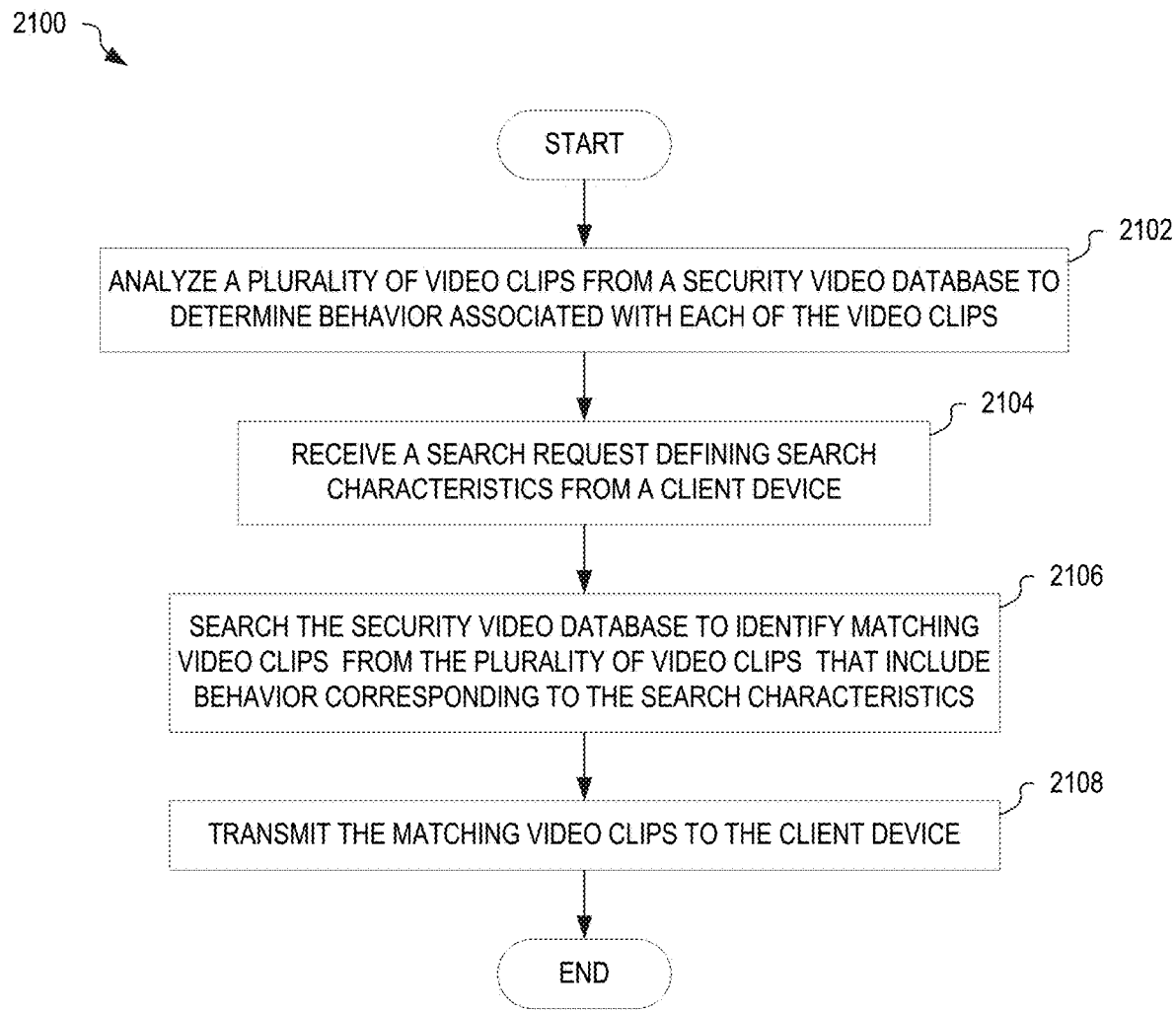
FIGS. 21-23 are flowcharts illustrating processes for behavior-aware security systems, according to embodiments of the present disclosure.

FIG. 21 is a flowchart illustrating one example method 2100 for searching security video content. The method 2100 may be, for example, implemented within the search engine 1820 of the server 1802 of FIG. 18.

In block 2102, the method 2100 analyzes a plurality of video clips from a security video database to determine behavior associated with each of the video clips. In one example of block 2102, the search engine 1820, when executed by the processor 1804 of the server 1802, controls the processor 1804 to analyze each of the plurality of the video clips 1810 within the security video database 1808 to determine the behavior 1812 associated with each of the video clips 1810. For example, the video clips 1810 may be analyzed to determine any actors present in the video clips 1810, such as persons, animal, and/or objects. In addition, the video clips 1810 may be analyzed to determine actions and/or behaviors in the video clips 1810, such as people running, loitering, vandalizing, etc., packages being dropped off, taken, moved, etc., dogs being walked, barking, running (on or off leash), etc.

In block 2104, the method 2100 receives, from a client device, a search request defining a search characteristic. In one example of block 2104, the search engine 1820 receives the search request 1854 with the search characteristics 1856 from the client device 1850. For example, the search request 1854 may include a particular actor, such as a person, animal, or object, and may further include an activity or behavior, such as a suspicious activity or behavior (e.g., trespassing, vandalizing, fleeing a scene, etc.) or a non-suspicious activity or behavior (e.g., playing catch, riding bikes, mowing the lawn, playing tag, etc.).

In block 2106, the method 2100 searches, in response to receiving the search request, the security video database to identify, from the plurality of video clips, video clips that include behavior corresponding to the search characteristic. In one example of block 2106, upon receiving the search request 1854 from the client device 1850, the search engine 1820 searches the security video database 1808 to identify the video clips 1810 that include the behavior 1812 corresponding to the search characteristics 1856.

In block 2108, the method 2100 transmits the matching video clips 1810 to the client device 1850. In one example of block 2108, the search engine 1820 sends the matched video clips 1810 to the client device 1850 as the message 1822.

Figure 22:
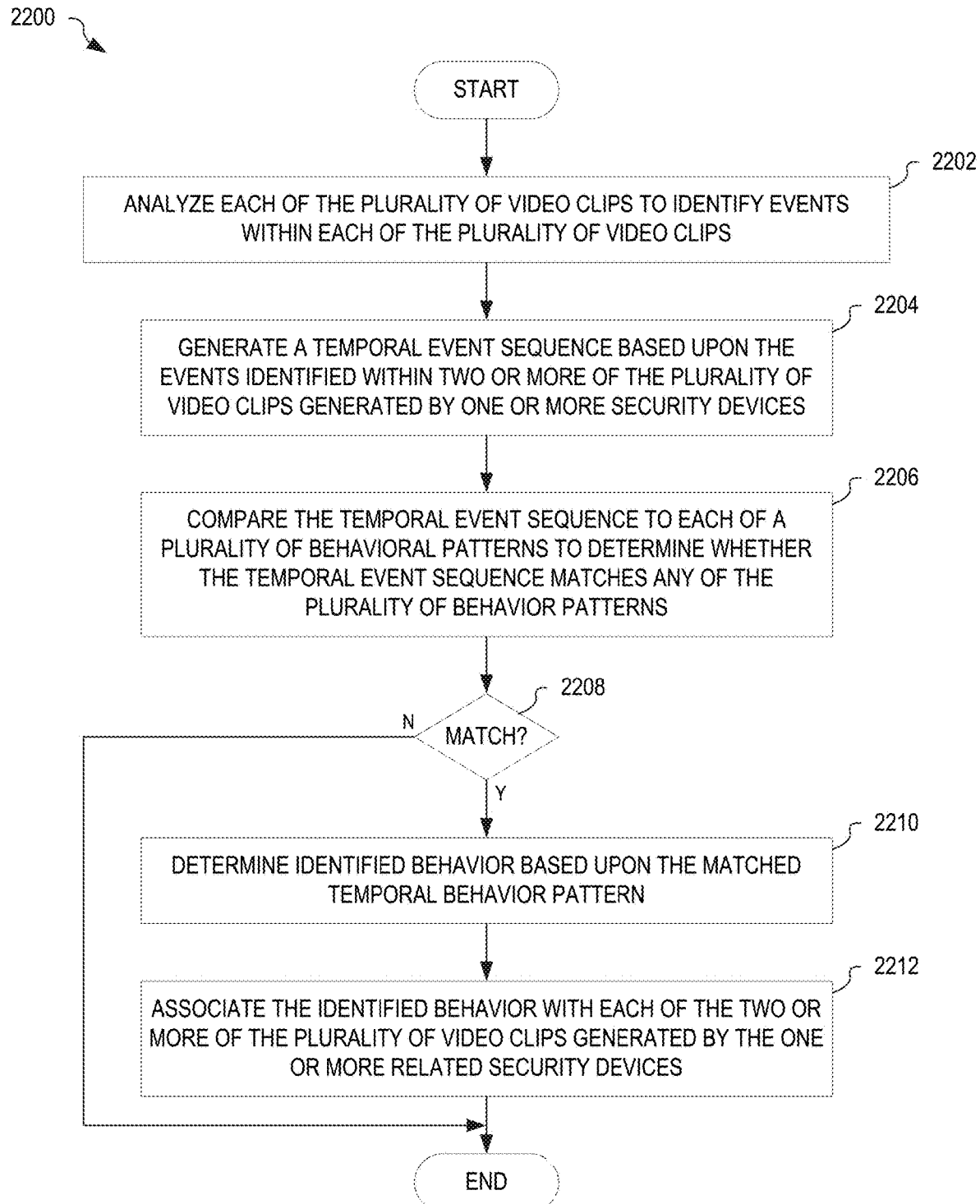

FIG. 22 is a flowchart illustrating one example method 2200 for analyzing a plurality of video clips from a security video database to determine a behavior associated with each of the plurality of video clips. The method 2200 may be implemented, for example, within the event analyzer 2002 of FIG. 20.

In block 2202, the method 2200 analyzes each of the plurality of video clips to identify first events within each of the plurality of video clips. In one example of block 2202, the event analyzer 2002 processes each video clip 1810 stored within the security video database 1808 and generates the corresponding event 2006 with a time and/or a location based upon the time tag 1814 and the location tag 1816 of the video clip 1810.

In block 2204, the method 2200 generates a temporal event sequence based on the events identified within two or more of the plurality of video clips generated by one or more related security devices. In one example of block 2204, the event analyzer 2002 collectively processes the plurality of events 2006, using associated time and location information of the video clips 1810, to generate one or more of the temporal event sequences 2008. In block 2206, the method 2200 compares the temporal event sequence to each of a plurality of behavioral patterns to determine whether the temporal event sequence matches any of the plurality of behavior patterns. In one example of block 2206, the event analyzer 2002 compares the temporal event sequence 2008 to at least one temporal behavior pattern 2010.

Block 2208 is a decision. If, in block 2208, the method 2200 determines that the temporal event sequence matches at least one of the plurality of behavior patterns, the method 2200 continues with block 2210; otherwise, the method 2200 terminates.

In block 2210, the method 2200 determines identified behavior based upon the matched temporal behavior pattern. In one example of block 2210, the event analyzer 2002 generates the identified behavior 2004 corresponding to the matched temporal behavior pattern 2010. In block 2212, the method 2200, the method 2200 associates the identified behavior with each of the two or more of the plurality of video clips generated by the one or more related security devices. In one example of block 2212, the event analyzer 2002 associates the identified behavior 2004 with the corresponding video clips 1810.

The method 2200 of FIG. 22 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

With reference to FIG. 18, the video clips 1810 and/or event signals (e.g., motion/sensor data from motions sensors, door/window sensors, etc.) generated by the security devices 106(1)-106(3) may each be transmitted to the back-end server 1802. The back-end server 1802 may then analyze each of the plurality of the video clips 1810 and/or event signals to identify events within the video clips 1810 and/or event signals (at block 2202).

In one example, a person may enter the field of view of the security device 106(1) configured with a residence at the site 1890, where the security device 106(1) is a video doorbell installed at the front door of the residence. The person may approach the door, loiter, not press the doorbell button, and then proceed around the back of the residence at the site 1890, and a first video clip may be generated by the security device 106(1) including the activity of the person. The security device 106(2) may detect the presence of the person only seconds after the person leaves the field of view of the security device 106(1) and may generate a second video clip of the person in the back yard of the site 1890. The second security device 106(2) may be a floodlight camera. The person may then proceed over a fence in the backyard of the site 1890, which may be included in the second video clip, and may jump into the neighbors back yard, where the security device 106(3) detects the motion of the person. The security device 106(3) may be a motion sensor installed in the back yard of the neighbor's house. The security device 106(3) may generate the event signal indicative of the motion of the person.

The back-end server 1802 may analyze the first video clip, the second video clip, and the event signal to generate, based on the location tags 1816 (e.g., because the first and second video clips and the event signal are within the same neighborhood, and more specifically, were generated at adjacent residences) and the time tags 1814 (e.g., because the first and second video clips and the event signal were generated within one minute of each other), and based on the events within the first and second video clips and the event signal (e.g., a person from the front of the house, to the rear of the house, and then over a fence) (as identified at block 2202), the temporal event sequence 2008 (at block 2204). The back-end server 1802 may then compare the temporal event sequence 2008 to the temporal behavioral patterns 2010 to determine that the temporal event sequence 2008 is indicative of, for example, at least one of loitering, trespassing, and stealing (e.g., because the person may have stolen an item from site 1890, as indicated by an object being present and then gone in one or more of the first and second video clips) (at block 2206). In some of the present embodiments, the identified behaviors 2004 (e.g., loitering, trespassing, stealing, etc.) may be generated by the back-end server 1802 based on the matched temporal behavior pattern, as described herein (at block 2210). Once the back-end server 1802 identifies the matched temporal behavior pattern 2010, the back-end server 1802 may associate the behavior with each of the first and second video clips and the event signal (at block 2212).

As such, with reference to the method 2100 of FIG. 21, when a search request 1854 includes the search characteristic 1856 of one of loitering, trespassing, stealing, etc., the first and second video clips and/or the event signal may be returned to the user as the video clips and/or event signal indicative of loitering, trespassing, stealing, etc. In some of the present embodiments, the first video clips, the second video clip, and the event signal may be compiled into one result. In such an embodiment, when the user of the client device 1850 plays back the search result, he or she may view the first video clip, followed by the second video clip, followed by a notification (e.g., a textual notification) of the event signal (e.g., "motion sensor at adjacent residence detected motion three seconds after person left camera field of view"). For example, back-end server 1802 may retrieve each of the first video clip, the second video clip, and the event signal, generate a video compilation including the first video clip, the second video clip, and the notification of the event signal (as described above), and transmit the video compilation to the client device 1850. The video compilation may include transitions and/or textual information (e.g., time information, location information, etc.).

As a result of the method 2200 (and the methods 2100 and 2200), the user of the client device 1850 may be able to search for suspicious activity and/or behavior. As a result, the user does not have to search through video after video, or event signal after event signal, to determine where a threat or suspicious activity may be present. Thus, the user is able to more quickly navigate to and locate suspicious activity, and as a result, may better understand the appearance of suspicious activity as well as the locations (e.g., in his or her neighborhood, town, etc.) where more suspicious activity takes place. Armed with this knowledge, the user may be better able to take appropriate action when presented with suspicious activity at his or her residence, and also may avoid areas where more suspicious activity has been located. Ultimately, the user's safety and the public safety as a whole are increased.

Figure 23:
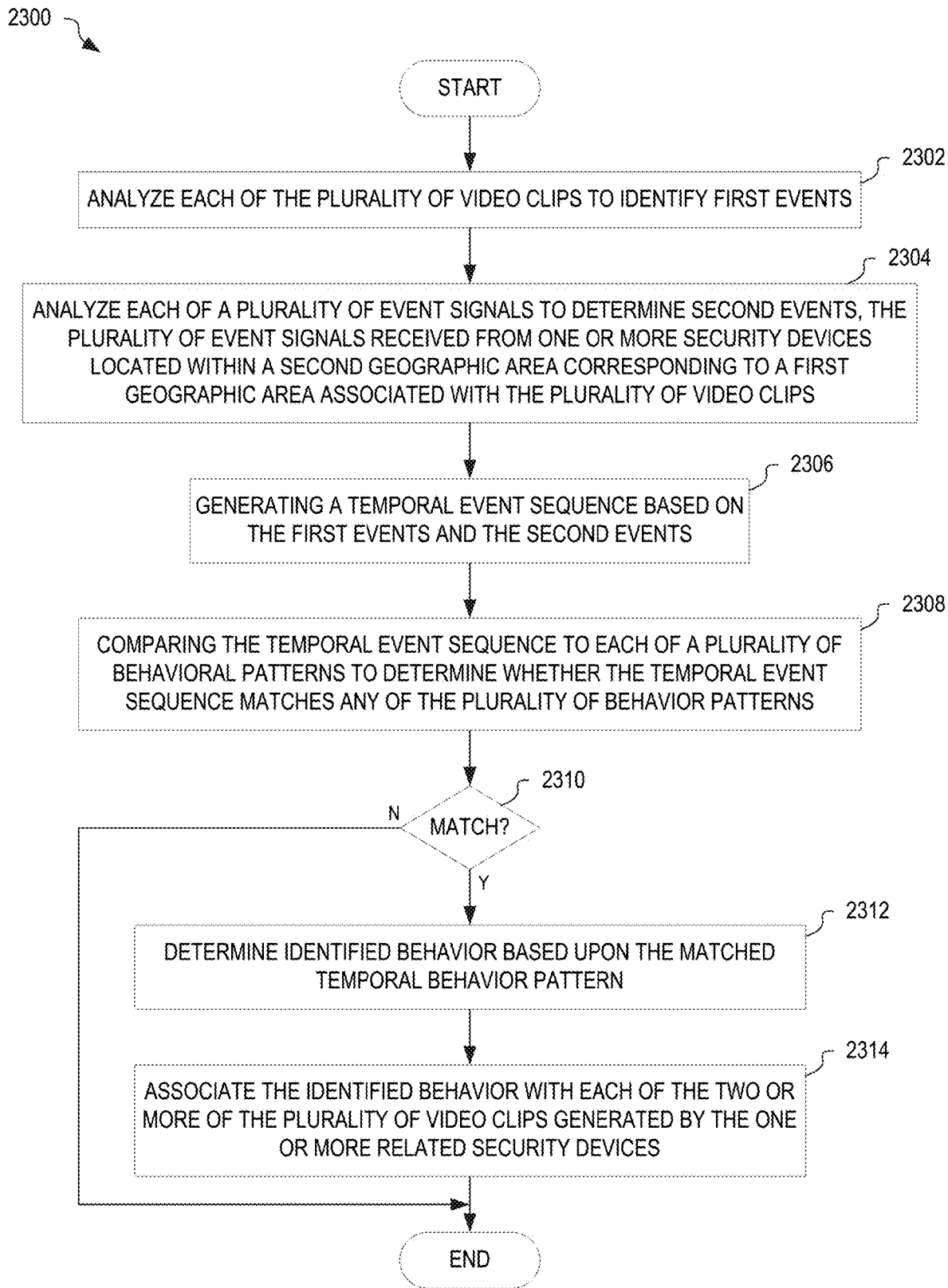

FIG. 23 is a flowchart illustrating one example method 2300 for analyzing the plurality of video clips from the security video database to determine the behavior associated with each of the plurality of video clips. The method 2300 may be, for example, implemented within the event analyzer 2002 of FIG. 20.

In block 2302, the method 2300 analyzes each of the plurality of video clips to identify first events. In one example of block 2302, the event analyzer 2002 processes each video clip 1810 stored within the security video database 1808 and generates a corresponding event 2006 with a time and/or a location based upon the time tag 1814 and the location tag 1816 of the video clip 1810.

In block 2304, the method 2300 analyzes each of a plurality of event signals to determine second events, the plurality of event signals received from one or more security devices located within a second geographic area corresponding to a first geographic area associated with the plurality of video clips. In one example of block 2304, the event analyzer 2002 receives the event signals 114 from the security devices 106 and determines the second events therein.

In block 2306, the method 2300 generates a temporal event sequence based on the first events and the second events. In one example of block 2306, the event analyzer 2002 generates temporal event sequences 2008 based upon both the events determined from the event signals 114 and the events 2006.

In block 2308, the method 2300 compares the temporal event sequence to each of a plurality of temporal behavior patterns to determine whether the temporal event sequence matches any of the plurality of temporal behavior patterns. In one example of block 2308, the event analyzer 2002 compares each of the temporal event sequences 2008 with the plurality of temporal behavior patterns 2010 to determine whether the temporal event sequence 2008 matches one or more of the temporal behavior patterns 2010.

Block 2310 is a decision. If, in block 2310, the method 2300 determines that the temporal event sequence matches at least one of the plurality of temporal behavior patterns, then the method 2300 continues with block 2312; otherwise the method 2300 terminates.

In block 2312, the method 2300 determines identified behavior based upon the matched temporal behavior pattern. In one example of block 2312, the event analyzer 2002 determines the identified behavior 2004 based upon the matched temporal behavior patterns 2010.

In block 2314, the method 2300 associates the identified behavior with each of the two or more of the plurality of video clips generated by the one or more related security devices. In one example of block 2314, the event analyzer 2002 associates the identified behavior 2004 with the video clips 1810(1) and 1810(2) within the security video database 1808.

Changes may be made in the above embodiments without departing from the scope hereof. The matter contained in the above description and/or shown in the accompanying drawings should be interpreted as illustrative and not in a limiting sense. The following claims are intended to cover all generic and specific features described herein, as well as all statements of the scope of the present embodiments, which, as a matter of language, might be said to fall therebetween.

What is claimed is:

1. A security video searching system, comprising:
   a processor;
   memory communicatively coupled with the processor;
   a security video database having a plurality of video clips, each video clip published by a corresponding user of a group of users, each video-clip accessible by any user within the group of users, and stored within the memory, at least one of the plurality of video clips being from a first site associated with a first user of the group of users, and at least another one of the plurality of video clips being from a second site at a different address than the first site and associated with a second user of the group of users, wherein the security video database stores video clips for multiple groups of users, wherein each of the plurality of video clips is accessible only by users belonging to the same group of users to which the user that published the video clip belongs;
   an event analyzer having machine-readable instructions stored within the memory that, when executed by the processor, configure the processor to:

analyze each of the plurality of video clips to determine events within each of the plurality of video clips;
generate a temporal event sequence based on the events determined from the plurality of video clips from related security devices;
compare the temporal event sequence to a plurality of behavioral patterns; and
associate the one or more of the plurality of behavioral patterns with each of the plurality of video clips when the temporal event sequence matches the behavioral pattern; and
a search engine having machine-readable instructions stored within the memory that, when executed by the processor, configure the processor to:
analyze each of the plurality of video clips to determine behavior associated with the video clip based upon behavior of an object detected in each of the plurality of video clips;
receive, from a client device associated with one of the users, a search request defining a search characteristic;
in response to receiving the search request, search the security video database to identify matching video clips from any of the plurality of video clips that (a) are published by any of the users of the group of users to which the user of the client device belongs, and (b) include behavior indicative of at least one of the search characteristic and a behavioral pattern indicative of the search characteristic; and
transmit one or more of the matching video clips to the client device.

2. The system of claim 1, the search request defining a time range, the search engine further comprising machine-readable instructions stored within the memory that, when executed by the processor, configure the processor to search only video clips of the security video database having a time tag indicative of a time within the time range.

3. The system of claim 2, the search request defining a geographic area, the search engine having machine-readable instructions stored within the memory that, when executed by the processor, configure the processor to search only video clips of the security video database having a location tag indicative of a location within the geographic area.

4. The system of claim 1, the search request being received in response to an input to an interface of an application running on the client device by a user of the client device.

5. The system of claim 1, wherein the search characteristic includes an actor, and wherein one of the identified video clips includes the actor.

6. The system of claim 5, wherein the actor is at least one of a person, an object, and an animal.

7. The system of claim 1, the event analyzer further comprising machine-readable instructions stored within the memory that, when executed by the processor, configure the processor to compare the temporal event sequence to a statistical model defining normal activity for the one or more related security devices, the temporal event sequence being indicative of abnormal behavior when not matched by the statistical model.

8. The system of claim 7, the temporal event sequence being associated with a time of day and the statistical model defining normal behavior at that time of day.

9. A method for searching security video content, the method comprising:
analyzing a plurality of video clips, each published by a corresponding user of a group of users and stored in a security video database that stores video clips published by users of more than one group, to determine behavior associated with each of the video clips based upon behavior of at least one object detected in each of the plurality of video clips, at least one of the plurality of video clips being from a first site associated with a first user of the group of users, and at least another one of the plurality of video clips being from a second site at a different address than the first site and associated with a second user of the group of users;
receiving, from a client device associated with one of the users of the group of users, a search request defining a search characteristic;
in response to receiving the search request, searching the security video database to identify matching video clips from any of the plurality of video clips that include behavior corresponding to the search characteristic; and
transmitting the matching video clips to the client device.

10. The method of claim 9, the search request defining a time range, wherein the searching comprises searching only video clips of the security video database having a time tag indicative of a time within the time range.

11. The method of claim 9, the search request defining a geographic area, wherein the searching comprises searching only video clips of the security video database having a location tag indicative of a location within the geographic area.

12. The method of claim 9, the search request being received in response to an input to an interface of an application running on the client device by a user of the client device.

13. The method of claim 9, further comprising, in response to determining the behavior associated with each of the plurality of video clips, storing the behavior in the security video database in association with the corresponding video clip.

14. The method of claim 9, wherein the search characteristic defines an actor, and wherein the identified video clips include the actor.

15. The method of claim 14, wherein the actor is at least one of a person, an object, and an animal.

16. The method of claim 9, wherein analyzing the plurality of video clips from the security video database to determine the behavior associated with each of the plurality of video clips comprises:
analyzing each of the plurality of video clips to identify events within each of the plurality of video clips;
generating a temporal event sequence based on the events identified within two or more of the plurality of video clips generated by one or more related security devices;
comparing the temporal event sequence to each of a plurality of temporal behavior patterns to determine whether the temporal event sequence matches any of the plurality of temporal behavior patterns; and
upon determining that the temporal event sequence matches at least one of the plurality of temporal behavior patterns:
determining identified behavior based upon the matched temporal behavior pattern; and
associating the identified behavior with each of the two or more of the plurality of video clips generated by the one or more related security devices.

17. The method of claim 16, further comprising comparing the temporal event sequence to a statistical model defining normal activity for the one or more related security devices, the temporal event sequence being indicative of abnormal behavior when not matched by the statistical model.

18. The method of claim 17, the statistical model defining the normal behavior over time, and the temporal event sequence being associated with a time to enable matching to the statistical model.

19. The method of claim 16, the events comprising detected motion.

20. The method of claim 9, wherein analyzing the plurality of video clips from the security video database to determine the behavior associated with each of the plurality of video clips comprises:
- analyzing each of the plurality of video clips to identify first events;
- analyzing each of a plurality of event signals to determine second events, the plurality of event signals received from one or more security devices located within a second geographic area corresponding to a first geographic area associated with the plurality of video clips;
- generating a temporal event sequence based on the first events and the second events;
- comparing the temporal event sequence to each of a plurality of temporal behavior patterns to determine whether the temporal event sequence matches any of the plurality of temporal behavior patterns; and
- upon determining that the temporal event sequence matches at least one of the plurality of temporal behavior patterns:
  - determining identified behavior based upon the matched temporal behavior pattern; and
  - associating the identified behavior with each of the two or more of the plurality of video clips generated by the one or more related security devices.

21. The method of claim 20, the temporal event sequence matching one or more temporal behavior patterns indicative of abnormal behavior at a site corresponding to the first and second events.

22. The method of claim 20, the temporal event sequence not matching temporal behavior patterns being indicative of normal behavior at the site.

* * * * *